(12) United States Patent
Ogusa et al.

(10) Patent No.: US 7,825,540 B2
(45) Date of Patent: Nov. 2, 2010

(54) POWER CONVERSION DEVICE

(75) Inventors: Shinichi Ogusa, Tokyo (JP); Yukimori Kishida, Tokyo (JP); Akira Imanaka, Tokyo (JP); Yasuhiro Sekimoto, Tokyo (JP); Masaya Harakawa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 179 days.

(21) Appl. No.: 12/293,093

(22) PCT Filed: Mar. 20, 2007

(86) PCT No.: PCT/JP2007/000271

§ 371 (c)(1),
(2), (4) Date: Sep. 16, 2008

(87) PCT Pub. No.: WO2007/111018

PCT Pub. Date: Oct. 4, 2007

(65) Prior Publication Data

US 2009/0085405 A1 Apr. 2, 2009

(30) Foreign Application Priority Data

Mar. 27, 2006 (JP) .............................. 2006-085350
Mar. 27, 2006 (JP) .............................. 2006-085351

(51) Int. Cl.
*H02J 3/00* (2006.01)
(52) U.S. Cl. .......................................... 307/58; 307/54
(58) Field of Classification Search .................... 307/54, 307/58
See application file for complete search history.

(56) References Cited

U.S. PATENT DOCUMENTS

| 5,625,545 | A | 4/1997 | Hammond |
| 5,805,437 | A | 9/1998 | Gruening |
| 6,301,130 | B1 | 10/2001 | Aiello et al. |
| 6,320,767 | B1 * | 11/2001 | Shimoura et al. ............. 363/37 |
| 6,621,719 | B2 | 9/2003 | Steimer et al. |

(Continued)

FOREIGN PATENT DOCUMENTS

JP    2000 166251    6/2000

(Continued)

OTHER PUBLICATIONS

Korean Office Action dated Jul. 1, 2010, in Application No. 10-2008-7023547, 8 pages.

(Continued)

*Primary Examiner*—Robert L. Deberadinis
(74) *Attorney, Agent, or Firm*—Oblon, Spivak, McClelland, Maier & Neustadt, L.L.P.

(57) ABSTRACT

A power conversion device including sub-inverters, each connected in series with respective phase of a three-phase main inverter including a smoothing capacitor, which is fed from a power supply via a converter, as a DC input thereof, and feeds power to a load using the sum of outputs of the inverters. A manipulative quantity is determined so that the DC voltage at each of smoothing capacitors which is an input of each of the sub-inverters will follow a command value. The manipulative quantity is added to an output voltage command for the three-phase main inverter, and is subtracted from an output voltage command for the sub-inverters. Thus, power is shifted from the three-phase main inverter to the smoothing capacitors of the sub-inverters.

18 Claims, 29 Drawing Sheets

U.S. PATENT DOCUMENTS

| | | |
|---|---|---|
| 6,697,271 B2 | 2/2004 | Corzine |
| 6,812,592 B2 | 11/2004 | Iwata et al. |
| 2002/0171294 A1 | 11/2002 | Iwata et al. |
| 2005/0002210 A1 | 1/2005 | Moon et al. |

FOREIGN PATENT DOCUMENTS

| | | |
|---|---|---|
| JP | 2001 103766 | 4/2001 |
| JP | 2002 359928 | 12/2002 |
| JP | 2004 7941 | 1/2004 |
| JP | 2005 33984 | 2/2005 |

OTHER PUBLICATIONS

S. Mariethoz, A. Rufer, Resolution and efficiency improvements for three-phase cascade multilevel inverters, 2004 IEEE, pp. 4441-4446.

* cited by examiner

POWER CONVERSION DEVICE

TECHNICAL FIELD

The present invention relates to a power conversion device, or more particularly, to a power conversion device having multiple inverters connected in series with one another.

BACKGROUND ART

A driving device used as a conventional power conversion device adopts multiple power cells connected in series with each of phase output lines led to a three-phase load, for example, a three-phase AC motor. A three-phase AC input power is fed to a primary winding circuit of a power transformer. The primary winding circuit energizes multiple secondary winding circuits, and a three-phase power related to the secondary winding circuits is fed to the power cells respectively. The multiple power cells are connected to the respective phase output lines, and each of the power cells includes a three-phase input converter, a smoothing filter, and a single-phase output converter (refer to, for example, a patent document 1).

Patent document 1: JP-A-2001-103766

DISCLOSURE OF THE INVENTION

Problems to be Solved by the Invention

In the conventional power conversion device, multiple inverters are connected in series with one another for the purposes of minimization of harmonics in an output voltage or current and an increase in an output voltage. A converter is needed as a power source for each of the inverters. Further, by constructional reason that numerous converters whose potentials are different from one another are connected to one AC power supply, the number of parts such as switching elements increases, and a large and heavy multi-winding transformer is needed for insulation.

The present invention is intended to solve the above problems. An object of the present invention is to provide, in a power conversion device that has multiple inverters connected in series with one another in relation to phases, a structure suitable for a power conversion device that includes an inverter, from which a converter for feeding power to a DC power supply serving as a DC input is excluded, as one of the multiple inverters, and that has compactness and simplicity facilitated.

Means for Solving the Problems

A first power conversion device in accordance with the present invention has a first single-phase inverter, which converts direct-current (DC) power of a first DC power supply fed from a power supply into alternating-current (AC) power, and a second single-phase inverter, which converts DC power of a second DC power supply into AC power, connected in series at AC side thereof so as to feed power to a load. The first power conversion device includes a means that detects a voltage at the second DC power supply, and a DC voltage control means that adjusts an output voltage command for each of the first and the second single-phase inverters so that the detected voltage at the second DC power supply will follow a command value.

A second power conversion device in accordance with the present invention has a first single-phase inverter, which converts DC power of a first DC power supply fed from a power supply into AC power, and a second single-phase inverter, which converts DC power of a second DC power supply into AC power, connected in series at AC side thereof so as to feed power to a load. The second power conversion device includes a means that detects a voltage at the second DC power supply, and an initial charging control device that controls the outputs of each of the first and the second single-phase inverters so as to initially charge the second DC power supply. While applying a voltage, which does not permit the load to operate, to the load, the initial charging control device controls the outputs of each of the first and the second single-phase inverters so that the second DC power supply will be charged via the first and the second single-phase inverters.

ADVANTAGE OF THE INVENTION

In the first power conversion device according to the present invention, since the output voltage command for each of the first and the second single-phase inverters is adjusted so that the voltage at the second DC power supply which is an input of the second single-phase inverter will follow the command value, a converter to be used to externally feed power to the second DC power supply can be excluded or simplified, and the compactness and simplicity of the power conversion device can be facilitated.

In the second power conversion device according to the present invention, the initial charging control device is included so that the second DC power supply that is an input of the second single-phase inverter will be charged via the first and the second single-phase inverters. Consequently, the second single-phase inverter obviates the necessity of initial charging of the second DC power supply from an external power supply via a converter, and the compactness and simplicity of the power conversion device can be facilitated by excluding the converter.

BEST MODE FOR CARRYING OUT THE INVENTION

Embodiment 1

A power conversion device in accordance with an embodiment 1 of the present invention will be described below in conjunction with drawings.

Figure 1:
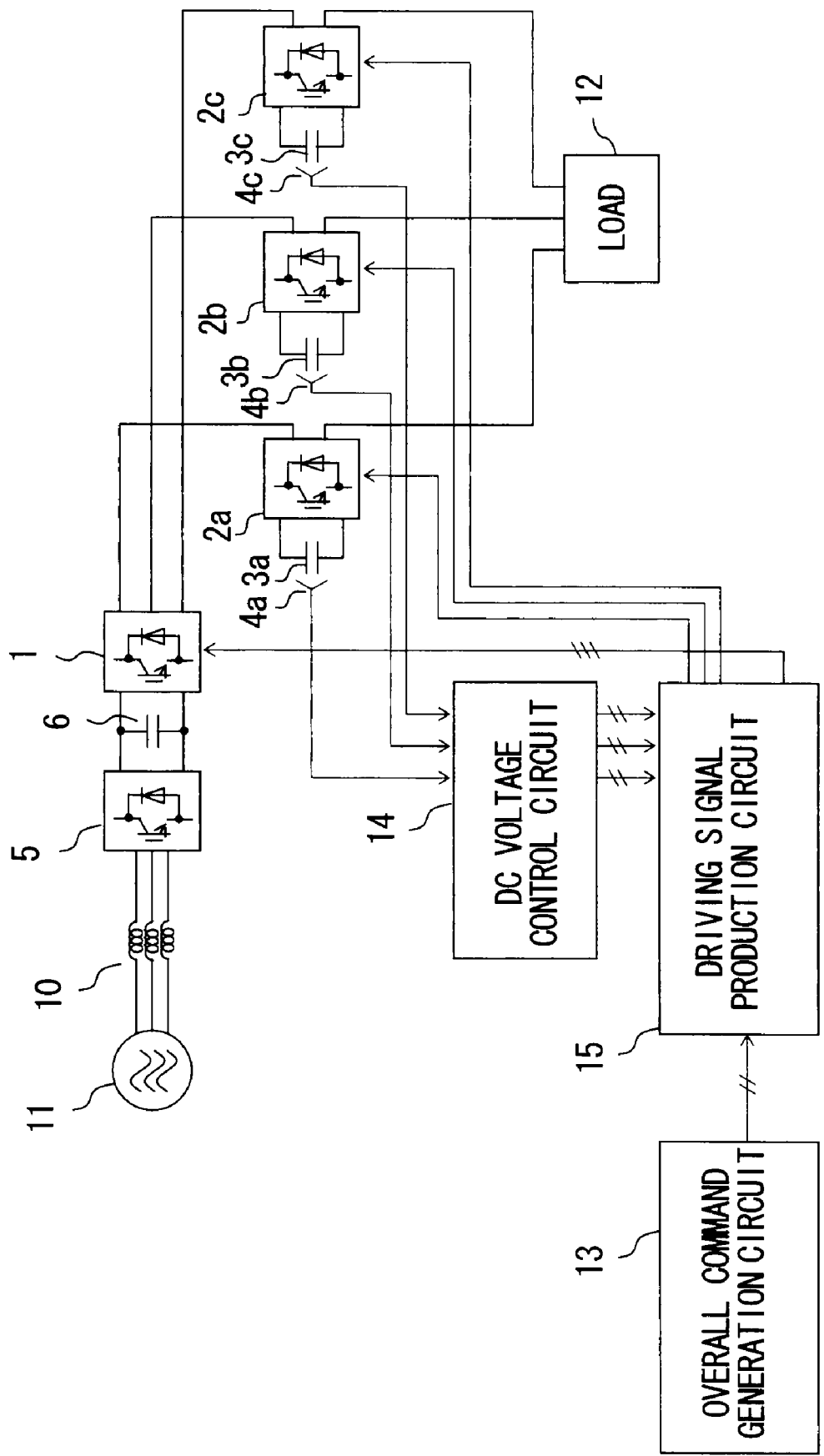
FIG. 1 is a configuration diagram of a power conversion device in accordance with an embodiment 1 of the present invention.

FIG. 1 is a diagram showing the configuration of a power conversion device in accordance with the embodiment 1 of the present invention. As shown in FIG. 1, the power conversion device has single-phase sub-inverters $2a$ to $2c$ of which AC sides of respective phases are connected in series with respective phase output lines on an AC side of a three-phase main inverter 1.

The three-phase main inverter 1 has a smoothing capacitor 6 serving as a first DC power supply on the DC side thereof, and has a converter 5 connected in parallel therewith. On the AC side of the converter 5, an AC power supply 11 is connected via a reactor 10. The single-phase sub-inverter $2a$ for u phase has a smoothing capacitor $3a$ serving as a second DC power supply on the DC side thereof, and has one terminal on the AC side thereof connected to the three-phase main inverter 1 and the other terminal thereon connected to a load 12. The single-phase sub-inverters $2b$ and $2c$ for v and w phases respectively have smoothing capacitors $3b$ and $3c$ respectively serving as second DC power supplies and have the same configuration as the single-phase sub-inverter $2a$.

Figure 2:
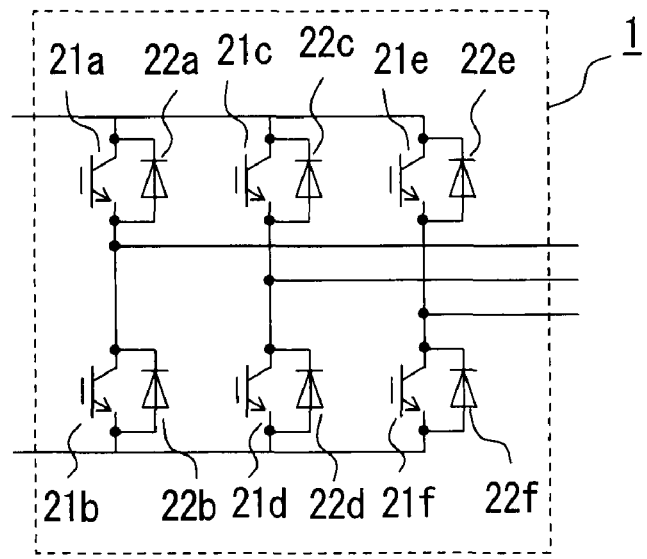
FIG. 2 is a circuit diagram of a three-phase main inverter in accordance with the embodiment 1 of the present invention.

The three-phase main inverter 1 is, as shown in FIG. 2 showing the circuitry, a three-phase inverter including multiple self-turn-off switching elements $21a$ to $21f$ and diodes $22a$ to $22f$ each of which is connected with the respective switching elements $21a$ to $21f$ in reverse parallel direction. Herein, the three-phase main inverter 1 is regarded as having first single-phase inverters star-connected as three phase parts. For each of the phases, the AC side of the first single-phase inverter (each phase part of the three-phase main inverter 1) and the AC side of each of the single-phase sub-inverters $2a$ to $2c$ serving as second single-phase inverters are connected in series with each other.

Figure 3:
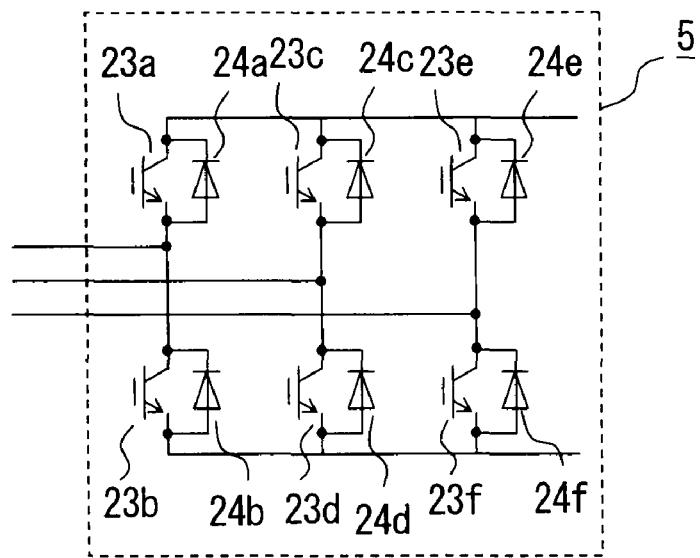
FIG. 3 is a circuit diagram of a converter in accordance with the embodiment 1 of the present invention.
Figure 4:
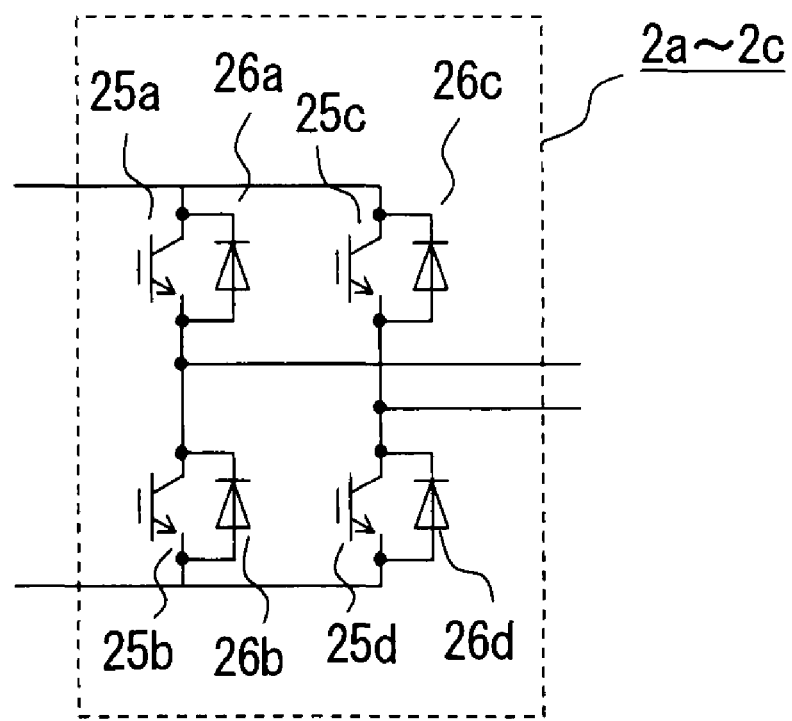
FIG. 4 is a circuit diagram of a single-phase sub-inverter in accordance with the embodiment 1 of the present invention.

The converter 5 includes, for example, as shown in FIG. 3, multiple self-turn-off switching elements $23a$ to $23f$ and diodes $24a$ to $24f$ each of which is connected with the respective switching elements $23a$ to $23f$ in reverse parallel direction. Moreover, each of the single-phase sub-inverters $2a$ to $2c$ is, as shown in FIG. 4, a single-phase full-bridge inverter including multiple self-turn-off switching elements $25a$ to $25d$ and diodes $26a$ to $26d$ each of which is connected with the respective switching elements $25a$ to $25d$ in reverse parallel direction.

Moreover, the power conversion device has an overall command generation circuit 13, a DC voltage control circuit 14, and a driving signal production circuit 15 for the purpose of controlling the three-phase main inverter 1 and each of single-phase sub-inverters $2a$ to $2c$ and controlling the voltages of the smoothing capacitors $3a$ to $3c$ that are the DC inputs of each the single-phase sub-inverters $2a$ to $2c$ respectively.

The overall command generation circuit 13 is a circuit that generates an output voltage command for the load 12, and is a control circuit that outputs a desired voltage, which is outputted in total by all of the three-phase main inverter 1 and single-phase sub-inverters $2a$ to $2c$, as a dq axial voltage command $v_d^*$ and $v_q^*$.

Figure 5:
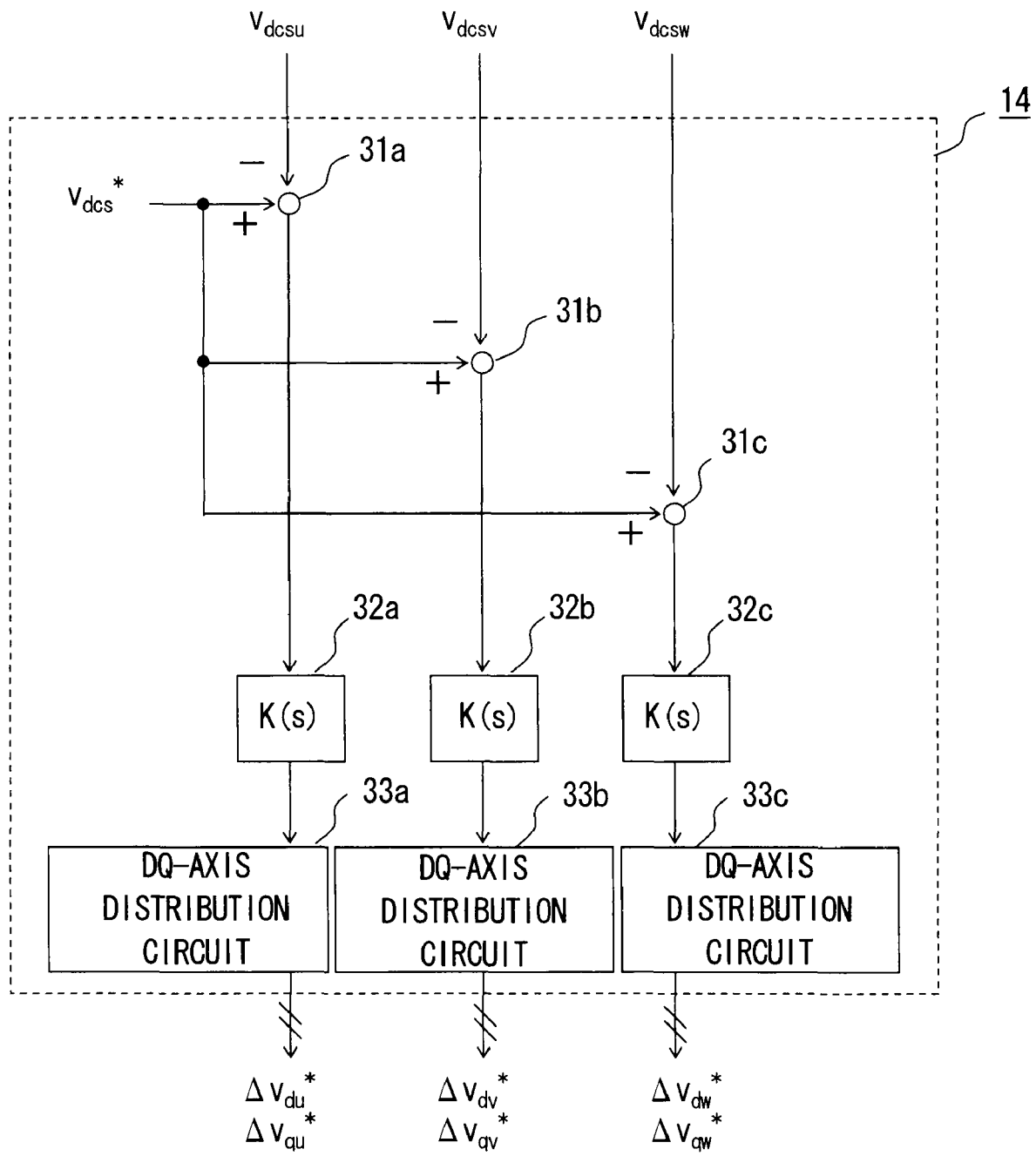
FIG. 5 is a block diagram of a DC voltage control circuit employed in the embodiment 1 of the present invention.

The DC voltage control circuit 14 performs control computation on the basis of the outputs of voltage sensors $4a$ to $4c$, which measure the voltages of the smoothing capacitors $3a$ to $3c$ that are the DC inputs of the respective single-phase sub-inverters $2a$ to $2c$, and outputs a voltage command representing a manipulative quantity. The DC voltage control circuit 14 is constructed as shown in, for example, FIG. 5, wherein subtractors $31a$ to $31c$ each obtain the deviation between each of the DC voltages $v_{dcsu}$, $v_{dcsv}$, and $v_{dcsw}$ of the smoothing capacitors $3a$ to $3c$ of the respective single-phase sub-inverters $2a$ to $2c$, which are measured by the voltage sensors $4a$ to $4c$ respectively, and a command value $v_{dcs}^*$, and controllers $32a$ to $32c$ obtain manipulative quantities. The manipulative quantities are used to adjust the output voltage command for each of the inverters 1 and $2a$ to $2c$ so that each of the DC voltages $v_{dcsu}$, $v_{dcsv}$, and $v_{dcsw}$ will follow the command value $v_{dcs}^*$, and d-axis manipulative quantities and q-axis manipulative quantities $\Delta v_{du}^*$, $\Delta v_{qu}^*$, $\Delta v_{dv}^*$, $\Delta v_{qv}^*$, $\Delta v_{dw}^*$, and $\Delta v_{qw}^*$ that are d-axis components and q-axis components distributed by dq axis distribution circuits $33a$ to $33c$ are outputted.

The controllers 32a to 32c may be formed with general proportional/integral (PI) controls or the like. Moreover, as a method according to which the dq axis distribution circuits 33a to 33c distribute the manipulative quantities, which are outputted from the controllers 32a to 32c respectively, into d-axis components and q-axis components, a method matching the type of load or the use purpose of the power conversion device may be selected. An arbitrary method such as a method of equalizing d-axis components and q-axis components or a method employing only the d axis or q axis may be adopted.

Figure 6:
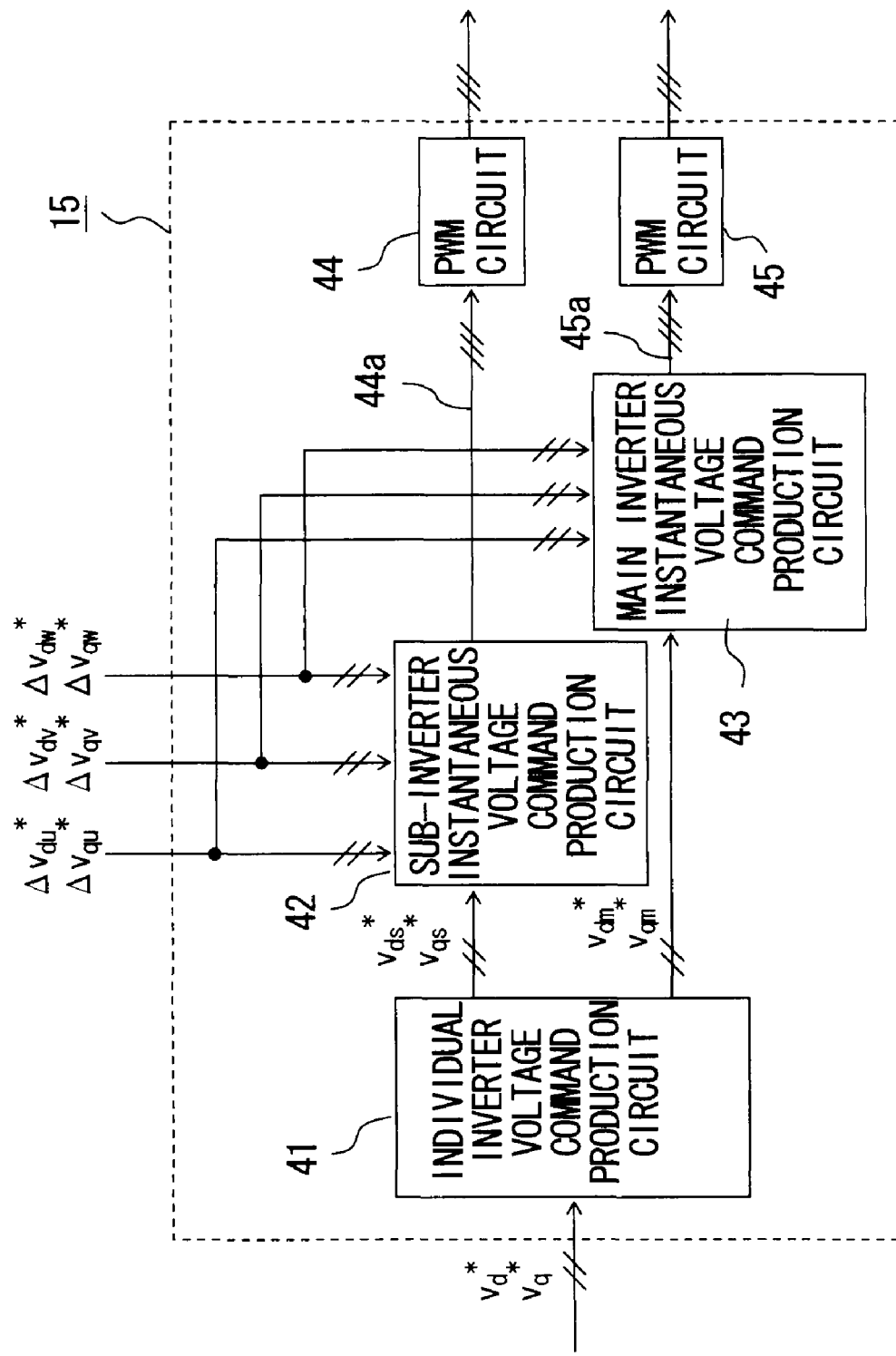
FIG. 6 is a block diagram of a driving signal generation circuit employed in the embodiment 1 of the present invention.

Based on the outputs of the overall command generation circuit 13 and DC voltage control circuit 14, the driving signal production circuit 15 computes voltages, each voltage is outputted by each of the three-phase main inverter 1 and the single-phase sub-inverters 2a to 2c, and produces pulses, with which the switching elements are driven, through pulse-width modulation (PWM). The driving signal production circuit 15 is constructed as shown in, for example, FIG. 6, wherein based on the dq-axis voltage command $v_d^*$ and $v_q^*$ outputted from the overall command generation circuit 13, an individual inverter voltage command production circuit 41 produces the dq-axis voltage command $v_{dm}^*$ and $v_{qm}^*$ for the three-phase main inverter 1 and the dq-axis voltage command $v_{ds}^*$ and $v_{qs}^*$ for the single-phase sub-inverters 2a to 2c. At this time, the respective dq-axis voltage commands have relationships expressed by equations (1a) and (1b) below.

$$v_d^* = v_{dm}^* + v_{ds}^* \tag{1a}$$

$$v_q^* = v_{qm}^* + v_{qs}^* \tag{1b}$$

The production of the dq-axis voltage command $v_{dm}^*$ and $v_{qm}^*$ for the three-phase main inverter 1 and the dq-axis voltage command $v_{ds}^*$ and $v_{qs}^*$ for each of the single-phase sub-inverters 2a to 2c is not limited to that based on the above equations (1a) and (1b). An arbitrary means such as a method of determining voltages, which are assigned to the three-phase main inverter 1 and the single-phase sub-inverters 2a to 2c, according to the withstand voltage of the switching elements forming each of the inverters 1 and 2a to 2c or a method of keeping a voltage, which is outputted by the three-phase main inverter 1 or each of the single-phase sub-inverters 2a to 2c, constant may be adopted.

A sub-inverter instantaneous voltage command production circuit 42 inputs the sub-inverter dq-axis voltage command $v_{dS}^*$ and $v_{qs}^*$, which is outputted by the individual inverter voltage command production circuit 41, and the d-axis manipulative quantities and the q-axis manipulative quantities $\Delta v_{du}^*$, $\Delta v_{qu}^*$, $\Delta v_{dv}^*$, $\Delta v_{qv}^*$, $\Delta v_{dw}^*$, and $\Delta v_{qw}^*$ which are outputted by the DC voltage control circuit 14, and computes a sub-inverter final voltage command 44a that is a command for the voltage instantaneous value outputted by the single-phase sub-inverters 2a to 2c.

Incidentally, for conversion of a dq axial voltage into a three-phase voltage, an equation (2) below is generally employed.

$$\begin{bmatrix} v_u \\ v_v \\ v_w \end{bmatrix} = \sqrt{\frac{2}{3}} \begin{bmatrix} \cos\theta & -\sin\theta \\ \cos\left(\theta - \frac{2\pi}{3}\right) & -\sin\left(\theta - \frac{2\pi}{3}\right) \\ \cos\left(\theta + \frac{2\pi}{3}\right) & -\sin\left(\theta + \frac{2\pi}{3}\right) \end{bmatrix} \begin{bmatrix} v_d \\ v_q \end{bmatrix} \tag{2}$$

In the above equation (2), $v_u$, $v_v$, and $v_w$ denote voltages of u, v, and w phases, and $v_d$ and $v_q$ denote voltages on the d and q axis respectively.

In the present embodiment, as expressed by equations (3a), (3b), and (3c) below, the dq axial manipulative quantities $\Delta v_{du}^*$, $\Delta v_{qu}^*$, $\Delta v_{dv}^*$, $\Delta v_{qv}^*$, $\Delta v_{dw}^*$, and $\Delta v_{qw}^*$ for the respective phases, which are outputted from the DC voltage control circuit 14, are subtracted from the sub-inverter dq-axis voltage command $v_{dS}^*$ and $v_{qs}^*$ which is outputted from the individual inverter voltage command production circuit 41, and the result is converted into a three-phase voltage in order to compute the sub-inverter final voltage command 44a ($v_{us}^*$, $v_{vs}^*$, and $v_{ws}^*$)

$$v_{us}^* = \sqrt{\frac{2}{3}} \left[\cos\theta - \sin\theta\right] \begin{bmatrix} v_{ds}^* - \Delta v_{du}^* \\ v_{qs}^* - \Delta v_{qu}^* \end{bmatrix} \tag{3a}$$

$$v_{vs}^* = \sqrt{\frac{2}{3}} \left[\cos\left(\theta - \frac{2\pi}{3}\right) - \sin\left(\theta - \frac{2\pi}{3}\right)\right] \begin{bmatrix} v_{ds}^* - \Delta v_{dv}^* \\ v_{qs}^* - \Delta v_{qv}^* \end{bmatrix} \tag{3b}$$

$$v_{ws}^* = \sqrt{\frac{2}{3}} \left[\cos\left(\theta + \frac{2\pi}{3}\right) - \sin\left(\theta + \frac{2\pi}{3}\right)\right] \begin{bmatrix} v_{ds}^* - \Delta v_{dw}^* \\ v_{qs}^* - \Delta v_{qw}^* \end{bmatrix} \tag{3c}$$

The thus computed sub-inverter final voltage command 44a is inputted to a PWM circuit 44, and the PWM circuit 44 outputs voltage pulse signals, each signal has the pulse width thereof modulated, so as to drive each of the single-phase sub-inverters 2a to 2c.

Moreover, a main inverter instantaneous voltage command production circuit 43 inputs the main inverter dq-axis voltage command $v_{dm}^*$ and $v_{qm}^*$ which is outputted by the individual inverter voltage command production circuit 41, and the d-axis manipulative quantities and q-axis manipulative quantities $\Delta v_{du}^*$, $\Delta v_{qu}^*$, $\Delta v_{dv}^*$, $\Delta v_{qv}^*$, $\Delta v_{dw}^*$, and $\Delta v_{qw}^*$ which are outputted by the DC voltage control circuit 14, and computes a main inverter final voltage command 45a that is a command for a voltage instantaneous value outputted by the three-phase main inverter 1.

In this case, as expressed by equations (4a), (4b), and (4c) below, the dq axial manipulative quantities $\Delta v_{du}^*$, $\Delta v_{qu}^*$, $\Delta v_{dv}^*$, $\Delta v_{qv}^*$, $\Delta v_{dw}^*$, and $\Delta v_{qw}^*$ for the respective phases, which are outputted by the DC voltage control circuit 14, are added to the main inverter dq-axis voltage command $v_{dm}^*$ and $v_{qm}^*$ which is outputted by the individual inverter voltage command production circuit 41, and the result is converted into a three-phase voltage in order to compute the main inverter final voltage command 45a ($v_{um}^*$, $v_{vm}^*$, and $v_{wm}^*$)

$$v_{um}^* = \sqrt{\frac{2}{3}} \left[\cos\theta - \sin\theta\right] \begin{bmatrix} v_{dm}^* + \Delta v_{du}^* \\ v_{qm}^* + \Delta v_{qu}^* \end{bmatrix} \tag{4a}$$

$$v_{vm}^* = \sqrt{\frac{2}{3}} \left[\cos\left(\theta - \frac{2\pi}{3}\right) - \sin\left(\theta - \frac{2\pi}{3}\right)\right] \begin{bmatrix} v_{dm}^* + \Delta v_{dv}^* \\ v_{qm}^* + \Delta v_{qv}^* \end{bmatrix} \tag{4b}$$

$$v_{wm}^* = \sqrt{\frac{2}{3}} \left[\cos\left(\theta + \frac{2\pi}{3}\right) - \sin\left(\theta + \frac{2\pi}{3}\right)\right] \begin{bmatrix} v_{dm}^* + \Delta v_{dw}^* \\ v_{qm}^* + \Delta v_{qw}^* \end{bmatrix} \tag{4c}$$

The thus computed main inverter final voltage command 45a is inputted to a PWM circuit 45, and the PWM circuit 45 outputs a voltage pulse signal, which has the pulse width thereof modulated, so as to drive the three-phase main inverter 1.

As mentioned above, the dq axial manipulative quantities $\Delta v_{du}^*$, $\Delta v_{qu}^*$, $\Delta v_{dv}^*$, $\Delta v_{qv}^*$, $\Delta v_{dw}^*$, and $\Delta v_{qw}^*$ for the respective phases, which are outputted by the DC voltage control circuit 14, are added to the main inverter dq-axis voltage command $v_{dm}*$ and $v_{qm}*$, and subtracted from the sub-inverter dq-axis voltage command $v_{ds}*$ and $v_{qs}*$. Since the AC sides of the single-phase sub-inverters 2a to 2c for the respective phases are connected in series with the respective phase output lines on the AC side of the three-phase main inverter 1, the voltage to be applied to the load 12 comes to the sum total of the output of the three-phase main inverter and the outputs of the single-phase sub inverters 2a to 2c. Consequently, the added manipulative quantities and the subtracted manipulative quantities are canceled out, and the voltage to be applied to the load 12 is determined with the dq-axis voltage command $v_d*$ and $v_q*$ outputted by the overall command generation circuit 13.

Assume that a voltage expressed on the d and q axis and applied to the load 12 is $v_d$ and $v_q$, a current flowing into the load 12 is $i_d$ and $i_q$, and an active power to be fed to the load 12 is p. Moreover, assuming that out of the voltage outputted by each of the three-phase main inverter 1 and the single-phase sub-inverters 2a to 2c, voltage components caused by the dq-axis voltage command $v_{dm}*$, $v_{qm}*$, $v_{ds}*$, and $v_{qs}*$ outputted by the individual inverter voltage command production circuit 41 are $v_{dm}$, $v_{qm}$, $v_{ds}$, and $v_{qs}$, the active power p is expressed by an equation (5) below.

$$p = v_d \cdot i_d + v_q \cdot i_q = (v_{dm} + v_{ds}) \cdot i_d + (v_{qm} + v_{qs}) \cdot i_q \quad (5)$$

Since the active power p is three-phase power, for example, an active power $p_u$ of the u phase is expressed by an equation (6) below.

$$p_u = p/3 = \{(v_{dm} + v_{ds}) \cdot i_d + (v_{qm} + v_{qs}) \cdot i_q\}/3 \quad (6)$$

On the other hand, assuming that the u-phase active power of the three-phase main inverter 1 is $p_{mu}$, the active power of the single-phase sub-inverter 2a is $p_{s2a}$, and voltage components caused by the dq axial manipulative quantities $\Delta v_{du}*$ and $\Delta v_{qu}*$ outputted by the DC voltage control circuit 14 out of a voltage outputted by each of the inverters 1 and 2a are $\Delta v_{du}$ and $\Delta v_{qu}*$, $p_{mu}$ and $P_{s2a}$ are expressed by equations (7) and (8) below in the same manner as that by the equation (6).

$$P_{mu} = \{(v_{dm} + \Delta v_{du}) \cdot i_d + (v_{qm} + \Delta v_{qu}) \cdot i_q\}/3 \quad (7)$$

$$P_{s2a} = \{(v_{ds} - \Delta v_{du}) \cdot i_d + (v_{qs} - \Delta v_{qu}) \cdot i_q\}/3 \quad (8)$$

Moreover, $p_u$, $p_{mu}$, and $p_{s2a}$ have a relationship expressed by an equation (9) below.

$$P_u = p_{mu} + p_{s2a} \quad (9)$$

From the equations (7) to (9), it is understood that $\{(\Delta V_{du} \cdot i_d + \Delta V_{qu} \cdot i_q)/3\}$ out of the active power outputted by the three-phase main inverter 1 is a component which is fed to the single-phase sub-inverter 2a but is not fed to the load 12. When power consumption caused by a loss occurring in the single-phase sub-inverter 2a is ignored, $\{(\Delta V_{du} \cdot i_d + \Delta V_{qu} \cdot i_q)/3\}$ is fed to the smoothing capacitor 3a of the single-phase sub-inverter 2a, and the voltage of the smoothing capacitor 3a increases. Moreover, if $\{(\Delta V_{du} \cdot i_d + \Delta V_{qu} \cdot i_q)/3\}$ takes on a negative value, the voltage of the smoothing capacitor 3a is lowered.

The voltage of the smoothing capacitor 3a is controlled as mentioned above. Since the d- and q-axis manipulative quantities $\Delta V_{du}*$ and $\Delta V_{qu}*$ for the u phase are determined so that the DC voltage $V_{dcsu}$ of the smoothing capacitor 3a will follow the command value $V_{dcs}*$, and can be sustained high reliably in a desired voltage.

The control of the DC voltage for the single-phase sub-inverter 2a has been described above. The same as that to the u phase applies to the v phase and w phase.

In the present embodiment, as mentioned above, since the manipulative quantities are determined so that each of the DC voltages $V_{dcsu}$, $V_{dcsv}$, and $V_{dcsw}$ of the smoothing capacitors 3a to 3c of the single-phase sub-inverters 2a to 2c will follow the command value $V_{dcs}*$, and the output voltage command for each of the inverters 1 and 2a to 2c is adjusted, each of the DC voltages $V_{dcsu}$, $V_{dcsv}$, and $V_{dcsw}$ of the smoothing capacitors 3a to 3c is controlled to be retained at a desired voltage. Consequently, the desired DC voltage can be sustained in each of the smoothing capacitors 3a to 3c of the single-phase sub-inverters 2a to 2c without feed of power from another power supply. Simplification of a device configuration and cost reduction such as exclusion of converters for the single-phase sub-inverters 2a to 2c or replacement of a multi-winding transformer with a reactor can be achieved.

Incidentally, due to an error of each of the control circuits, when the output voltage command for each of the inverters 1 and 2a to 2c is merely adjusted, if DC voltage control for each of the smoothing capacitors 3a to 3c cannot be precisely achieved, a converter is provided in order to feed power from the AC power supply 11. However, the capacity of the converter may be much smaller than the conventional one, and the device configuration can be fully simplified.

Moreover, in the embodiment 1, the three-phase main inverter 1 is a three-phase full-bridge inverter. Even when three single-phase full-bridge inverters like the single-phase sub-inverters 2a to 2c are adopted, the same control can be achieved. Moreover, even when the three-phase main inverter 1 and the single-phase sub-inverters 2a to 2c are three-level inverters, the same control can be achieved. Moreover, if power need not be restored to the AC power supply 11, the converter 5 may be a diode converter.

Embodiment 2

In the foregoing embodiment 1, in the driving signal production circuit 15, based on the dq-axis voltage command $v_d*$ and $v_q*$ outputted from the overall command generation circuit 13, a dq-axis voltage command is produced for not only the three-phase main inverter 1 but also the single-phase sub-inverters 2a to 2c. In the present embodiment, the single-phase sub-inverters 2a to 2c are operated as inverters to be used to output a voltage which cancel voltage harmonics outputted by the three-phase main inverter 1.

Figure 7:
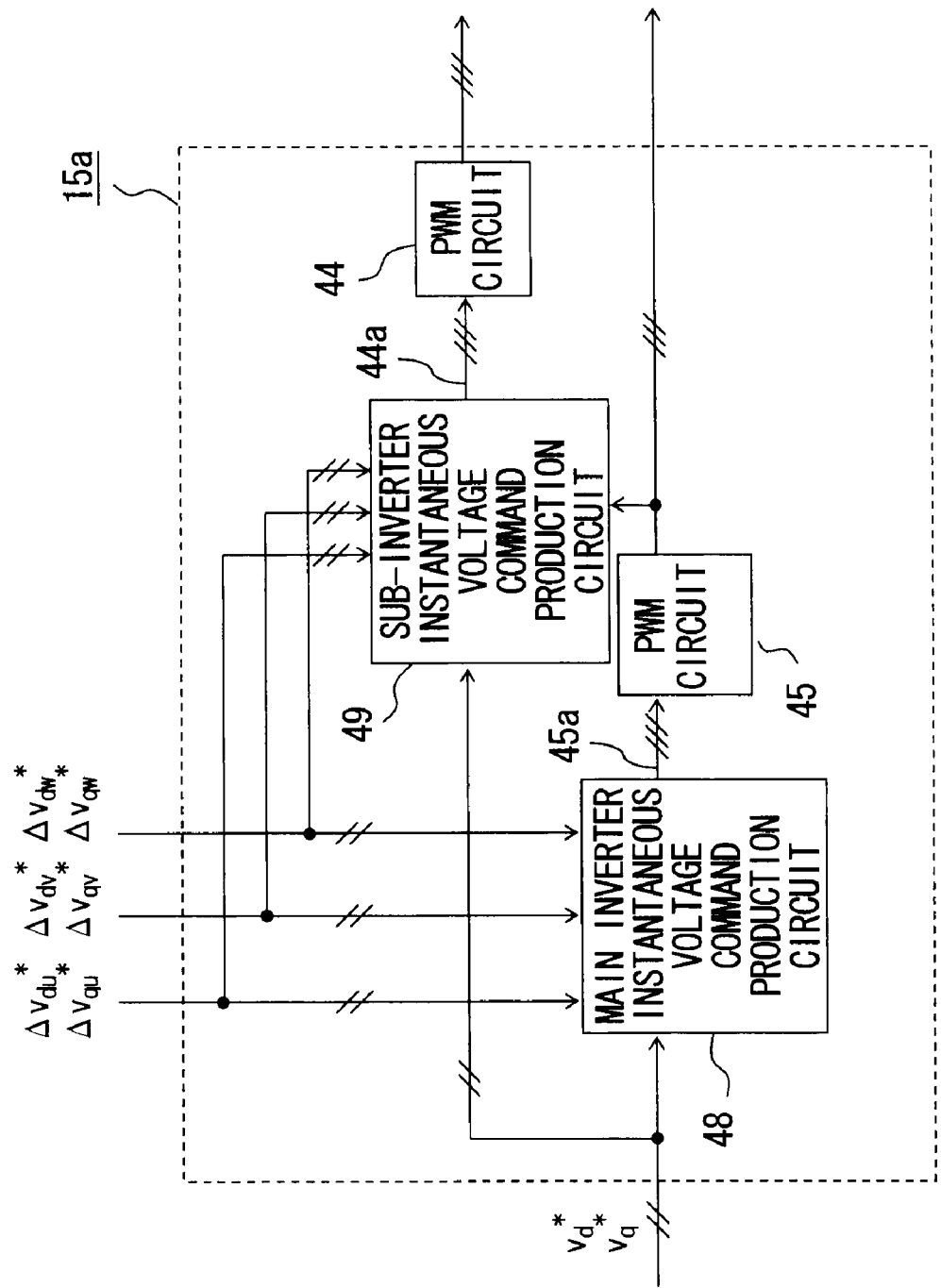
FIG. 7 is a block diagram of a driving signal generation circuit employed in an embodiment 2 of the present invention.

In this case, instead of the driving signal production circuit 15 in the embodiment 1, a driving signal production circuit 15a shown in FIG. 7 is employed. The other circuit components are identical to those of the embodiment 1.

The driving signal production circuit 15a computes a voltage outputted by each of the three-phase main inverter 1 and the single-phase sub-inverters 2a to 2c on the basis of the outputs of the overall command generation circuit 13 and DC voltage control circuit 14, and produces pulses, with which the respective switching elements are driven, through PWM. As shown in FIG. 7, the main inverter instantaneous voltage command production circuit 48 inputs a dq-axis voltage command $v_d*$ and $v_q*$ outputted from the overall command generation circuit 13 and the d-axis manipulative quantities and q-axis manipulative quantities $\Delta v_{du}*$, $\Delta v_{qu}*$, $\Delta v_{dv}*$, $\Delta v_{qv}*$, $\Delta v_{dw}*$, and $\Delta v_{qw}*$ outputted by the DC voltage control circuit 14, and computes a main inverter final voltage command 45a that is a command for a voltage instantaneous value outputted by the three-phase main inverter 1.

In this case, as expressed by equations (10a), (10b), and (10c) below, the dq axial manipulative quantities $\Delta v_{du}^*$, $\Delta v_{qu}^*$, $\Delta v_{dv}^*$, $\Delta v_{qv}^*$, $\Delta v_{dw}^*$, and $\Delta v_{qw}^*$ for the respective phases outputted by the DC voltage control circuit 14 are added to the dq-axis voltage command $v_d^*$ and $v_q^*$, and the result is converted into a three-phase voltage in order to compute the main inverter final voltage command 45*a* ($v_{um}^*$, $v_{vm}^*$, and $v_{wm}^*$)

$$v_{um}^* = \sqrt{\frac{2}{3}}\,[\cos\theta - \sin\theta]\begin{bmatrix} v_d^* + \Delta v_{du}^* \\ v_q^* + \Delta v_{qu}^* \end{bmatrix} \tag{10a}$$

$$v_{vm}^* = \sqrt{\frac{2}{3}}\left[\cos\!\left(\theta - \frac{2\pi}{3}\right) - \sin\!\left(\theta - \frac{2\pi}{3}\right)\right]\begin{bmatrix} v_d^* + \Delta v_{dv}^* \\ v_q^* + \Delta v_{qv}^* \end{bmatrix} \tag{10b}$$

$$v_{wm}^* = \sqrt{\frac{2}{3}}\left[\cos\!\left(\theta + \frac{2\pi}{3}\right) - \sin\!\left(\theta + \frac{2\pi}{3}\right)\right]\begin{bmatrix} v_d^* + \Delta v_{dw}^* \\ v_q^* + \Delta v_{qw}^* \end{bmatrix} \tag{10c}$$

The thus computed main inverter final voltage command 45*a* is inputted to the PWM circuit 45, and the PWM circuit 45 outputs a voltage pulse signal, which has the pulse width thereof modulated, so as to drive the three-phase main inverter 1.

A sub-inverter instantaneous voltage command production circuit 49 inputs the dq-axis voltage command $v_d^*$ and $v_q^*$ outputted from the overall command generation circuit 13, and the d-axis manipulative quantities and q-axis manipulative quantities $\Delta v_{du}^*$, $\Delta v_{qu}^*$, $\Delta v_{dv}^*$, $\Delta v_{qv}^*$, $\Delta v_{dw}^*$, and $\Delta v_{qw}^*$ outputted by the DC voltage control circuit 14, and further inputs a voltage pulse signal $V_{umpwm}$, $V_{vmpwm}$, and $V_{wmpwm}$ for the three-phase main inverter 1 outputted by the PWM circuit 45. Based on the input signals, the instantaneous voltage command production circuit 49 computes, as expressed by equations (11a), (11b), and (11c) below, a sub-inverter final voltage command 44*a* ($v_{us}^*$, $v_{vs}^*$, and $v_{ws}^*$) that is a command for a voltage instantaneous value outputted by the single-phase sub-inverters 2*a* to 2*c*.

$$v_{us}^* = \sqrt{\frac{2}{3}}\,[\cos\theta - \sin\theta]\begin{bmatrix} v_d^* - \Delta v_{du}^* \\ v_q^* - \Delta v_{qu}^* \end{bmatrix} - v_{umpwm} \tag{11a}$$

$$v_{vs}^* = \sqrt{\frac{2}{3}}\left[\cos\!\left(\theta - \frac{2\pi}{3}\right) - \sin\!\left(\theta - \frac{2\pi}{3}\right)\right]\begin{bmatrix} v_d^* - \Delta v_{dv}^* \\ v_q^* - \Delta v_{qv}^* \end{bmatrix} - v_{vmpwm} \tag{11b}$$

$$v_{ws}^* = \sqrt{\frac{2}{3}}\begin{bmatrix} \cos\!\left(\theta + \frac{2\pi}{3}\right) - \\ \sin\!\left(\theta + \frac{2\pi}{3}\right) \end{bmatrix}\begin{bmatrix} v_d^* - \Delta v_{dw}^* \\ v_q^* - \Delta v_{qw}^* \end{bmatrix} - v_{wmpwm} \tag{11c}$$

The thus computed sub-inverter final voltage command 44*a* is inputted to the PWM circuit 44, and the PWM circuit 44 outputs a voltage pulse signal, which has the pulse width thereof modulated, so as to drive each of the single-phase sub-inverters 2*a* to 2*c*.

Under the foregoing control, the three-phase main inverter 1 outputs a voltage caused by an output voltage command having the d-axis manipulative quantities and q-axis manipulative quantities $\Delta v_{du}^*$, $\Delta v_{qu}^*$, $\Delta v_{dv}^*$, $\Delta v_{qv}^*$, $\Delta v_{dw}^*$, and $\Delta v_{qw}^*$, which are outputted by the DC voltage control circuit 14, added to the dq-axis voltage command $v_d^*$ and $v_q^*$ outputted from the overall command generation circuit 13.

The single-phase sub-inverters 2*a* to 2*c* each output a voltage caused by an output voltage command having the d-axis manipulative quantities and q-axis manipulative quantities $\Delta v_{du}^*$ and $\Delta v_{qu}^*$, $\Delta v_{dv}^*$ and $\Delta v_{qv}^*$, or $\Delta v_{dw}^*$ and $\Delta v_{qw}^*$, which are outputted by the DC voltage control circuit 14, and the voltage pulse signal of the three-phase main inverter 1 $V_{umpwm}$, $V_{vmpwm}$, and $V_{wmpwm}$, subtracted from the dq-axis voltage command $v_d^*$ and $v_q^*$ outputted from the overall command generation circuit 13. Since the voltage pulse signal $V_{umpwm}$, $V_{vmpwm}$, and $V_{wmpwm}$ is subtracted from the signal of each phase having the dq-axis voltage command $V_d^*$ and $V_q^*$ converted into a three-phase instantaneous voltage, the fundamental wave component of the instantaneous voltage into which the dq-axis voltage command $v_d^*$ and $v_q^*$ is converted is canceled. The sub-inverter final voltage command 44*a* is a command causing output of a voltage that is in opposite phase with harmonics outputted from the three-phase main inverter 1, and the single-phase sub-inverters 2*a* to 2*c* operate to cancel the voltage harmonics outputted from the three-phase main inverter 1.

Further, similarly to the embodiment 1, the d and q axial manipulative quantities for the respective phases $\Delta v_{du}^*$, $\Delta v_{qu}^*$, $\Delta v_{dv}^*$, $\Delta v_{qv}^*$, $\Delta v_{dw}^*$, and $\Delta v_{qw}^*$, which are outputted by the DC voltage control circuit 14, are added for computation of the voltage command for the three-phase main inverter 1, and are subtracted for computation of the voltage command for each of the single-phase sub-inverters 2*a* to 2*c*. Consequently, similarly to the embodiment 1, for example, for the u phase, $\{(\Delta_{du}\cdot i_d + \Delta_{qu}\cdot i_q)/3\}$ out of an active power outputted by the three-phase main inverter 1 is fed to the single-phase sub-inverter 2*a* in order to charge the smoothing capacitor 3*a* of the single-phase sub-inverter 2*a*. When $\{(\Delta v_{du}\cdot i_d + \Delta v_{qu}\cdot i_q)/3\}$ takes on a positive value, the voltage of the smoothing capacitor 3*a* increases. When $\{(\Delta v_{du}\cdot i_d + \Delta v_{qu}\cdot i_q)/3\}$ takes on a negative value, the voltage of the smoothing capacitor 3*a* is lowered. The voltage of the smoothing capacitor 3*a* is thus controlled. Since the d- and q-axis manipulative quantities $\Delta_{du}^*$ and $\Delta v_{qu}^*$ for the u phase are determined so that the DC voltage $V_{dcsu}$ of the smoothing capacitor 3*a* will follow a command value $V_{dcs}^*$, a desired voltage can be highly reliably sustained. The same as that to the u phase applies to the v and w phases.

The voltage outputted by the three-phase main inverter 1 contains harmonics due to PWM control. In the present embodiment, since the single-phase sub-inverters 2*a* to 2*c* are operated to cancel the voltage harmonics outputted by the three-phase main inverter 1, the voltage to be fed to the load 12 has the harmonics thereof suppressed.

Moreover, since the manipulative quantities are determined so that each of the DC voltages $V_{dcsu}$, $V_{dcsv}$, and $V_{dcsw}$ of the respective smoothing capacitors 3*a* to 3*c* of the single-phase sub-inverters 2*a* to 2*c* will follow the command value $V_{dcs}^*$, and the output voltage command for each of the inverters 1 and 2*a* to 2*c* is adjusted, each of the DC voltages $V_{dcsu}$, $V_{dcsv}$, and $V_{dcsw}$ of the respective smoothing capacitors 3*a* to 3*c* is controlled to be retained at a desired voltage. Consequently, the same advantage as the advantage of the embodiment 1 can be exerted, and the desired DC voltage can be sustained in each of the smoothing capacitors 3*a* to 3*c* of the single-phase sub-inverters 2*a* to 2*c* without feed of power from another power supply. Eventually, simplification of a device configuration and cost reduction such as exclusion/ simplification of converters for the single-phase sub-inverters 2a to 2c or replacement of a multi-winding transformer with a reactor can be achieved.

Embodiment 3

Figure 8:
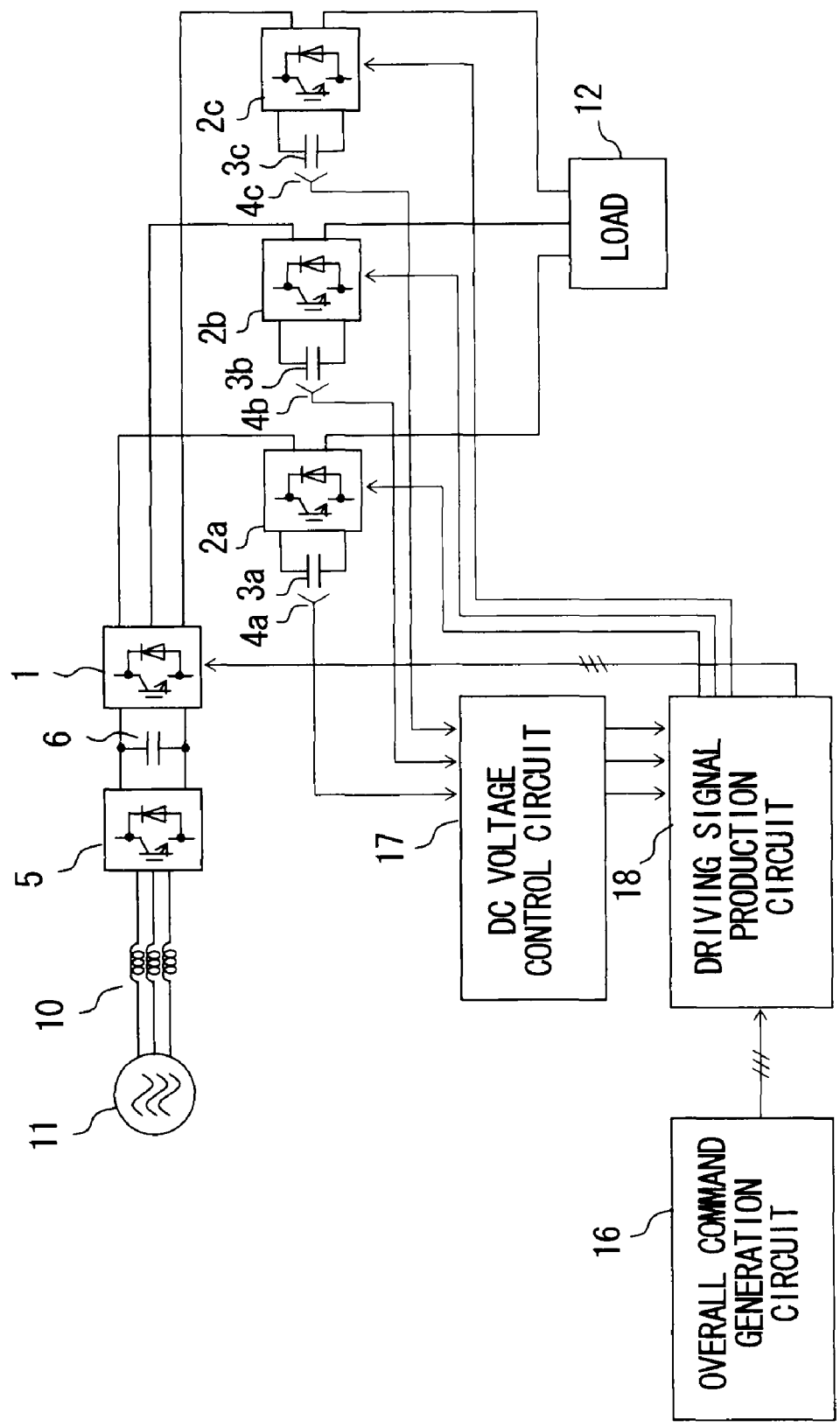
FIG. 8 is a configuration diagram of a power conversion device in accordance with an embodiment 3 of the present invention.

FIG. 8 is a diagram showing the configuration of a power conversion device in accordance with an embodiment 3 of the present invention. A main circuit is identical to that shown in FIG. 1 of the embodiment 1. In the present embodiment, a dq axial voltage command is not employed, but a three-phase instantaneous voltage command is outputted from the overall command generation circuit 16.

As shown in the drawing, the power conversion device includes an overall command generation circuit 16, a DC voltage control circuit 17, and a driving signal production circuit 18, controls the three-phase main inverter 1 and respective single-phase sub-inverters 2a to 2c, and controls the voltages of the smoothing capacitors 3a to 3c that are the DC inputs of the respective single-phase sub-inverters 2a to 2c.

The foregoing overall command generation circuit 16 is a circuit that generates an output voltage command for the load 12, and outputs a desired voltage, which is outputted in total by all of the three-phase main inverter 1 and the single-phase sub-inverters 2a to 2c, as a three-phase instantaneous voltage command $v_u^*$, $v_v^*$, and $v_w^*$.

Figure 9:
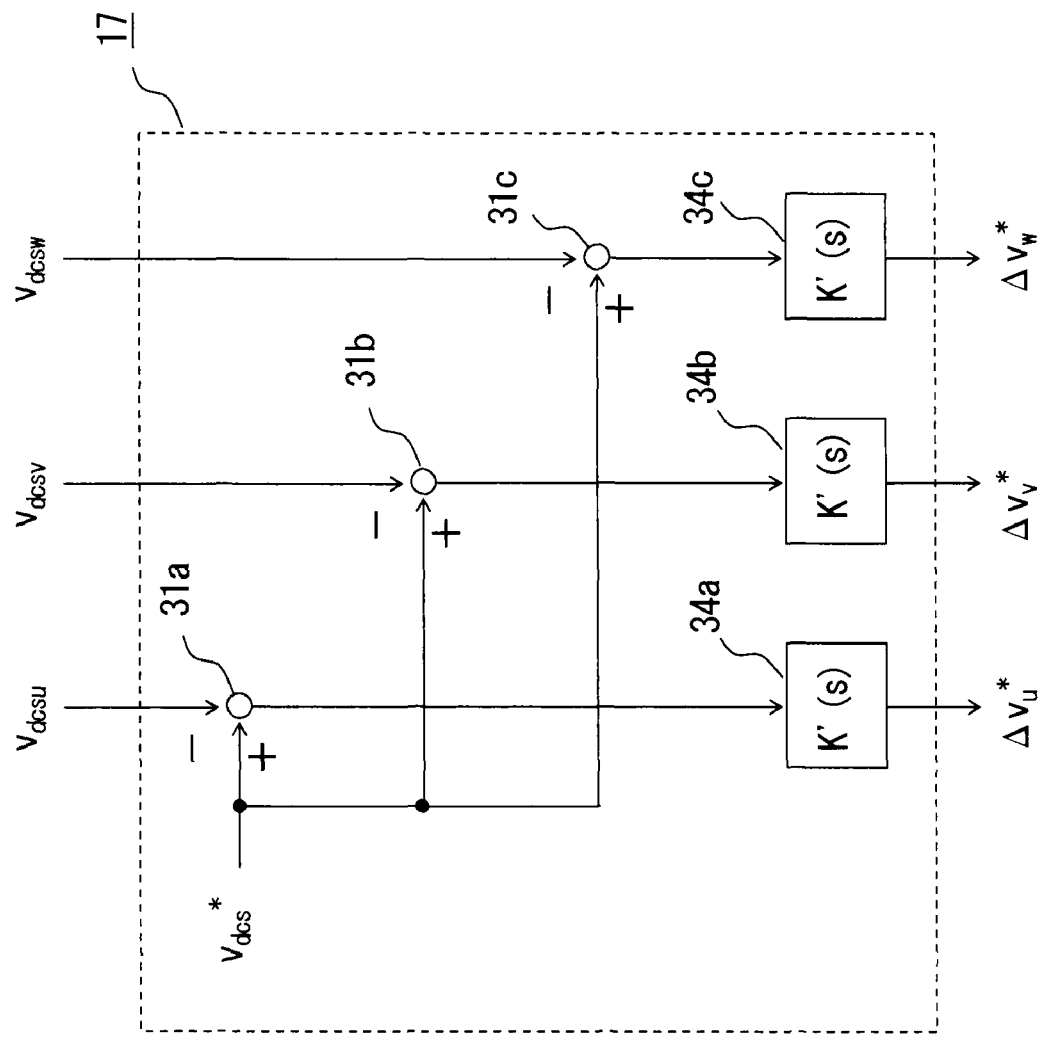
FIG. 9 is a block diagram of a DC voltage control circuit employed in the embodiment 3 of the present invention.

The DC voltage control circuit 17 performs control computation on the basis of the outputs of voltage sensors 4a to 4c that measure the voltages of the respective smoothing capacitors 3a to 3c that are the DC inputs of the single-phase sub-inverters 2a to 2c, and outputs a voltage command representing manipulative quantities. The DC voltage control circuit 17 is constructed as shown in, for example, FIG. 9, wherein subtractors 31a to 31c obtain the deviations between the respective DC voltages $V_{dcsu}$, $V_{dcsv}$, and $V_{dcsw}$ of the smoothing capacitors 3a to 3c of the single-phase sub-inverters 2a to 2c, which are measured by the voltage sensors 4a to 4c, and the command value $V_{dcs}^*$, and controllers 34a to 34c obtain the manipulative quantities. The manipulative quantities are used to adjust the output voltage command for each of the inverters 1 and 2a to 2c so that each of the DC voltages $V_{dcsu}$, $V_{dcsv}$, and $V_{dcsw}$ will follow the command value $V_{dcs}^*$. The manipulative quantities $\Delta v_u^*$, $\Delta v_v^*$, and $\Delta v_w^*$ for the respective phases are outputted. The controllers 34a to 34c may be formed with general PI controls or the like.

Figure 10:
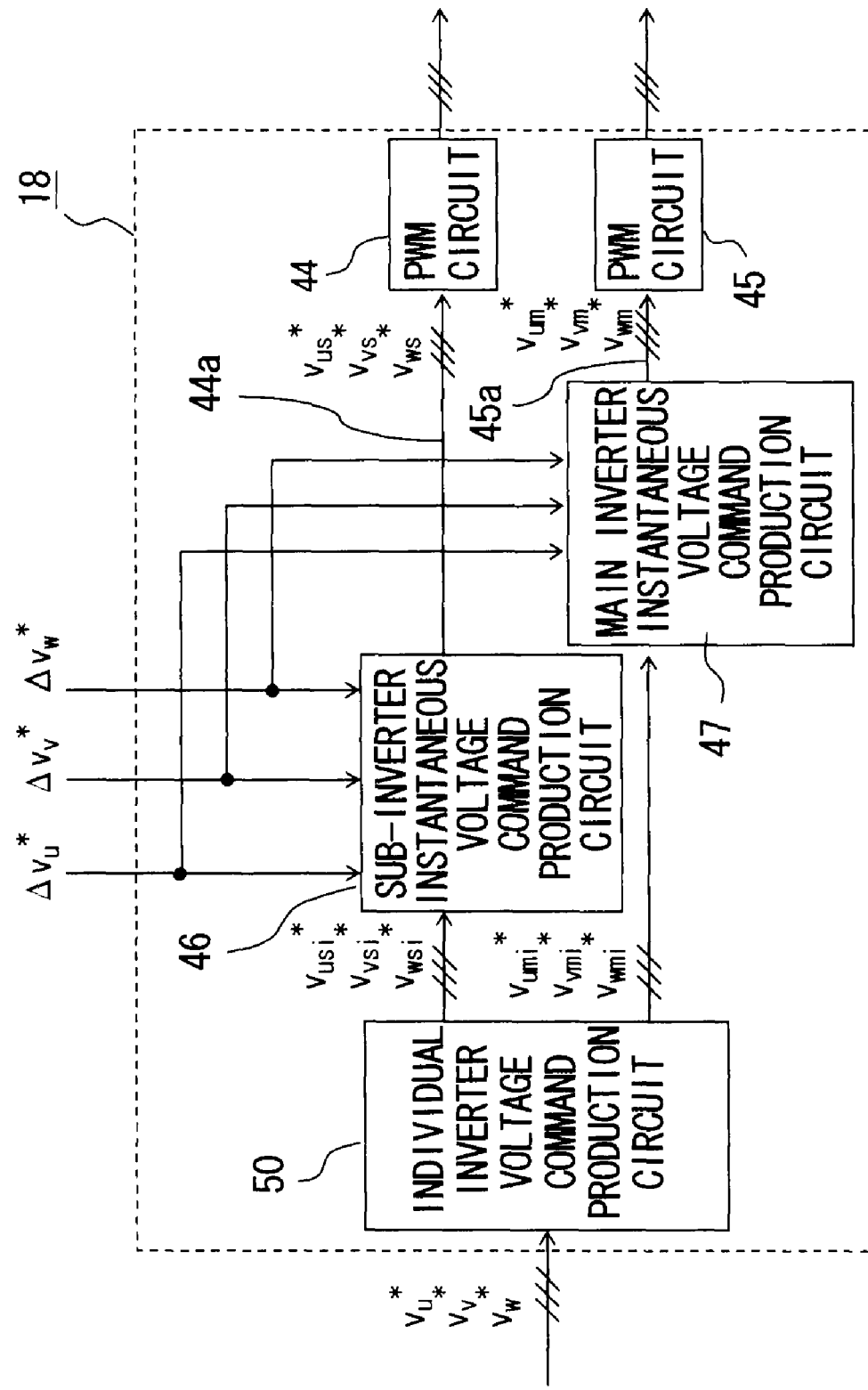
FIG. 10 is a block diagram of a driving signal generation circuit employed in the embodiment 3 of the present invention.

The driving signal production circuit 18 computes a voltage, which is outputted by each of the three-phase main inverter 1 and single-phase sub-inverters 2a to 2c, on the basis of the outputs of the overall command generation circuit 16 and DC voltage control circuit 17, and produces pulses, with which the respective switching elements are driven, through PWM. The driving signal production circuit 18 is constructed as shown in, for example, FIG. 10, wherein an individual inverter voltage command production circuit 50 produces a voltage command $v_{umi}^*$, $v_{vmi}^*$, and $v_{wmi}^*$ for the three-phase main inverter 1 and a voltage command $v_{usi}^*$, $v_{vsi}^*$, and $v_{wsi}^*$ for each of the single-phase sub-inverters 2a to 2c on the basis of an instantaneous voltage command $v_u^*$, $v_v^*$, and $v_w^*$ outputted from the overall command generation circuit 16. The respective voltage commands have relationships expressed by equations (12a), (12b), and (12c) below.

$$v_u^* = v_{umi}^* + v_{usi}^* \tag{12a}$$

$$v_v^* = v_{vmi}^* + v_{vsi}^* \tag{12b}$$

$$v_w^* = v_{wmi}^* + v_{wsi}^* \tag{12c}$$

The production of the voltage command $v_{umi}^*$, $v_{vmi}^*$, and $v_{wmi}^*$ for the three-phase main inverter 1 and the voltage command $v_{usi}^*$, $v_{vsi}^*$, and $v_{wsi}^*$ for each of the single-phase sub-inverters 2a to 2c is not limited to the one based on the equations (12a), (12b), and (12c). An arbitrary means such as a method of determining voltages, which are assigned to the three-phase main inverter 1 and single-phase sub-inverters 2a to 2c, according to the withstand voltage of the switching elements forming each of the inverters 1 and 2a to 2c or a method of keeping a voltage, which is outputted by the three-phase main inverter 1 or each of the single-phase sub-inverters 2a to 2c, constant may be adopted.

A sub-inverter instantaneous voltage command production circuit 46 inputs the sub-inverter voltage command $v_{usi}^*$, $v_{vsi}^*$ and $v_{wsi}^*$ outputted by the individual inverter voltage command production circuit 50, and the manipulative quantities $\Delta v_u^*$, $\Delta v_v^*$, and $\Delta v_w^*$ for the respective phases outputted by the DC voltage control circuit 17, and computes a sub-inverter final voltage command 44a that is a command for a voltage instantaneous value outputted by the single-phase sub-inverters 2a to 2c. Herein, as expressed by equations (13a), (13b), and (13c) below, the manipulative quantities $\Delta v_u^*$, $\Delta v_v^*$, and $\Delta v_w^*$ for the respective phases outputted by the DC voltage control circuit 17 are subtracted from the sub-inverter voltage command $v_{usi}^*$, $v_{vsi}^*$ and $v_{wsi}^*$ outputted by the individual inverter voltage command production circuit 50 in order to compute the sub-inverter final voltage command 44a ($v_{us}^*$, $V_{vs}^*$ and $v_{ws}^*$).

$$v_{us}^* = v_{usi}^* - \Delta v_u^* \tag{13a}$$

$$v_{vs}^* = v_{vsi}^* - \Delta v_v^* \tag{13b}$$

$$v_{ws}^* = v_{wsi}^* - \Delta v_w^* \tag{13c}$$

The thus computed sub-inverter final voltage command 44a is inputted to the PWM circuit 44, and the PWM circuit 44 outputs a voltage pulse signal, which has the pulse width thereof modulated, so as to drive each of the single-phase sub-inverters 2a to 2c.

Moreover, a main inverter instantaneous voltage command production circuit 47 inputs the main inverter voltage command $v_{umi}^*$, $v_{vmi}^*$, and $v_{wmi}^*$ outputted by the individual inverter voltage command production circuit 50, and the manipulative quantities $\Delta v_u^*$, $\Delta v_v^*$, and $\Delta v_w^*$ for the respective phases outputted by the DC voltage control circuit 17, and computes a main inverter final voltage command 45a that is a command for a voltage instantaneous value outputted by the three-phase main inverter 1. Herein, as expressed by equations (14a), (14b), and (14c) below, the manipulative quantities $\Delta v_u^*$, $\Delta v_v^*$, and $\Delta v_w^*$ for the respective phases outputted by the DC voltage control circuit 17 are added to the main inverter voltage command $v_{umi}^*$, $v_{vmi}^*$, and $v_{wmi}^*$ outputted by the individual inverter voltage command production circuit 50 in order to compute the main inverter final voltage command 45a ($v_{um}^*$, $v_{vm}^*$, and $v_{wm}^*$).

$$v_{um}^* = v_{umi}^* + \Delta v_u^* \tag{14a}$$

$$v_{vm}^* = v_{vmi}^* + \Delta v_v^* \tag{14b}$$

$$v_{wm}^* = v_{wmi}^* + \Delta v_w^* \tag{14c}$$

The thus computed main inverter final voltage command 45a is inputted to the PWM circuit 45, and the PWM circuit 45 outputs a voltage pulse signal, which has the pulse width thereof modulated, so as to drive the three-phase main inverter Under the foregoing control, the manipulative quantities $\Delta v_u^*$, $\Delta v_v^*$, and $\Delta v_w^*$ for the respective phases outputted by the DC voltage control circuit 17 are added for computation of the voltage command for the three-phase main inverter 1, and are subtracted for computation of the voltage command for each of the single-phase sub-inverters 2a to 2c. The voltage to be applied to the load 12 is the sum total of the output of the three-phase main inverter 1 and the outputs of the single-phase sub-inverters 2a to 2c. Therefore, the added manipulative quantities and the subtracted manipulative quantities are canceled out. The voltage to be applied to the load 12 is determined with the voltage command $v_u^*$, $v_v^*$, and $v_w^*$ outputted by the overall command generation circuit 16.

Herein, the powers of the three-phase main inverter 1, single-phase sub-inverter 2a, and load 12 for the u phase will be discussed below. Assuming that the power factor of the load 12 is cos θ, the u-phase voltage of the three-phase inverter 1 is $v_{um}$, the voltage of the single-phase sub-inverter 2a is $v_{us}$, the voltage to be applied to the load 12 is $v_u$, a current flowing into the u phase of the load 12 is $i_u$, the active power to be fed to the load 12 by the u phase of the three-phase main inverter 1 and the sub-inverter 2a is $p_u$, the active power $p_u$ is expressed by an equation (15) below.

$$p_u = v_u \cdot i_u \cdot \cos\theta \qquad (15)$$
$$= (v_{um} + v_{us}) \cdot i_u \cdot \cos\theta$$

Among voltage components contained in each of the voltages $v_{um}$, and $v_{us}$ outputted by the u phase of the three-phase main inverter 1 and the sub-inverter 2a, a component caused by the u-phase voltage command $V_{umi}^*$ or $v_{usi}^*$ outputted by the individual inverter voltage command production circuit 50 shall be $v_{umi}$ or $v_{usi}$, and a component caused by the u-phase manipulative quantity $\Delta v_u^*$ outputted by the DC voltage control circuit 17 shall be $\Delta v_u$. The active power outputted by the u phase of the three-phase main inverter 1 shall be $p_{um}$, and the active power outputted by the single-phase sub inverter 2a shall be pus. Assuming that $\Delta v_u$ is a DC component, the relational equations (16a), (16b), and (17) below are established.

$$p_{um} = (v_{um} \cdot \cos\theta + \Delta v_u) \cdot i_u \qquad (16a)$$
$$p_{us} = (v_{us} \cdot \cos\theta - \Delta v_u) \cdot i_u \qquad (16b)$$
$$p_u = p_{um} + p_{us} \qquad (17)$$

From the equations (16a), (16b), and (17), it is understood that $\Delta v_u \cdot i_u$ out of the active power outputted from the u phase of the three-phase main inverter 1 is a component which is fed to the single-phase sub-inverter 2a but is not fed to the load 12. If power consumption caused by a loss occurring in the single-phase sub-inverter 2a is ignored, $\Delta v_u \cdot i_u$ charges the smoothing capacitor 3a of the single-phase sub-inverter 2a, and the voltage of the smoothing capacitor 3a increases. Moreover, if $\Delta v_u \cdot i_u$ takes on a negative value oppositely, the voltage of the smoothing capacitor 3a is lowered.

The voltage of the smoothing capacitor 3a of the single-phase sub-inverter 2a is controlled as mentioned above. Nevertheless, since the u-phase manipulative quantity $\Delta v_u^*$ is determined so that the DC voltage $v_{dcsu}$ of the smoothing capacitor 3a will follow the command value $v_{dcs}^*$, a desired voltage can be sustained highly reliably. Incidentally, the same as that to the u phase can apply to the v and w phases.

As mentioned above, according to the present embodiment, in the power conversion device that controls an instantaneous value of a voltage or a current, since the manipulative quantities are determined so that each of the DC voltages $v_{dcsu}$, $v_{dcsv}$, and $V_{dcsw}$ of the smoothing capacitors 3a to 3c of the single-phase sub-inverters 2a to 2c will follow the command value $v_{dcs}^*$, and an output voltage command for each of the inverters 1 and 2a to 2c is adjusted, each of the DC voltages $v_{dcsu}$, $v_{dcsv}$, and $V_{dcsw}$ of the smoothing capacitors 3a to 3c is controlled to be sustained at a desired voltage. Consequently, the desired DC voltage can be sustained at each of the smoothing capacitors 3a to 3c of the single-phase sub-inverters 2a to 2c without feed of power from another power supply. Simplification of a device configuration and cost reduction such as exclusion of converters for the single-phase sub-inverters 2a to 2c or replacement of a multi-winding transformer with a reactor can be achieved.

Incidentally, due to an error of each of the control circuits, when the output voltage command for each of the inverters 1 and 2a to 2c is merely adjusted, if DC voltage control for each of the smoothing capacitors 3a to 3c cannot be highly precisely achieved, a converter is provided in order to feed power from the AC power supply 11. In this case, the capacity of the converter may be much smaller than the conventional one, and the device configuration can be fully simplified.

In the embodiment 3, the three-phase main inverter 1 is a three-phase full-bridge inverter. Even when three single-phase full-bridge inverters like the single-phase sub-inverters 2a to 2c or the like are employed, the same control can be achieved. Moreover, even when the three-phase main inverter 1 and single-phase sub-inverters 2a to 2c are three-level inverters, the same control can be achieved. Moreover, the converter 5 may be a diode converter if power need not be restored to the AC power supply 11.

Embodiment 4

In the foregoing embodiment 3, in the driving signal production circuit 18, a voltage command is produced for not only the three-phase main inverter 1 but also the single-phase sub-inverters 2a to 2c on the basis of the instantaneous voltage command $v_u^*$, $v_v^*$, and $v_w^*$ outputted from the overall command generation circuit 16. In the present embodiment, the single-phase sub-inverters 2a to 2c are operated as inverters to be used to output a voltage that cancels voltage harmonics outputted by the three-phase main inverter 1.

Figure 11:
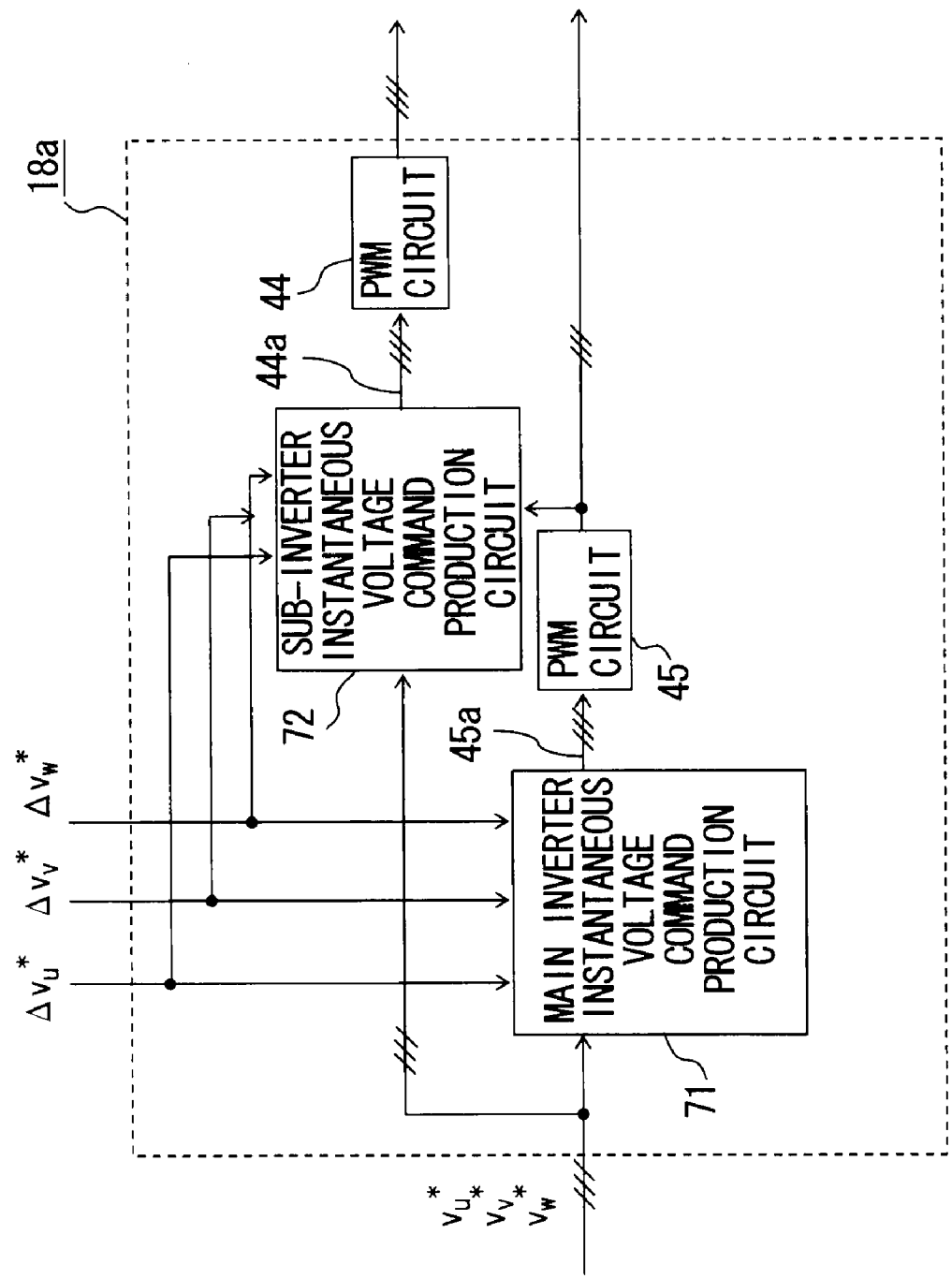
FIG. 11 is a block diagram of a driving signal generation circuit employed in an embodiment 4 of the present invention.

In this case, instead of the driving signal production circuit 18 in the embodiment 3, a driving signal production circuit 18a shown in FIG. 11 is employed. The other circuit components are identical to those of the embodiment 3.

The driving signal production circuit 18a computes a voltage, which is outputted by each of the three-phase main inverter 1 and single-phase sub-inverters 2a to 2c, on the basis of the outputs of the overall command generation circuit 16 and DC voltage control circuit 17, and produces pulses, with which the respective switching elements are driven, through PWM. As shown in FIG. 11, a main inverter instantaneous voltage command production circuit 71 inputs an instantaneous voltage command $v_u^*$, $v_v^*$, and $v_w^*$ outputted from the overall command generation circuit 16, and manipulative quantities $\Delta v_u^*$, $\Delta v_v^*$, and $\Delta v_w^*$ outputted by the DC voltage control circuit 17, and computes a main inverter final voltage command 45a that is a command for a voltage instantaneous value outputted by the three-phase main inverter 1.

In this case, as expressed by equations (18a), (18b), and (18c) below, the manipulative quantities $\Delta v_u^*$, $\Delta v_v^*$, and $\Delta v_w^*$ for the respective phases outputted from the DC voltage control circuit 17 are added to the instantaneous voltage command $v_u^*$, $v_v^*$, and $v_w^*$ in order to compute the main inverter final voltage command 45a ($v_{um}^*$, $v_{vm}^*$, and $v_{wm}^*$)

$$v_{um}^* = v_u^* + \Delta v_u^* \quad (18a)$$

$$v_{vm}^* = v_v^* + \Delta v_v^* \quad (18b)$$

$$v_{wm}^* = v_w^* + \Delta v_w^* \quad (18c)$$

The thus computed main inverter final voltage command 45a is inputted to the PWM circuit 45, and the PWM circuit 45 outputs a voltage pulse signal, which has the pulse width thereof modulated, so as to drive the three-phase main inverter 1.

A sub-inverter instantaneous voltage command production circuit 72 inputs the voltage command $v_u^*$, $v_v^*$, and $v_w^*$ outputted from the overall command generation circuit 16, and the manipulative quantities $\Delta v_u^*$, $\Delta v_v^*$, and $\Delta v_w^*$ for the respective phases outputted from the DC voltage control circuit 17, and further inputs a voltage pulse signal $v_{umpwm}$, $v_{vmpwm}$, and $v_{wmpwm}$ for the three-phase main inverter 1 outputted by the PWM circuit 45. Based on the input signals, the sub-inverter instantaneous voltage command production circuit 72 computes a sub-inverter final voltage command 44a ($v_{us}^*$, $v_{vs}^*$, and $v_{ws}^*$), which is a command for a voltage instantaneous value outputted by the single-phase sub-inverters 2a to 2c, according to equations (19a), (19b), and (19c) below.

$$v_{us}^* = v_u^* - \Delta v_u^* - v_{umpwm} \quad (19a)$$

$$v_{vs}^* = v_v^* - \Delta v_v^* - v_{vmpwm} \quad (19b)$$

$$v_{ws}^* = v_w^* - \Delta v_w^* - v_{wmpwm} \quad (19c)$$

The thus computed sub-inverter final voltage command 44a is inputted to the PWM circuit 44, and the PWM circuit 44 outputs a voltage pulse signal, which has the pulse width thereof modulated, so as to drive each of the single-phase sub-inverters 2a to 2c.

Under the foregoing control, the three-phase main inverter 1 outputs a voltage caused by an output voltage command having the manipulative quantities $\Delta v_u^*$, $\Delta v_v^*$, and $\Delta v_w^*$ for the respective phases, which are outputted by the DC voltage control circuit 17, added to the instantaneous voltage command $v_u^*$, $v_v^*$, and $v_w^*$ outputted from the overall command generation circuit 16.

The single-phase sub-inverters 2a to 2c each output a voltage caused by an output voltage command having the manipulative quantities $\Delta v_u^*$, $\Delta v_v^*$, and $\Delta v_w^*$ for the respective phases, which are outputted by the DC voltage control circuit 17, and the voltage pulse signal $v_{umpwm}$, $v_{vmpwm}$, and $v_{wmpwm}$ for the three-phase main inverter 1 subtracted from the instantaneous voltage command $v_u^*$, $v_v^*$, and $v_w^*$ outputted from the overall command generation circuit 16. Since the voltage pulse signal $v_{umpwm}$, $v_{vmpwm}$, and $v_{wmpwm}$ is subtracted from the signal of the instantaneous voltage command $v_u^*$, $v_v^*$, and $v_w^*$, the fundamental wave component of an instantaneous voltage is canceled. The sub-inverter final voltage command 44a becomes a command causing output of a voltage that is in opposite phase with harmonics outputted from the three-phase main inverter 1. The single-phase sub-inverters 2a to 2c operate to cancel the voltage harmonics outputted by the three-phase main inverter 1.

Further, similarly to the embodiment 3, the manipulative quantities $\Delta v_u^*$, $\Delta v_v^*$, and $\Delta v_w^*$ for the respective phases, which are outputted by the DC voltage control circuit 17, are added for computation of the voltage command for the three-phase main inverter 1, and are subtracted for computation of the voltage command for each of the single-phase sub-inverters 2a to 2c. Consequently, similarly to the embodiment 3, for example, for the u phase, $\Delta v_u \cdot i_u$ out of an active power outputted by the three-phase main inverter 1 is fed to the single-phase sub-inverter 2a in order to charge the smoothing capacitor 3a of the single-phase sub-inverter 2a. When $\Delta v_u \cdot i_u$ takes on a positive value, the voltage of the smoothing capacitor 3a increases. When $\Delta v_u \cdot i_u$ takes on a negative value, oppositely, the voltage of the smoothing capacitor 3a is lowered. The voltage of the smoothing capacitor 3a of the single-phase sub-inverter 2a is thus controlled. Nevertheless, since the u-phase manipulative quantity $\Delta v_u^*$ is determined so that the DC voltage $v_{dcsu}$ of the smoothing capacitor 3a will follow the command value $v_{dcs}^*$, a desired voltage can be sustained highly reliably. Incidentally, the same as that to the u phase can apply to the v and w phases.

A voltage outputted by the three-phase main inverter 1 contains harmonics due to PWM control. In the present embodiment, since the single-phase sub-inverters 2a to 2c are operated to cancel the voltage harmonics outputted by the three-phase main inverter 1, the voltage to be fed to the load 12 has the harmonics suppressed.

Moreover, since the manipulative quantities are determined so that each of the DC voltages $v_{dcsu}$, $V_{dcsv}$, and $V_{dcsw}$ of the smoothing capacitors 3a to 3c of the single-phase sub-inverters 2a to 2c will follow the command value $V_{dcs}^*$, and the output voltage command for each of the inverters 1 and 2a to 2c is adjusted, each of the DC voltages $v_{dcsu}$, $V_{dcsv}$, and $V_{dcsw}$ of the smoothing capacitors 3a to 3c is controlled to be sustained at a desired voltage. Consequently, the same advantage as that of the embodiment 3 can be exerted. The desired DC voltage can be sustained in each of the smoothing capacitors 3a to 3c of the single-phase sub-inverters 2a to 2c without feed of power from another power supply. Simplification of a device configuration and cost reduction such as exclusion/simplification of converters for the single-phase sub-inverters 2a to 2c and replacement of a multi-winding transformer with a reactor can be achieved.

Embodiment 5

Figure 12:
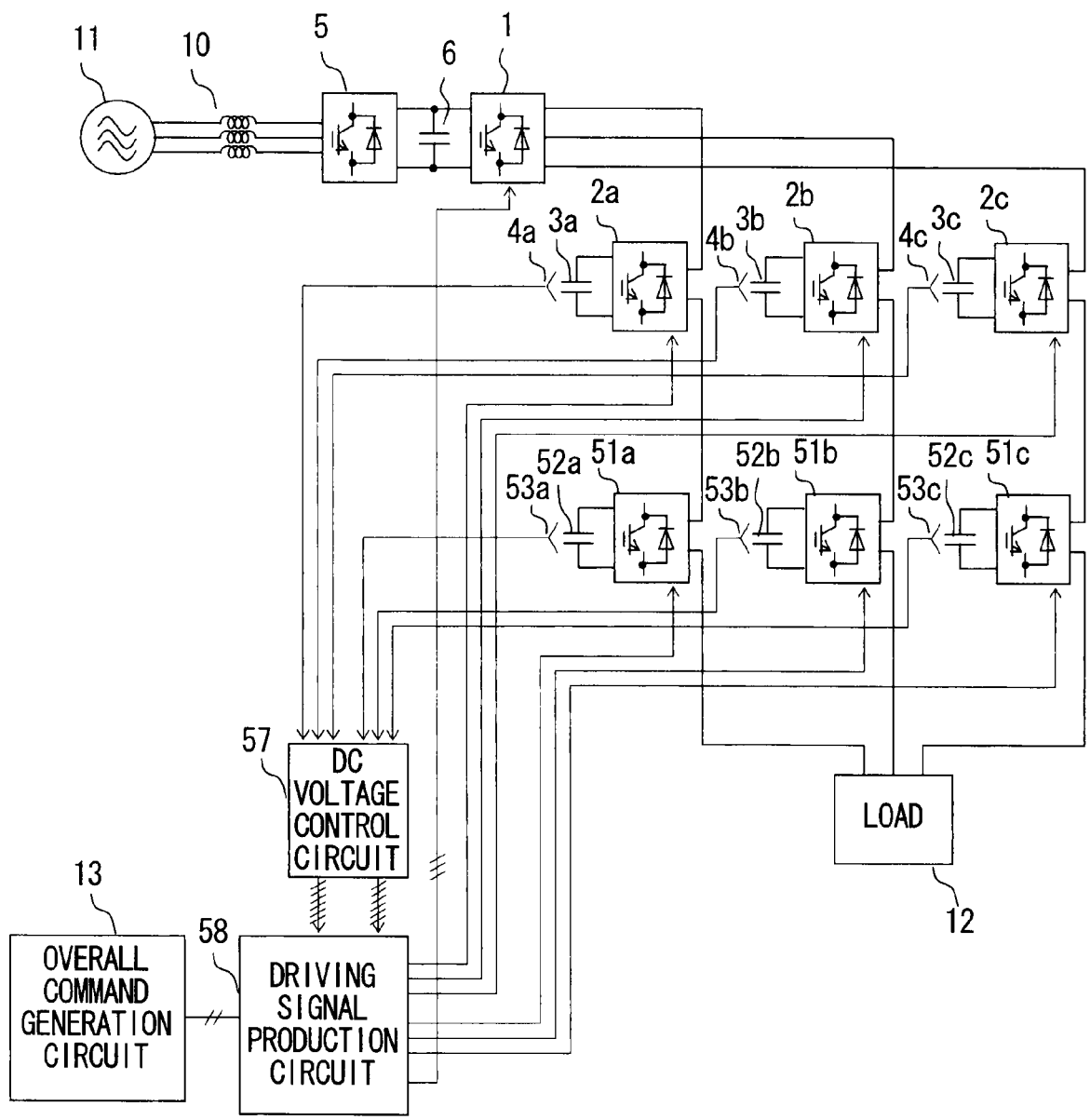
FIG. 12 is a configuration diagram of a power conversion device in accordance with an embodiment 5 of the present invention.

FIG. 12 is a diagram showing the configuration of a power conversion device in accordance with an embodiment 5 of the present invention. In the embodiments 1 to 4, the power conversion device has the single-phase sub-inverters 2a to 2c of which the AC sides of the respective phases connected in series with the respective phase output lines on the AC side of the three-phase main inverter 1. In the present embodiment, the AC sides of two sub-inverters, that is, each of the single-phase sub-inverters 2a to 2c and each of single-phase sub-inverters 51a to 51c that are second single-phase inverters are connected in series with each of the phase output lines on the AC side of the three-phase main inverter 1 (first single-phase inverters for three phases). For convenience' sake hereinafter, the single-phase sub-inverters 2a to 2c shall be called a sub-inverter 1 group and the single-phase sub-inverters 51a to 51c shall be called a sub-inverter 2 group. Incidentally, the configuration of each of the single-phase sub-inverters 51a to 51c is identical to that of the single-phase sub-inverters 2a to 2c shown in FIG. 4.

The three-phase main inverter 1 has a smoothing capacitor 6 as a first DC power supply on the DC side thereof, and further has a converter 5 connected in parallel therewith. On the AC side of the converter 5, an AC power supply 11 is connected via a reactor 10. The single-phase sub-inverters 2a to 2c have smoothing capacitors 3a to 3c as second DC power supplies on the DC sides thereof. The single-phase sub-inverters 51a to 51c have smoothing capacitors 52a to 52c as second DC power supplies on the DC sides thereof.

Moreover, the power conversion device has an overall command generation circuit 13, a DC voltage control circuit 57, and a driving signal production circuit 58 for the purpose of controlling the three-phase main inverter 1 and respective single-phase sub-inverters 2a to 2c and 51a to 51c and controlling the voltages of the smoothing capacitors 3a to 3c and 52a to 52c that are the DC inputs of the respective single-phase sub-inverters 2a to 2c and 51a to 51c.

The overall command generation circuit 13 is a circuit that generates an output voltage command for the load 12, and a control circuit that outputs a desired voltage, which is outputted in total by all of the three-phase main inverter 1 and single-phase sub-inverters 2a to 2c and 51a to 51c, as a dq-axis voltage command $v_d^*$ and $v_q^*$.

Figure 13:
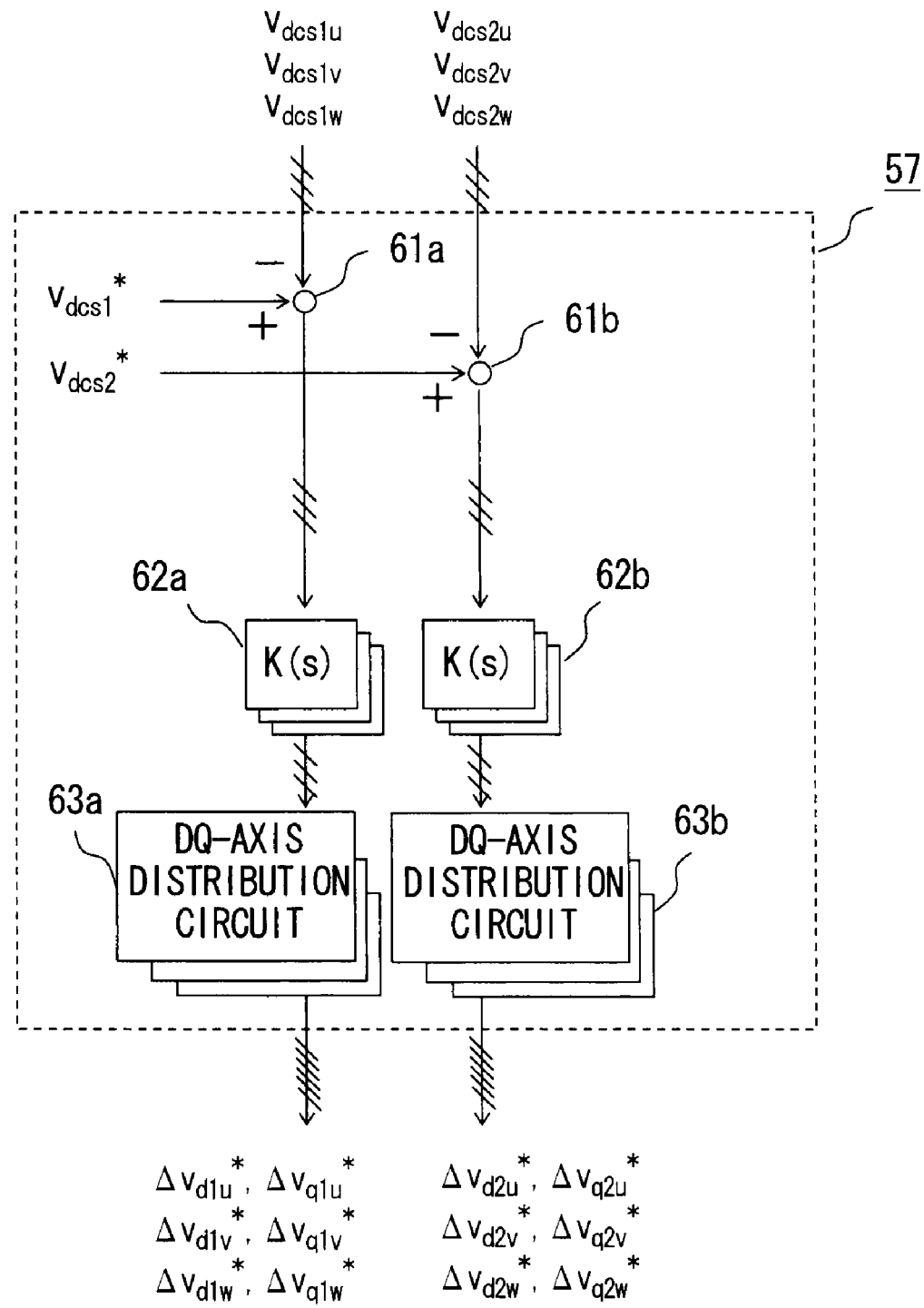
FIG. 13 is a block diagram of a DC voltage control circuit employed in the embodiment 5 of the present invention.

The DC voltage control circuit 57 performs control computation on the basis of the outputs of voltage sensors 4a to 4c and 53a to 53c that measure the voltages of the smoothing capacitors 3a to 3c and 52a to 52c that are the DC inputs of the respective single-phase sub-inverters 2a to 2c and 51a to 51c, and outputs a voltage command as manipulative quantities. The DC voltage control circuit 57 is constructed as shown in, for example, FIG. 13, wherein a subtractor 61a obtains the deviations between the DC voltages $v_{dcs1u}$, $v_{dcs1v}$, and $v_{dcs1w}$ of the smoothing capacitors 3a to 3c of the sub-inverter 1 group, which are measured by the voltage sensors 4a to 4c, and a command value $v_{dcs1}^*$, and a controller 62a obtains manipulative quantities. The d-axis manipulative quantities and q-axis manipulative quantities, $\Delta v_{d1u}^*$, $\Delta v_{q1u}^*$, $\Delta v_{d1v}^*$, $\Delta v_{q1v}^*$, $\Delta v_{d1w}^*$, and $\Delta v_{q1w}^*$, which are d-axis components and q-axis components into which the manipulative quantities are divided by a dq-axis distribution circuit 63a, are outputted.

The controller 62a may be formed with a general PI control or the like. As for a method according to which the dq-axis distribution circuit 63a distributes the manipulative quantities, which are outputted from the controller 62a, into the d-axis components and q-axis components, a method that matches the type of load or the purpose of use of the power conversion device may be selected. An arbitrary method such as a method of equalizing the components on the d axis and the components on the q axis or a method employing only the d axis or q axis can be adopted.

The same applies to the sub-inverter 2 group. A subtractor 61b obtains the deviations between the DC voltages $v_{dcs2u}$, $v_{dcs2v}$, and $v_{dcs2w}$ of the smoothing capacitors 52a to 52c of the sub-inverter 2 group, which are measured by the voltage sensors 53a to 53c, and a command value $v_{dcs2}^*$, and a controller 62b obtains manipulative quantities. The d-axis manipulative quantities and q-axis manipulative quantities $\Delta v_{d2u}^*$, $\Delta v_{q2u}^*$, $\Delta v_{d2v}^*$, $\Delta v_{q2v}^*$, $\Delta v_{d2w}^*$, and $\Delta v_{q2w}^*$ that are d-axis components and q-axis components into which the manipulative quantities are divided by a dq-axis distribution circuit 63b are outputted. Herein, each of the subtractors 61a and 61b, controllers 62a and 62b, and dq-axis distribution circuits 63a and 63b has three phases separately constructed.

Figure 14:
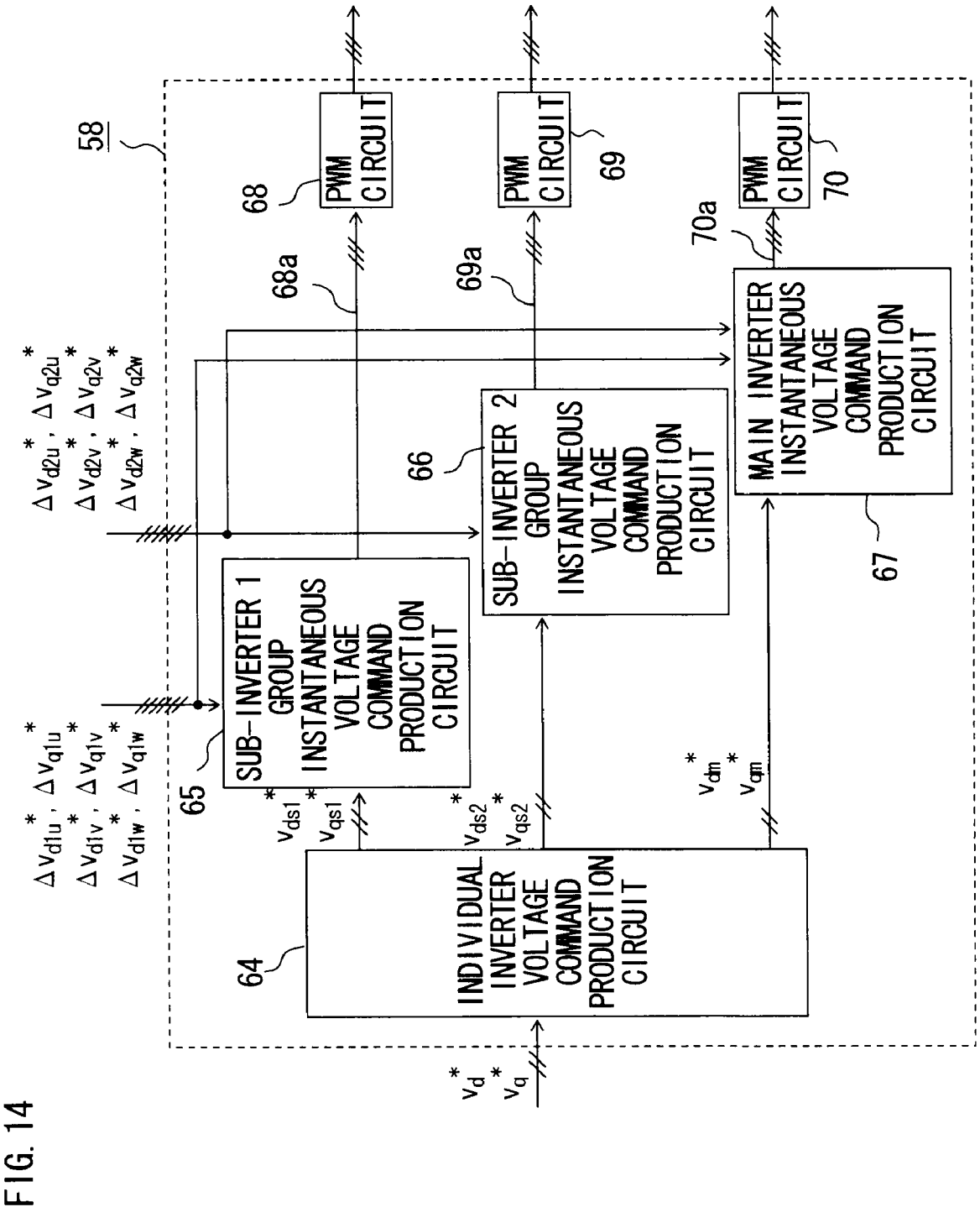
FIG. 14 is a block diagram of a driving signal generation circuit employed in the embodiment 5 of the present invention.

The driving signal production circuit 58 computes a voltage, which is outputted by each of the three-phase main inverter 1 and single-phase sub-inverter 2a to 2c and 51a to 51c, on the basis of the outputs of the overall command generation circuit 13 and DC voltage control circuit 57, and produces pulses, with which the respective switching elements are driven, through PWM. The driving signal production circuit 58 is constructed as shown in, for example, FIG. 14, wherein an individual inverter voltage command production circuit 64 produces a dq-axis voltage command $v_{dm}^*$ and $v_{qm}^*$ for the three-phase main inverter 1, a dq-axis voltage command $v_{ds1}^*$ and $v_{qs1}^*$ for the sub-inverter 1 group, and a dq-axis voltage command $v_{ds2}^*$ and $v_{qs2}^*$ for the sub-inverter 2 group on the basis of a dq-axis voltage command $V_d^*$ and $V_q^*$, which is outputted from the overall command generation circuit 13. At this time, the respective dq-axis voltage commands have relationships expressed by equations (20a) and (20b) below.

$$v_d^* = v_{dm}^* + V_{ds1}^* + v_{ds2}^* \tag{20a}$$

$$v_q^* = v_{qm}^* + V_{qs1}^* + V_{qs2}^* \tag{20b}$$

As the production method, an arbitrary means such as a method of determining voltages, which are assigned to the three-phase main inverter 1, sub-inverter 1 group, and sub-inverter 2 group, according to the withstand voltage of the switching elements forming the respective inverters 1, 2a to 2c, and 51a to 51c, or a method of keeping the voltage, which is outputted by the three-phase main inverter 1, constant may be adopted.

A sub-inverter 1 group instantaneous voltage command production circuit 65 inputs the sub-inverter dq-axis voltage command $v_{ds1}^*$ and $v_{qs1}^*$ of the sub-inverter 1 group, which is outputted by the individual inverter voltage command production circuit 64, and the dq axial manipulative quantities $\Delta v_{d1u}^*$, $\Delta v_{q1u}^*$, $\Delta v_{d1v}^*$, $\Delta v_{q1v}^*$, $\Delta v_{d1w}^*$, and $\Delta v_{q1w}^*$ for the sub-inverter 1 group which are outputted by the DC voltage control circuit 57, and computes a sub-inverter final voltage command 68a ($v_{us1}^*$, $v_{vs1}^*$, and $v_{ws1}^*$), which is a command for a voltage instantaneous value to be outputted by the sub-inverter group, according to equations (21a), (21b), and (21c) below.

$$v_{us1}^* = \sqrt{\frac{2}{3}} \, [\cos\theta \quad -\sin\theta] \begin{bmatrix} v_{ds1}^* - \Delta v_{du1}^* \\ v_{qs1}^* - \Delta v_{qu1}^* \end{bmatrix} \tag{21a}$$

$$v_{vs1}^* = \sqrt{\frac{2}{3}} \, \left[\cos\left(\theta - \frac{2\pi}{3}\right) \quad -\sin\left(\theta - \frac{2\pi}{3}\right)\right] \begin{bmatrix} v_{ds1}^* - \Delta v_{dv1}^* \\ v_{qs1}^* - \Delta v_{qv1}^* \end{bmatrix} \tag{21b}$$

$$v_{ws1}^* = \sqrt{\frac{2}{3}} \, \left[\cos\left(\theta + \frac{2\pi}{3}\right) \quad -\sin\left(\theta + \frac{2\pi}{3}\right)\right] \begin{bmatrix} v_{ds1}^* - \Delta v_{dw1}^* \\ v_{qs1}^* - \Delta v_{qw1}^* \end{bmatrix} \tag{21c}$$

The thus computed sub-inverter final voltage command 68a is inputted to a PWM circuit 68, and the PWM circuit 68 outputs a voltage pulse signal, which has the pulse width thereof modulated, so as to drive each of the single-phase sub-inverters 2a to 2c of the sub-inverter 1 group.

Likewise, as for the sub-inverter 2 group, a sub-inverter 2 group instantaneous voltage command production circuit 66 computes a sub-inverter final voltage command 69a ($v_{us2}^*$, $v_{vs2}^*$, and $v_{ws2}^*$) according to equations (22a), (22b), and (22c) below.

$$v_{us2}^* = \sqrt{\frac{2}{3}} \, [\cos\theta \quad -\sin\theta] \begin{bmatrix} v_{ds2}^* - \Delta v_{du2}^* \\ v_{qs2}^* - \Delta v_{qu2}^* \end{bmatrix} \tag{22a}$$

$$v_{vs2}^* = \sqrt{\frac{2}{3}} \, \left[\cos\left(\theta - \frac{2\pi}{3}\right) \quad -\sin\left(\theta - \frac{2\pi}{3}\right)\right] \begin{bmatrix} v_{ds2}^* - \Delta v_{dv2}^* \\ v_{qs2}^* - \Delta v_{qv2}^* \end{bmatrix} \tag{22b}$$

$$v_{ws2}^* = \sqrt{\frac{2}{3}} \, \left[\cos\left(\theta + \frac{2\pi}{3}\right) \quad -\sin\left(\theta + \frac{2\pi}{3}\right)\right] \begin{bmatrix} v_{ds2}^* - \Delta v_{dw2}^* \\ v_{qs2}^* - \Delta v_{qw2}^* \end{bmatrix} \tag{22c}$$

The thus computed sub-inverter final voltage command 69a is inputted to a PWM circuit 69, and the PWM circuit 69 outputs a voltage pulse signal, which has the pulse width thereof modulated, so as to drive each of the single-phase sub-inverters 51a to 51c of the sub-inverter 2 group.

A main inverter instantaneous voltage command production circuit 67 inputs the main inverter dq-axis voltage command $v_{dm}^*$ and $v_{qm}^*$, which is outputted by the individual inverter voltage command production circuit 64, the d- and q-axis manipulative quantities $\Delta v_{d1u}^*$, $\Delta v_{q1u}^*$, $\Delta v_{d1v}^*$, $\Delta v_{q1v}^*$, $\Delta v_{d1w}^*$, $\Delta v_{q1w}^*$, $\Delta v_{d2u}^*$, $\Delta v_{q2u}^*$, $\Delta v_{d2v}^*$, $\Delta v_{q2v}^*$, $\Delta v_{d2w}^*$, and $\Delta v_{q2w}^*$, which are outputted by the DC voltage control circuit 57, and computes a main inverter final voltage command 70a ($v_{um}^*$, $v_{vm}^*$, and $v_{wm}^*$), which is a command for a voltage instantaneous value outputted by the three-phase main inverter 1, according to equations (23a), (23b), and (23c) below.

$$v_{um}^* = \sqrt{\frac{2}{3}} \left[\cos\theta \quad -\sin\theta\right] \begin{bmatrix} v_{dm}^* + \Delta v_{du1}^* + \Delta v_{du2}^* \\ v_{qm}^* + \Delta v_{qu1}^* + \Delta v_{qu2}^* \end{bmatrix} \quad (23a)$$

$$v_{vm}^* = \sqrt{\frac{2}{3}} \left[\cos\left(\theta - \frac{2\pi}{3}\right) \quad -\sin\left(\theta - \frac{2\pi}{3}\right)\right] \begin{bmatrix} v_{dm}^* + \Delta v_{dv1}^* + \Delta v_{dv2}^* \\ v_{qm}^* + \Delta v_{qv1}^* + \Delta v_{qv2}^* \end{bmatrix} \quad (23b)$$

$$v_{wm}^* = \sqrt{\frac{2}{3}} \left[\cos\left(\theta + \frac{2\pi}{3}\right) \quad -\sin\left(\theta + \frac{2\pi}{3}\right)\right] \begin{bmatrix} v_{dm}^* + \Delta v_{dw1}^* + \Delta v_{dw2}^* \\ v_{qm}^* + \Delta v_{qw1}^* + \Delta v_{qw2}^* \end{bmatrix} \quad (23c)$$

The thus computed main inverter final voltage command 70a is inputted to a PWM circuit 70, and the PWM circuit 70 outputs a voltage pulse signal, which has the pulse width thereof modulated, so as to drive the three-phase main inverter.

As mentioned above, since the three-phase main inverter 1, sub-inverter 1 group, and sub-inverter 2 group are connected in series with one another, a voltage to be applied to the load 12 is the sum total of the voltages to be outputted by the three-phase main inverter 1, sub-inverter 1 group, and sub-inverter 2 group. The d- and q-axis manipulative quantities $\Delta v_{d1u}^*$, $\Delta v_{q1u}^*$, $\Delta v_{d1v}^*$, $\Delta v_{q1v}^*$, $\Delta v_{d1w}^*$, $\Delta v_{q1w}^*$, $\Delta v_{d2u}^*$, $\Delta v_{q2u}^*$, $\Delta v_{d2v}^*$, $\Delta v_{q2v}^*$, $\Delta v_{d2w}^*$, and $\Delta v_{q2w}^*$, which are outputted by the DC voltage control circuit 57, are added for computation of the voltage command for the three-phase main inverter 1, and are subtracted for computation of the voltage command for the sub-inverter 1 group or sub-inverter 2 group. Consequently, the added manipulative quantities and subtracted manipulative quantities are canceled out. The voltage to be applied to the load 12 is determined by the voltage command $v_d^*$ and $v_q^*$ which is outputted by the overall command generation circuit 13.

A voltage that is expressed on the d and q axes and is applied to the load 12 shall be $v_d$ and $v_q$, and a current that is expressed on the d and q axes and flows into the load 12 shall be $i_d$ and $i_q$. Moreover, assuming that voltage components caused by the d- and q-axis voltage commands $v_{dm}^*$, $v_{qm}^*$, $v_{ds1}^*$, $v_{qs1}^*$, $v_{ds2}^*$, and $v_{qs2}^*$ outputted by the individual inverter voltage command production circuit 64 are $v_{dm}$, $v_{qm}$, $v_{ds1}$, $v_{qs1}$, $v_{ds2}$, and $v_{qs2}$, and an active power to be fed to the load 12 is p, p is expressed by an equation (24) below.

$$p = v_d \cdot i_d + v_q \cdot i_q \quad (24)$$
$$= (v_{dm} + v_{ds1} + v_{ds2}) \cdot i_d + (v_{qm} + v_{qs1} + v_{qs2}) \cdot i_q$$

Since the active power p is a three-phase power, an active power $p_u$ of, for example, the u phase is expressed by an equation (25) below.

$$p_u = p/3 \quad (25)$$
$$= (v_d \cdot i_d + v_q \cdot i_q)/3$$
$$= \{(v_{dm} + v_{ds1} + v_{ds2}) \cdot i_d + (v_{qm} + v_{qs1} + v_{qs2}) \cdot i_q\}/3$$

On the other hand, assuming that the active power of the u phase of the three-phase main inverter 1 is $p_{mu}$, the active power of the single-phase sub-inverter 2a is $p_{s1u}$, the active power of the single-phase sub-inverter 51a is $p_{s2u}$, and voltage components caused by the d- and q-axis manipulative quantities $\Delta v_{d1u}^*$, $\Delta v_{q1u}^*$, $\Delta v_{d2u}^*$, and $\Delta v_{q2u}^*$ for the u phase outputted by the DC voltage control circuit 57 are $\Delta v_{d1u}$, $\Delta v_{q1u}$, $\Delta v_{d2u}$, and $\Delta v_{q2u}$, $p_{mu}$, $p_{s1u}$, and $p_{s2u}$ can be expressed in the same manner as that by the equation (25), and are expressed by equations (26) to (28) below.

$$p_{mu} = \{(v_{dm} + \Delta v_{d1u} + \Delta v_{d2u}) \cdot i_d + (v_{qm} + \Delta v_{q1u} + v_{q2u}) \cdot i_q\}/3 \quad (26)$$

$$p_{s1u} = \{(v_{ds} - \Delta v_{d1u}) \cdot i_d + (v_{qs} - \Delta v_{q1u}) \cdot i_q\}/3 \quad (27)$$

$$p_{s2u} = \{(v_{ds} - \Delta v_{d2u}) \cdot i_d + (v_{qs} - \Delta v_{q2u}) \cdot i_q\}/3 \quad (28)$$

Moreover, $P_u$, $p_{mu}$, $p_{s1u}$, and $p_{s2u}$ have a relationship expressed by an equation (29) below established.

$$p_u = p_{mu} + p_{s1u} + p_{s2u} \quad (29)$$

From the equations (26) to (29), it is understood that $(\Delta v_{d1u} \cdot i_d + \Delta v_{q1u} \cdot i_q)/3$ out of the active power to be outputted by the three-phase main inverter 1 is a component to be fed to the single-phase sub-inverter 2a and that $(\Delta v_{d2u} \cdot i_d + \Delta v_{q2u} \cdot i_q)/3$ is a component to be fed to the single-phase sub-inverter 51a. When power consumption caused by a loss occurring in the single-phase sub-inverter 2a or 51a is ignored, $(\Delta v_{d1u} \cdot i_d + \Delta v_{q1u} \cdot i_q)/3$ or $(\Delta v_{d2u} \cdot i_d + \Delta v_{q2u} \cdot i_q)/3$ charges the smoothing capacitor 3a or 52a of the single-phase sub-inverter 2a or 51a, and the voltage of the smoothing capacitor 3a or 52a increases. Moreover, if $(\Delta v_{d1u} \cdot i_d + \Delta v_{q1u} \cdot i_q)/3$ or $(\Delta v_{d2u} \cdot i_d + \Delta v_{q2u} \cdot i_q)/3$ takes on a negative value, oppositely, the voltage of the smoothing capacitor 3a or 52a is lowered.

The voltage of the smoothing capacitor 3a or 52a is thus controlled. Since the dq axial manipulative quantities for the u phase and the dq axial manipulative quantities for the u phase, $\Delta v_{d1u}^*$, $\Delta v_{q1u}^*$, $\Delta v_{d2u}^*$, and $\Delta v_{q2u}^*$, are determined so that the DC voltages $v_{dcs1u}$ and $v_{dcs2u}$ of the smoothing capacitors 3a and 52a will follow the command values $v_{dcs1}^*$ and $v_{dcs2}^*$, desired voltages can be highly reliably sustained.

The DC voltage control for the single-phase sub-inverter 2a and 51a has been described so far. The same as that to the u phase applies to the v phase and w phase.

In the present embodiment, as mentioned above, since the manipulative quantities are determined so that each of the DC voltages of the smoothing capacitors 3a to 3c and 52a to 52c of the single-phase sub-inverters 2a to 2c and 51a to 51c will follow a command value, and the output voltage command for each of the inverters 1, 2a to 2c, and 51a to 51c is adjusted, each of the DC voltages of the smoothing capacitors 3a to 3c and 52a to 52c is controlled to be sustained at a desired voltage. Consequently, the desired DC voltage can be sustained in each of the smoothing capacitors 3a to 3c and 52a to 52c of the single-phase sub-inverters 2a to 2c and 51a to 51c without feed of power from another power supply. Consequently, simplification of a device configuration and cost reduction such as exclusion of converters for the single-phase sub-inverters 2a to 2c and 51a to 51c and replacement of a multi-winding transformer with a reactor can be achieved.

Incidentally, due to an error or the like of each of the control circuits, when the output voltage command for each of the inverters 1, 2a to 2c, and 51a to 51c is merely adjusted, if the DC voltage control for each of the smoothing capacitors 3a to 3c and 52a to 52c is not be precisely achieved, a converter is provided in order to feed power from the AC power supply 11. In this case, the capacity of the converters may be much smaller than the conventional one, and a device configuration can be fully simplified.

Moreover, the three-phase main inverter 1 is a three-phase full-bridge inverter. Even when three single-phase full-bridge inverters like the single-phase sub-inverters 2a to 2c are employed, the same control can be achieved. Moreover, even when the three-phase main inverter 1 and the single-phase sub-inverters 2a to 2c and 51a to 51c are three-level inverters, the same control can be achieved. Moreover, if power need not be restored to the AC power supply 11, the converter 5 may be a diode converter.

Embodiment 6

Figure 15:
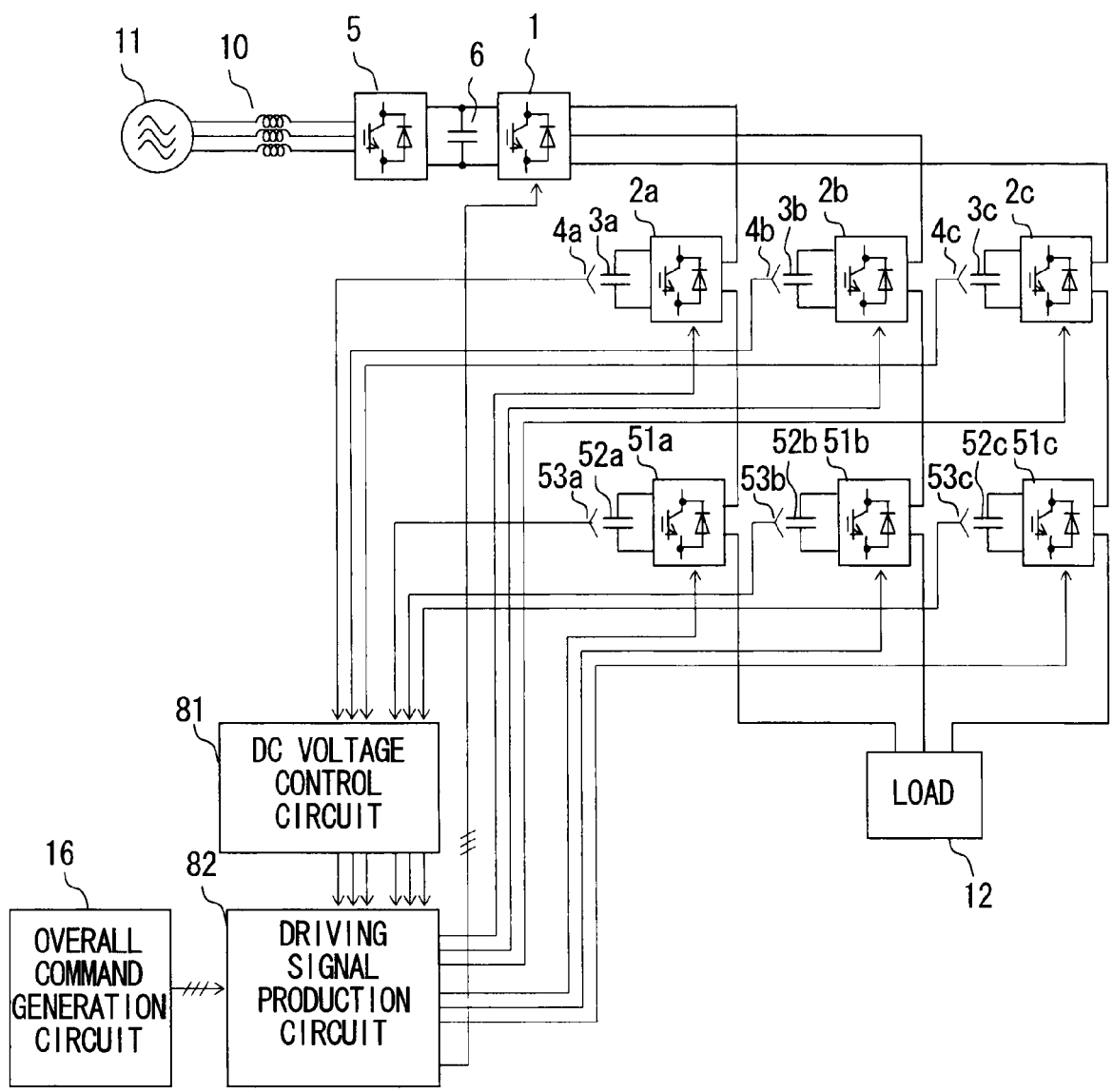
FIG. 15 is a configuration diagram of a power conversion device in accordance with an embodiment 6 of the present invention.

FIG. 15 is a diagram showing the configuration of a power conversion device in accordance with an embodiment 6 of the present invention. The main circuit is identical to that of the embodiment 5 shown in FIG. 12. However, in the present embodiment, a dq axial voltage command is not employed, but a three-phase instantaneous voltage command is outputted from an overall command generation circuit 16.

As shown in the drawing, the power conversion device includes an overall command generation circuit 16, a DC voltage control circuit 81, and a driving signal production circuit 82, controls a three-phase main inverter 1, each of single-phase sub-inverters 2a to 2c (sub-inverter 1 group), and single-phase sub-inverters 51a to 51c (sub-inverter 2 group), and controls the voltages of smoothing capacitors 3a to 3c and 52a to 52c that are the DC inputs of the respective single-phase sub-inverters 2a to 2c and 51a to 51c.

The overall command generation circuit 16 described above is a circuit that generates an output voltage command for a load 12, and outputs a desired voltage, which is outputted in total by all of the three-phase main inverter 1 and single-phase sub-inverters 2a to 2c and 51a to 51c, as a three-phase instantaneous voltage command $v_u^*$, $v_v^*$, and $v_w^*$.

Figure 16:
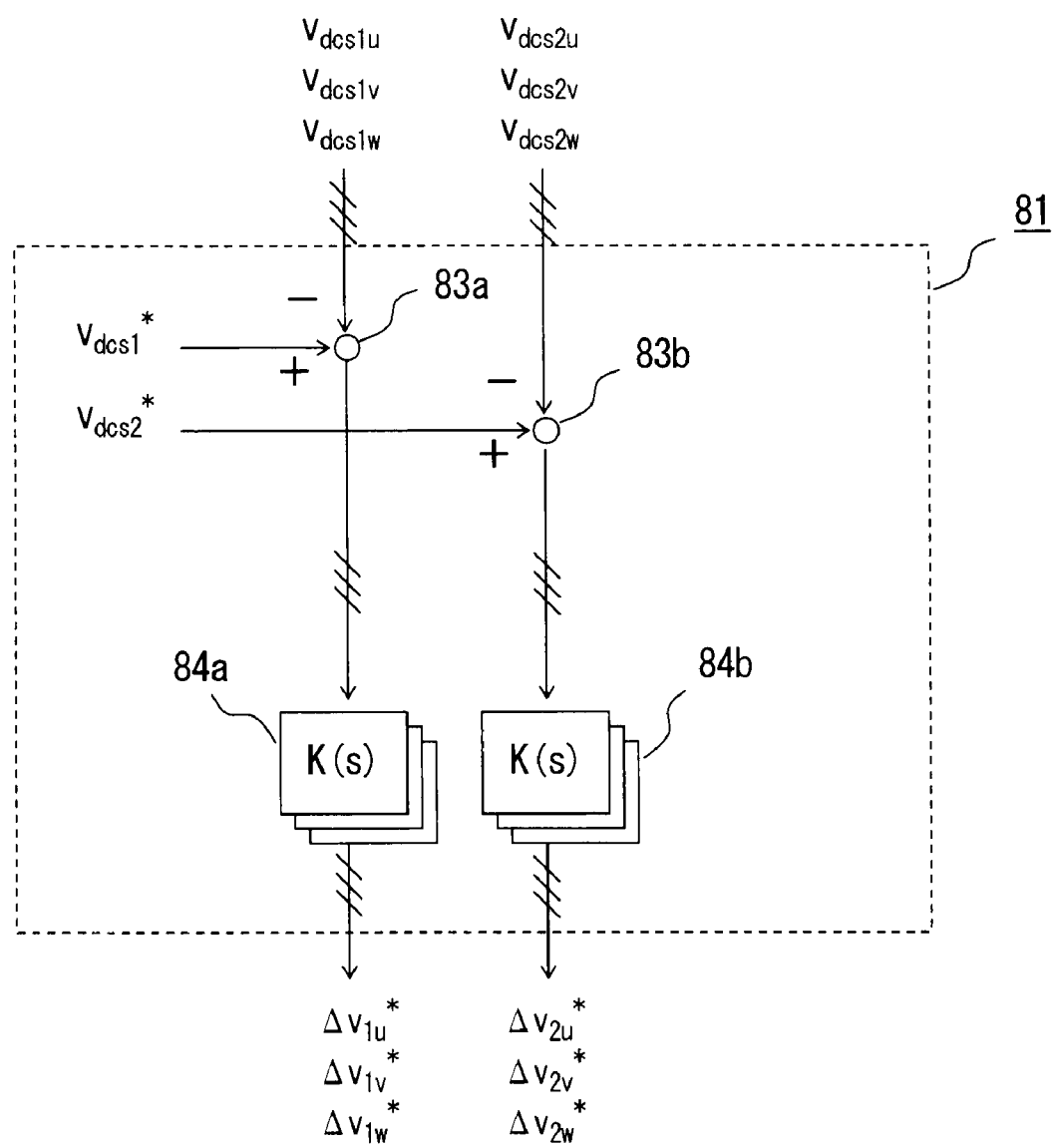
FIG. 16 is a block diagram of a DC voltage control circuit employed in the embodiment 6 of the present invention.

The DC voltage control circuit 81 performs control computation on the basis of the outputs of voltage sensors 4a to 4c and 53a to 53c that measure the voltages of the smoothing capacitors 3a to 3c and 52a to 52c that are the DC inputs of the respective single-phase sub-inverters 2a to 2c and 51a to 51c, and outputs a voltage command as manipulative quantities. The DC voltage control circuit 81 is constructed as shown in, for example, FIG. 16, wherein subtractors 83a and 83b obtain the deviations between the DC voltages $v_{dcs1u}$, $v_{dcs1v}$, $v_{dcs1w}$, $v_{dcs2u}$, $v_{dcs2v}$ and $v_{dcs2w}$ of the single-phase sub-inverters 2a to 2c and 51a to 51c, which are measured by the voltage sensors 4a to 4c and 53a to 53c, and command values $v_{dcs1}^*$ and $v_{dcs2}^*$, and controllers 84a and 84b obtain manipulative quantities. The manipulative quantities are used to adjust an output voltage command for each of the inverters 1, 2a to 2c, and 51a to 51c so that each of the DC voltages $v_{dcs1u}$, $v_{dcs1v}$, $v_{dcs1w}$, $v_{dcs2u}$, $v_{dcs2v}$, and $v_{dcs2w}$ will follow the command value $v_{dcs1}^*$ or $v_{dcs2}^*$. The manipulative quantities for the respective phases, $\Delta v_{1u}^*$, $\Delta v_{1v}^*$, $\Delta v_{1w}^*$, $\Delta v_{2u}^*$, $\Delta v_{2v}^*$, and $\Delta v_{2w}^*$, are outputted from the DC voltage control circuit 81. The controllers 84a to 84c may be formed with general PI controls or the like.

Figure 17:
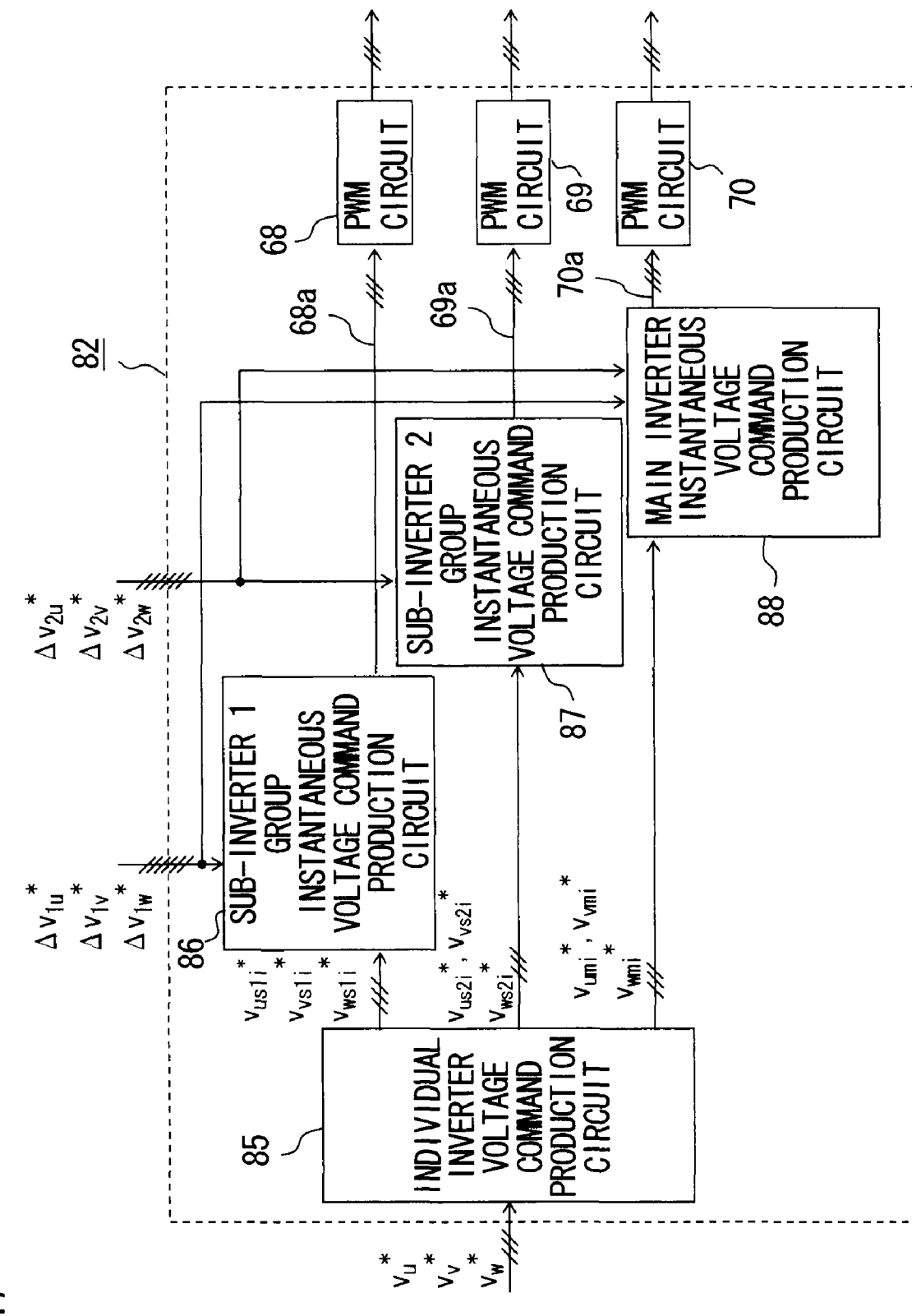
FIG. 17 is a block diagram of a driving signal generation circuit employed in the embodiment 6 of the present invention.

The driving signal production circuit 82 computes a voltage, which is outputted by each of the three-phase main inverter 1 and single-phase sub-inverters 2a to 2c and 51a to 51c, on the basis of the outputs of the overall command generation circuit 16 and DC voltage control circuit 81, and produces pulses, with which the respective switching elements are driven, through PWM. The driving signal production circuit 82 is constructed as shown in, for example, FIG. 17, wherein an individual inverter voltage command production circuit 85 produces a voltage command $v_{umi}^*$, $v_{vmi}^*$, and $v_{wmi}^*$ for the three-phase main inverter 1, and voltage commands $v_{usi}^*$, $v_{vs1i}^*$, $v_{ws1i}^*$, $v_{us2i}^*$, $v_{vs2i}^*$, and $v_{ws2i}^*$ for the single-phase sub-inverters 2a to 2c and 51a to 51c. At this time, the respective voltage commands have relationships expressed by equations (30a), (30b), and (30c) below.

$$v_u^* = v_{umi}^* + v_{us1i}^* + v_{us2i}^* \tag{30a}$$

$$v_v^* = v_{vmi}^* + v_{vs1i}^* + v_{s2i}^* \tag{30b}$$

$$v_w^* = v_{wmi}^* + v_{ws1i}^* + v_{ws2i}^* \tag{30c}$$

The production of the respective voltage commands is not limited to that based on the above equations (30a), (30b), and (30c). An arbitrary means such as a method of determining voltages, which are assigned to the three-phase main inverter 1, single-phase sub-inverters 2a to 2c, and single-phase sub-inverters 51a to 51c, according to the withstand voltage of the switching elements forming the respective inverters 1, 2a to 2c, and 51a to 51c or a method of keeping the voltage, which is outputted by the three-phase main inverter 1 or each of the single-phase sub-inverters 2a to 2c and single-phase sub-inverters 51a to 51c, constant may be adopted.

A sub-inverter 1 group instantaneous voltage command production circuit 86 inputs a sub-inverter voltage command $v_{us1i}^*$, $v_{vs1i}^*$, and $v_{ws1i}^*$ for the sub-inverter 1 group, which is outputted by the individual inverter voltage command production circuit 85, and the manipulative quantities $\Delta v_{1u}^*$, $\Delta v_{1v}^*$, and $\Delta v_{1w}^*$ for the sub-inverter 1 group, which are outputted by the DC voltage control circuit 81, and computes a sub-inverter final voltage command 68a that is a command for a voltage instantaneous value outputted by the single-phase sub-inverters 2a to 2c. As expressed by equations (31a), (31b), and (31c) below, the manipulative quantities $\Delta v_{1u}^*$, $\Delta v_{1v}^*$, and $\Delta v_{1w}^*$ for the sub-inverter 1 group which are outputted by the DC voltage control circuit 81 are subtracted from the sub-inverter voltage command $v_{us1i}^*$, $v_{vs1i}^*$, and $v_{ws1i}^*$ for the sub-inverter 1 group which are outputted by the individual inverter voltage command production circuit 85 so as to compute a sub-inverter final voltage command 68a ($v_{us1}^*$, $v_{vs1}^*$, and $v_{ws1}^*$)

$$v_{us1}^* = v_{us1i}^* - \Delta v_{u1}^* \tag{31a}$$

$$v_{vs1}^* = v_{vs1i}^* - \Delta v_{v1}^* \tag{31b}$$

$$v_{ws1}^* = v_{ws1i}^* - \Delta v_{w1}^* \tag{31c}$$

The thus computed sub-inverter final voltage command 68a is inputted to a PWM circuit 68, and the PWM circuit 68 outputs a voltage pulse signal, which has the pulse width thereof modulated, so as to drive each of the single-phase sub-inverters 2a to 2c.

A sub-inverter 2 group instantaneous voltage command production circuit 87 inputs the sub-inverter voltage command $v_{us2i}^*$, $v_{vs2i}^*$, and $v_{ws2i}^*$ for the sub-inverter 2 group which is outputted by the individual inverter voltage command production circuit 85, and the manipulative quantities $\Delta v_{2u}^*$, $\Delta v_{2v}^*$, and $\Delta v_{2w}^*$ for the sub-inverter 2 group, which are outputted by the DC voltage control circuit 81, so as to compute a sub-inverter final voltage command 69a that is a command for a voltage instantaneous value outputted by the single-phase sub-inverters 51a to 51c. Herein, as expressed by equations (32a), (32b), and (32c) below, the manipulative quantities $\Delta v_{2u}^*$, $\Delta v_{2v}^*$, and $\Delta v_{2w}^*$ for the sub-inverter 2 group which are outputted by the DC voltage control circuit 81 are subtracted from the sub-inverter voltage command $v_{us2i}^*$, $v_{vs2i}^*$, and $v_{ws2i}^*$ for the sub-inverter 2 group, which are outputted by the individual inverter voltage command production circuit 85, in order to compute the sub-inverter final voltage command 69a ($v_{us2}^*$, $v_{vs2}^*$, and $v_{ws2}^*$)

$$v_{us2}^* = v_{us2i} - \Delta v_{u2}^* \tag{32a}$$

$$v_{vs2}^* = v_{vs2i} - \Delta v_{v2}^* \tag{32b}$$

$$v_{ws2}^* = v_{ws2i} - \Delta v_{w2}^* \tag{32c}$$

The thus computed sub-inverter final voltage command 69a is inputted to a PWM circuit 69, and the PWM circuit 69 outputs a voltage pulse signal, which has the pulse width thereof modulated, so as to drive each of the single-phase sub-inverters 51a to 51c.

A main inverter instantaneous voltage command production circuit 88 inputs a main inverter voltage command $v_{umi}^*$, $v_{vmi}^*$, and $v_{wvi}^*$ which is outputted by the individual inverter voltage command production circuit 85, and the manipulative quantities $\Delta v_{1u}^*$, $\Delta v_{1v}^*$, $\Delta v_{1w}^*$, $\Delta v_{2u}^*$, $\Delta v_{2v}^*$, and $\Delta v_{2w}^*$, which are outputted by the DC voltage control circuit 81, so as to compute a main inverter final voltage command 70a ($v_{um}^*$, $v_{vm}^*$, and $v_{wm}^*$), which is a command for a voltage instantaneous value outputted by the three-phase main inverter 1, according to equations (33a), (33b), and (33c) below.

$$v_{um}^* = v_{umi}^* + \Delta v_{u1}^* + \Delta v_{u2}^* \tag{33a}$$

$$v_{vm}^* = v_{vmi}^* + \Delta v_{v1}^* + \Delta v_{v2}^* \tag{33b}$$

$$v_{wm}^* = v_{wmi}^* + \Delta v_{w1}^* + \Delta v_{w2} \tag{33c}$$

The thus computed main inverter final voltage command 70a is inputted to a PWM circuit 70, and the PWM circuit 70 outputs a voltage pulse signal, which has the pulse width thereof modulated, so as to drive the three-phase main inverter.

As mentioned above, since the three-phase main inverter 1, sub-inverter 1 group, and sub-inverter 2 group are connected in series with one another, the voltage to be applied to the load 12 is the sum total of the voltages outputted by the three-phase main inverter 1, sub-inverter 1 group, and sub-inverter 2 group. The manipulative quantities $\Delta v_{1u}^*$, $\Delta v_{1v}^*$, $\Delta v_{1w}^*$, $\Delta v_{2u}^*$, $\Delta v_{2v}^*$, and $\Delta v_{2w}^*$ outputted by the DC voltage control circuit 81 are added for computation of the voltage command for the three-phase main inverter 1, and are subtracted for computation of the voltage command for the sub-inverter 1 group or sub-inverter 2 group. Consequently, the added manipulative quantities and subtracted manipulative quantities are canceled out, and the voltage to be applied to the load 12 is determined with the instantaneous voltage command $v_u^*$, $v_v^*$, and $v_w^*$ outputted by the overall command generation circuit 16.

Now, the powers of the three-phase main inverter 1, single-phase sub-inverters 2a and 51a, and load 12 for the u phase will be discussed. Assuming that the power factor of the load 12 is $\cos\theta$, the voltage of the u phase of the three-phase main inverter 1 is $v_{um}$, the voltage of the single-phase sub-inverter 2a is $v_{us1}$, the voltage of the single-phase sub-inverter 51a is $v_{us2}$, the voltage to be applied to the load 12 is $v_u$, the current flowing into the u phase of the load 12 is $i_u$, and the active power to be fed to the load 12 by the u phase of the three-phase main inverter 1 and the single-phase sub-inverters 2a and 51a is $p_u$, the active power $p_u$ is expressed by an equation (34) below.

$$\begin{aligned} p_u &= v_u \cdot i_u \cdot \cos\theta \\ &= (v_{um} + v_{us1} + v_{us2}) \cdot i_u \cdot \cos\theta \end{aligned} \tag{34}$$

Among the voltage components contained in $v_{um}$, $v_{us1}$, or $v_{us2}$, a component caused by the u-phase voltage command $v_{umi}^*$, $v_{us1i}^*$, or $v_{us2i}^*$ outputted by the individual inverter voltage command production circuit 51 shall be $v_{umi}$, $v_{us1i}$, or $v_{us2i}$, and a component caused by the u-phase manipulative quantity $v_{us1}^*$ or $v_{u2}^*$ outputted by the DC voltage control circuit 81 shall be $\Delta v_{u1}$ or $\Delta v_{u2}$. The active power outputted by the u phase of the three-phase main inverter 1 shall be $p_{um}$, the active power outputted by the single-phase sub-inverter 2a shall be $p_{us1}$, and the active power outputted by the single-phase sub-inverter 51a shall be $p_{us2}$. Assuming that $\Delta v_{u1}$ and $\Delta v_{u2}$ are DC components, relational equations (35a), (35b), (35c) and (36) below are established.

$$p_{um} = (v_{um} \cdot \cos\theta + \Delta v_{u1} + \Delta v_{u2}) \cdot i_u \tag{35a}$$

$$p_{us1} = (v_{us} \cdot \cos\theta - \Delta v_{u1}) \cdot i_u \tag{35b}$$

$$p_{us2} = (v_{us} \cdot \cos\theta - \Delta v_{u2}) \cdot i_u \tag{35c}$$

$$p_u = p_{um} + p_{us1} + p_{us2} \tag{36}$$

From the equations (35a) to (35c) and (36), it is understood that $\Delta v_{u1} \cdot i_u$ out of the active power outputted from the u phase of the three-phase main inverter 1 is a component to be fed to the single-phase sub-inverter 2a and $\Delta v_{u2} \cdot i_u$ is a component to be fed to the single-phase sub-inverter 51a. If power consumption caused by losses in the single-phase sub-inverters 2a and 51a is ignored, $\Delta v_{u1} \cdot i_u$ and $\Delta v_{u2} \cdot i_u$ charge the smoothing capacitors 3a and 52a of the single-phase sub-inverters 2a and 51a, and the voltages of the smoothing capacitors 3a and 52a increase. If $\Delta v_{u1} \cdot i_u$ and $\Delta v_{u2} \cdot i_u$ take on negative values, oppositely, the voltages of the smoothing capacitors 3a and 52a are lowered.

The voltages of the smoothing capacitors 3a and 52a are thus controlled. Since the manipulative quantity $\Delta v_{u1}^*$ or $\Delta v_{u2}^*$ for the u phase is determined so that the DC voltage $v_{dcs1u}$ or $v_{dcs2u}$ of the smoothing capacitor 3a or 52a will follow the command value $\Delta v_{dcs1}^*$ or $\Delta v_{dcs2}^*$, a desired voltage can be highly reliably sustained. The same as that to the u phase applies to the v and w phases.

As mentioned above, in the present embodiment, in the power conversion device that controls an instantaneous value of a voltage or current, since manipulative quantities are determined so that each of the DC voltages of the smoothing capacitors 3a to 3c and 52a to 52c of the single-phase sub-inverters 2a to 2c and 51a to 51c will follow a command value, and an output voltage command for each of the inverters 1, 2a to 2c, and 51a to 51c is adjusted, each of the DC voltages of the smoothing capacitors 3a to 3c and 52a to 52c is controlled to be sustained at a desired voltage. Consequently, the same advantage as that of the embodiment 5 can be exerted. The desired DC voltage can be sustained in each of the smoothing capacitors 3a to 3c and 52a to 52c of the single-phase sub-inverters 2a to 2c and 51a to 51c without feed of power from another power source. Simplification of a device configuration and cost reduction such as exclusion/simplification of converters for the single-phase sub-inverters 2a to 2c and 51a to 51c and replacement of a multi-winding transformer with a reactor can be achieved.

In the embodiments 5 and 6, as presented in the embodiments 2 and 4, the single-phase sub-inverters 2a to 2c and 51a to 51c may be operated as inverters for outputting voltages that cancel voltage harmonics outputted by the three-phase main inverter 1.

Embodiment 7

Figure 18:
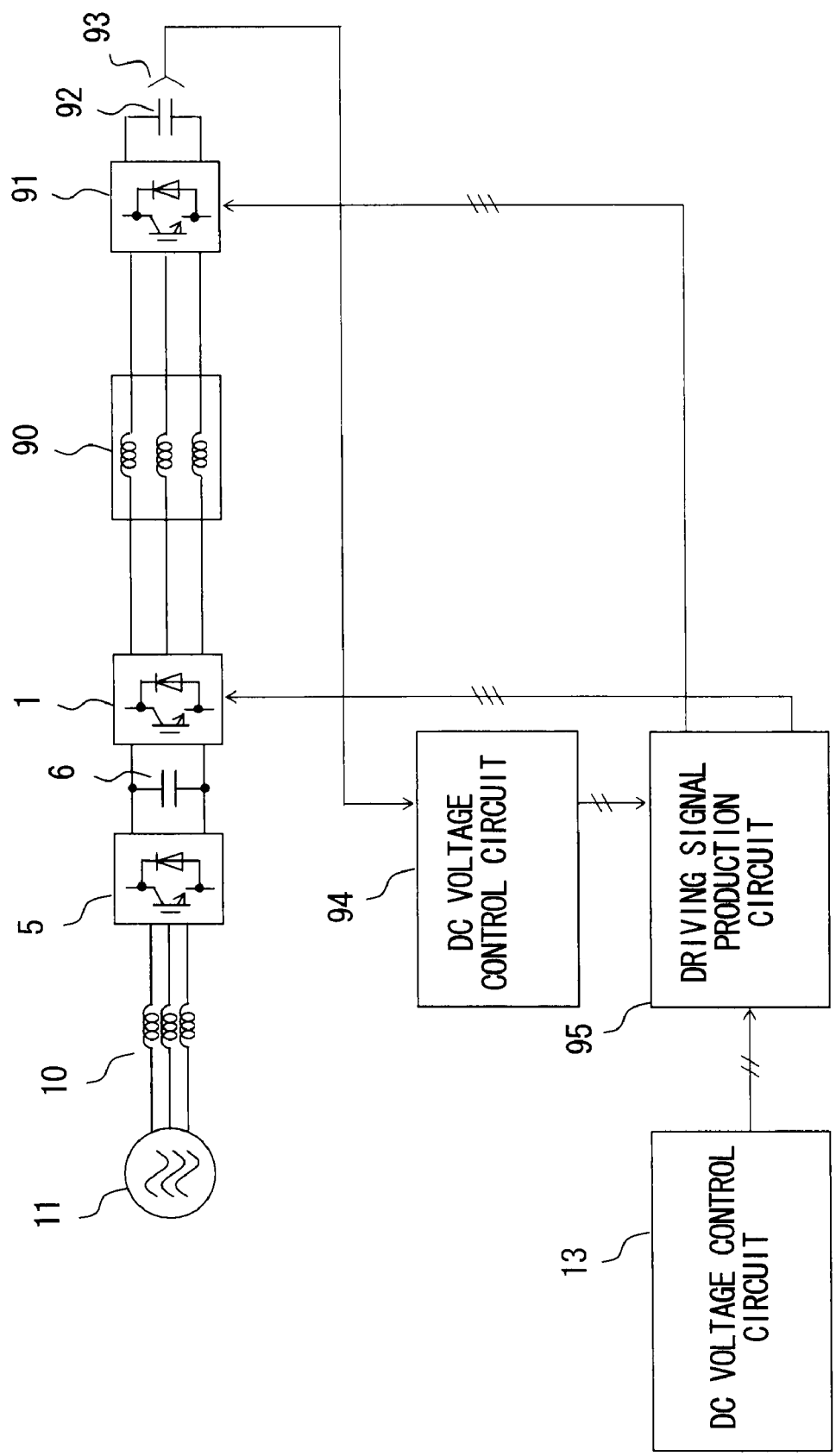
FIG. 18 is a configuration diagram of a power conversion device in accordance with an embodiment 7 of the present invention.

FIG. 18 is a diagram showing the configuration of a power conversion device in accordance with an embodiment 7 of the present invention.

As shown in FIG. 18, the power conversion device has a three-phase main inverter 1 and a three-phase sub-inverter 91, their respective phase output lines on AC sides are connected in series with each other via a load 90 having open windings. The three-phase main inverter 1 has a smoothing capacitor 6, which serves as a first DC power supply, on the DC side thereof, and further has a converter 5 connected in parallel therewith. On the AC side of the converter 5, an AC power supply 11 is connected via a reactor 10. The three-phase sub-inverter 91 has a smoothing capacitor 92, which serves as a second DC power supply, on the DC side thereof.

The three-phase main inverter 1 and converter 5 are identical to those of the embodiment 1.

Herein, the three-phase main inverter 1 and the three-phase sub-inverter 91 are regarded as having first single-phase inverters and second single-phase inverters star-connected respectively as three phase parts. For each of phases, the AC side of the first single-phase inverter (each phase part of the three-phase main inverter 1) and the AC side of the second single-phase inverter (each phase part of the three-phase sub-inverter 91) are connected in series with each other with the load 90 between them.

Moreover, for controlling the three-phase main inverter 1 and three-phase sub-inverter 91, and controlling the voltage of the smoothing capacitor 92 that is the DC input of the three-phase sub-inverter 91, the power conversion device has an overall command generation circuit 13, a DC voltage control circuit 94, and a driving signal production circuit 95.

The overall command generation circuit 13 is a circuit identical to that of the embodiment 1 which generates an output voltage command for the load 12, and a control circuit that outputs a desired voltage, which is outputted in total by all of the three-phase main inverter 1 and three-phase sub-inverter 91, as a dq-axis voltage command $v_d^*$ and $v_q^*$.

Figure 19:
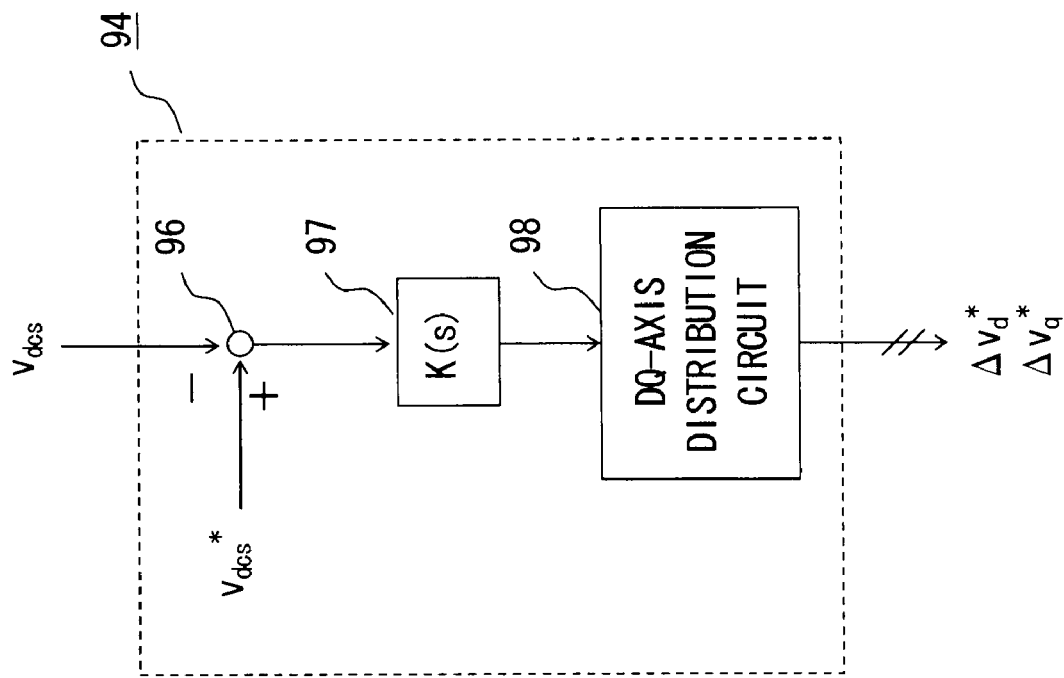
FIG. 19 is a block diagram of a DC voltage control circuit employed in the embodiment 7 of the present invention.

The DC voltage control circuit 94 performs control computation on the basis of the output of a voltage sensor 93 that measures the DC voltage of the smoothing capacitor 92 which is the DC input of the three-phase sub-inverter 91, and outputs a voltage command as manipulative quantities. The DC voltage control circuit 94 is constructed as shown in, for example, FIG. 19, wherein a subtractor 96 obtains the deviation between the DC voltage $v_{dcs}$ of the smoothing capacitor 92 of the three-phase sub-inverter 91, which is measured by the voltage sensor 93, and a command value $v_{dcs}^*$, and a controller 97 obtains a manipulative quantity. The manipulative quantity is used to adjust an output voltage command for each of the inverters 1 and 91, which will be described later, so that the DC voltage $v_{dcs}$ will follow the command value $v_{dcs}^*$. A d-axis manipulative quantity $\Delta v_d^*$ and a q-axis manipulative quantity $\Delta v_q^*$ that are a d-axis component and a q-axis component into which the manipulative quantity is divided by a dq-axis distribution circuit 98 are outputted.

The controller 97 may be formed with a general PI control or the like. Moreover, as a method according to which the dq-axis distribution circuit 98 distributes the manipulative quantity, which is outputted from the controller 97, into the d-axis component and q-axis component, a method that matches the type of load or the purpose of use of the power conversion device may be selected. An arbitrary method such as a method of equalizing the d-axis and q-axis components or a method of employing only the d axis or q axis may be adopted.

Figure 20:
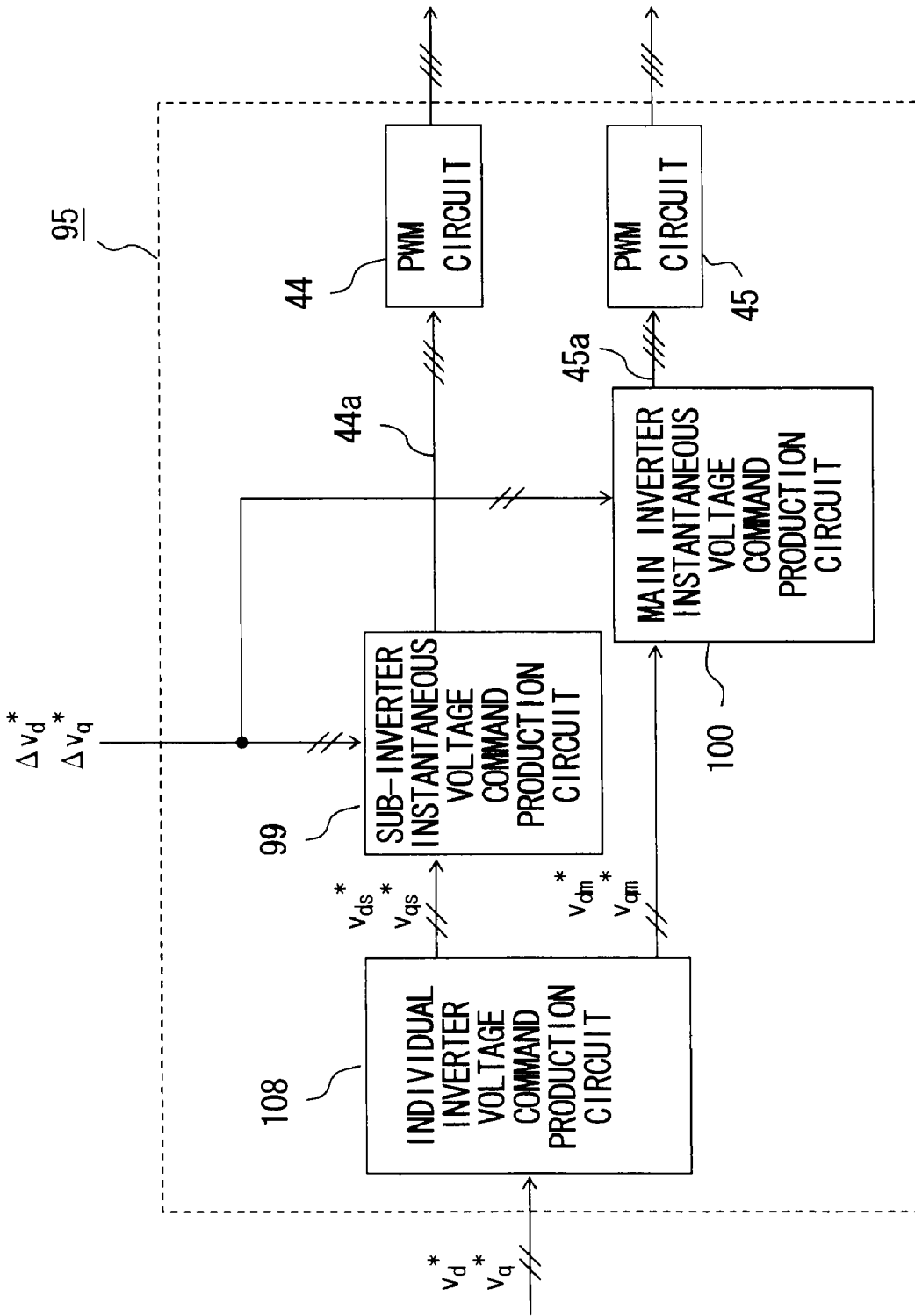
FIG. 20 is a block diagram of a driving signal generation circuit employed in the embodiment 7 of the present invention.

The driving signal production circuit 95 computes a voltage, which is outputted by each of the three-phase main inverter 1 and three-phase sub-inverter 91 on the basis of the outputs of the overall command generation circuit 13 and DC voltage control circuit 94, and produces pulses, with which the respective switching elements are driven, through PWM. The driving signal production circuit 95 is constructed as shown in, for example, FIG. 20, wherein an individual inverter voltage command production circuit 108 produces a dq-axis voltage command $v_{dm}^*$ and $v_{qm}^*$ for the three-phase main inverter 1, and a dq-axis voltage command $v_{ds}^*$ and $v_{qs}^*$ for the three-phase sub-inverter 91 on the basis of the dq-axis voltage command $V_d^*$ and $V_q^*$ which is outputted from the overall command generation circuit 13. At this time, the respective dq-axis voltage commands have relationships expressed by equations (37a) and (37b) below.

$$v_d^* = v_{dm}^* - v_{ds}^* \tag{37a}$$

$$v_q^* = v_{qm}^* - v_{qs}^* \tag{37b}$$

The production of the dq-axis voltage command $v_{dm}^*$ and $v_{qm}^*$ for the three-phase main inverter 1, and a dq-axis voltage command $v_{ds}^*$ and $v_{qs}^*$ for the three-phase sub-inverter 91 is not limited to that based on the equations (37a) and (37b). An arbitrary means such as a method of determining voltages, which are assigned to the three-phase main inverter 1 and three-phase sub-inverter 91, according to the withstand voltage of the switching elements forming the respective inverters 1 and 91 or a method of keeping the voltage, which is outputted by the three-phase main inverter 1 or three-phase sub-inverter 91, constant may be adopted.

A sub-inverter instantaneous voltage command production circuit 99 inputs a sub-inverter dq-axis voltage command $v_{ds}^*$ and $v_{qs}^*$ which is outputted by the individual inverter voltage command production circuit 108, and a d-axis manipulative quantity and a q-axis manipulative quantity $\Delta v_d^*$ and $\Delta v_q^*$ which are outputted by the DC voltage control circuit 94, and computes a sub-inverter final voltage command 44a that is a command for a voltage instantaneous value outputted by the three-phase sub-inverter 91.

In the present embodiment, as expressed by an equation (38) below, the d- and q-axis manipulative quantities $\Delta v_d^*$ and $\Delta v_q^*$ outputted from the DC voltage control circuit 94 are added to the sub-inverter dq-axis voltage command $v_{ds}^*$ and $v_{qs}^*$ outputted by the individual inverter voltage command production circuit 108, and the result is converted into a three-phase voltage in order to compute the sub-inverter final voltage command 44a ($v_{us}^*$, $v_{vs}^*$, and $v_{ws}^*$)

$$\begin{bmatrix} v_{us}^* \\ v_{vs}^* \\ v_{ws}^* \end{bmatrix} = \sqrt{\frac{2}{3}} \begin{bmatrix} \cos\theta & -\sin\theta \\ \cos\left(\theta - \frac{2\pi}{3}\right) & -\sin\left(\theta - \frac{2\pi}{3}\right) \\ \cos\left(\theta + \frac{2\pi}{3}\right) & -\sin\left(\theta + \frac{2\pi}{3}\right) \end{bmatrix} \begin{bmatrix} v_{ds}^* + \Delta v_d^* \\ v_{qs}^* + \Delta v_q^* \end{bmatrix} \tag{38}$$

The thus computed sub-inverter final voltage command 44a is inputted to a PWM circuit 44, and the PWM circuit 44 outputs a voltage pulse signal, which has the pulse width thereof modulated, so as to drive the three-phase sub-inverter 91.

Moreover, a main inverter instantaneous voltage command production circuit 100 inputs a main inverter dq-axis voltage command $v_{dm}^*$ and $v_{qm}^*$ outputted by the individual inverter voltage command production circuit 108, and the d- and q-axis manipulative quantities $\Delta v_d^*$ and $\Delta v_q^*$ outputted by the DC voltage control circuit 94, and computes a main inverter final voltage command 45a that is a command for a voltage instantaneous value outputted by the three-phase main inverter 1.

In this case, as expressed by an equation (39) below, the d- and q-axis manipulative quantities $\Delta v_d^*$ and $\Delta v_q^*$ outputted by the DC voltage control circuit 94 are added to the main inverter dq-axis voltage command $v_{dm}^*$ and $v_{qm}^*$ outputted by the individual inverter voltage command production circuit 108, and the result is converted into a three-phase voltage in order to compute the main inverter final voltage command 45a ($v_{um}^*$, $v_{vm}^*$, and $v_{wm}^*$)

$$\begin{bmatrix} v_{um}^* \\ v_{vm}^* \\ v_{wm}^* \end{bmatrix} = \sqrt{\frac{2}{3}} \begin{bmatrix} \cos\theta & -\sin\theta \\ \cos\left(\theta - \frac{2\pi}{3}\right) & -\sin\left(\theta - \frac{2\pi}{3}\right) \\ \cos\left(\theta + \frac{2\pi}{3}\right) & -\sin\left(\theta + \frac{2\pi}{3}\right) \end{bmatrix} \begin{bmatrix} v_{dm}^* + \Delta v_d^* \\ v_{qm}^* + \Delta v_q^* \end{bmatrix} \quad (39)$$

The thus computed main inverter final voltage command 45a is inputted to a PWM circuit 45, and the PWM circuit 45 outputs a voltage pulse signal, which has the pulse width thereof modulated, so as to drive the three-phase main inverter 1.

Since the three-phase main inverter 1 and three-phase sub-inverter 91 are connected in series with each other face to face with the load 90 between them, the voltage to be applied to the load 90 is the difference between the output voltage of the three-phase main inverter 1 and the output voltage of the three-phase sub-inverter 91. Since the d- and q-axis manipulative quantities $\Delta v_d^*$ and $\Delta v_q^*$ outputted by the DC voltage control circuit 94 are added to the output voltage command for each of the three-phase main inverter 1 and three-phase sub-inverter 91, the added manipulative quantities and added manipulative quantities are canceled out. The voltage to be applied to the load 90 is determined with the voltage command $v_d^*$ and $v_q^*$ outputted by the overall command generation circuit 13.

A voltage that is applied to the load 90 and is defined on the d and q axes shall be $v_d$ and $v_q$, a current flowing into the load 90 shall be $i_d$ and $i_q$, and an active power to be fed to the load 90 shall be p. Moreover, assuming that voltage components, which are caused by the dq-axis voltage commands $v_{dm}^*$ and $v_{qm}^*$ and $v_{ds}^*$ and $v_{qs}^*$ outputted by the individual inverter voltage command production circuit 108, out of the voltages outputted by the three-phase main inverter 1 and three-phase sub-inverter 91 are $v_{dm}$, $v_{qm}$, $v_{ds}$, and $v_{qs}$, the active power p is expressed by an equation (40) below.

$$p = v_d \cdot i_d + V_q \cdot i_q = (v_{dm} - v_{ds}) \cdot i_d + (v_{qm} - v_{qs}) \cdot i_q \quad (40)$$

On the other hand, assuming that the active power of the three-phase main inverter 1 is $p_m$, the active power of the three-phase sub-inverter 91 is $p_s$, and voltage components caused by the d- and q-axis manipulative quantities $\Delta v_d^*$ and $\Delta v_q^*$ outputted by the DC voltage control circuit 94 are $\Delta v_d$ and $\Delta v_q$, the active powers $p_m$ and $p_s$ are expressed by equations (41) and (42) below.

$$p_m = (v_{dm} + \Delta v_d) \cdot i_d + (v_{qm} + \Delta v_q) \cdot i_q \quad (41)$$

$$p_s = (v_{ds} + \Delta v_d) \cdot (-i_d) + (v_{qs} + \Delta v_q) \cdot (-i_q) \quad (42)$$
$$= -(v_{ds} + \Delta v_d) \cdot i_d - (v_{qs} + \Delta v_q) \cdot i_q$$

Moreover, p, $p_m$, and $p_s$ have a relational equation (43) below established.

$$p = p_m + p_s \quad (43)$$

From the equations (41) to (43), it is understood that $(\Delta v_d \cdot i_d + \Delta v_q \cdot i_q)$ out of the active power outputted by the three-phase main inverter 1 is a component which is fed to the three-phase sub-inverter 91 but is not fed to the load 90. If power consumption caused by a loss in the three-phase sub-inverter 91 is ignored, $(\Delta v_d \cdot i_d + \Delta v_q \cdot i_q)$ charges the smoothing capacitor 92 of the three-phase sub-inverter 91, and the voltage of the smoothing capacitor 92 increases. Moreover, if $(\Delta v_d \cdot i_d + \Delta v_q \cdot i_q)$ takes on a negative value, oppositely the voltage of the smoothing capacitor 92 is lowered.

The voltage of the smoothing capacitor 92 is thus controlled. Since the d- and q-axis manipulative quantities $\Delta v_d^*$ and $\Delta v_q^*$ are determined so that the DC voltage $v_{dcs}$ of the smoothing capacitor 92 will follow the command value $v_{dcs}^*$, a desired voltage can be highly reliably sustained.

As mentioned above, in the present embodiment, in the power conversion device having the three-phase main inverter 1 and three-phase sub-inverter 91 connected in series with each other face to face with the load 90 between them, since manipulative quantities are determined so that the DC voltage of the smoothing capacitor 92 of the three-phase sub-inverter 91 will follow a command value, and the output voltage command for each of the inverters 1 and 91 is adjusted, the DC voltage of the smoothing capacitor 92 can be controlled to be sustained at a desired voltage. Consequently, the desired DC voltage is sustained in the smoothing capacitor 92 of the three-phase sub-inverter 91 without feed of power from another power supply. Eventually, simplification of a device configuration and cost reduction such as exclusion/simplification of a converter for the three-phase sub-inverter 91 and replacement of a multi-winding transformer with a reactor can be achieved.

Moreover, in the embodiment 7, the three-phase main inverter 1 and three-phase sub-inverter 91 are three-phase full-bridge inverters. Even when three single-phase full-bridge inverters are adopted as one or both of the inverters 1 and 91, the same control can be achieved. Moreover, even when the three-phase main inverter 1 and three-phase sub-inverter 91 are three-level inverters, the same control can be achieved. Moreover, if power need not be restored to the AC power supply 11, the converter 5 may be a diode converter.

Embodiment 8

In the embodiment 7, in the driving signal production circuit 95, a dq-axis voltage command is produced for not only the three-phase main inverter 1 but also the three-phase sub-inverter 91 on the basis of the dq-axis voltage command $v_d^*$ and $v_q^*$ outputted from the overall command generation circuit 13. In the present embodiment, the three-phase sub-inverter 91 is operated as an inverter for outputting a voltage that cancels voltage harmonics outputted by the three-phase main inverter 1.

Figure 21:
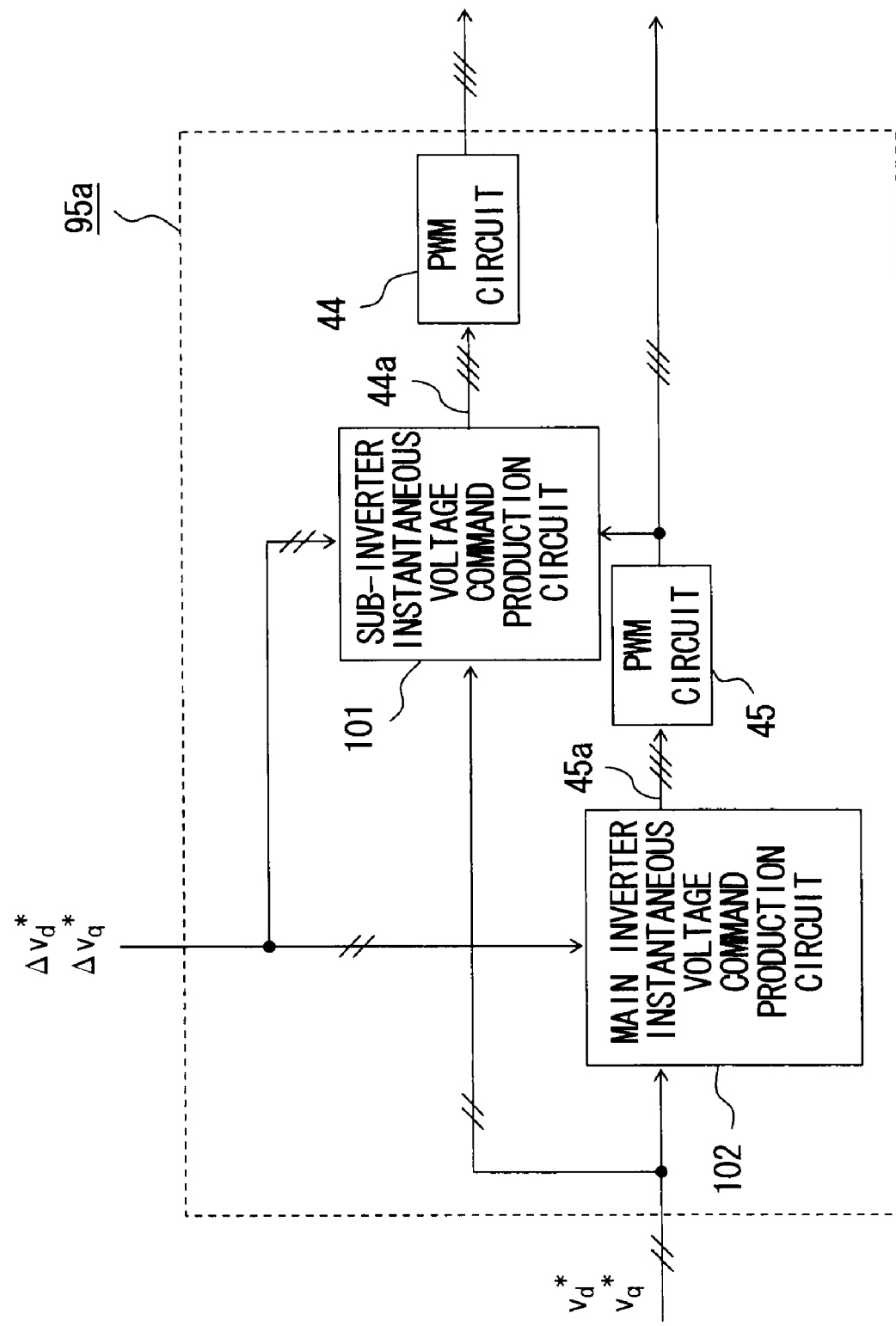
FIG. 21 is a block diagram of a driving signal generation circuit employed in an embodiment 8 of the present invention.

In this case, instead of the driving signal production circuit 95 in the embodiment 7, a driving signal production circuit 95a shown in FIG. 21 is employed. The other circuit components are identical to those of the embodiment 7.

The driving signal production circuit 95a computes a voltage, which is outputted by each of the three-phase main inverter 1 and three-phase sub-inverter 91, on the basis of the outputs of the overall command generation circuit 13 and DC voltage control circuit 94, and produces pulses, with which the respective switching elements are driven, through PWM. As shown in FIG. 21, a main inverter instantaneous voltage command production circuit 102 inputs a dq-axis voltage command $v_d^*$ and $v_q^*$ outputted from the overall command generation circuit 13, and a d-axis manipulative quantity and a q-axis manipulative quantity $\Delta v_d^*$ and $\Delta v_q^*$ outputted by the DC voltage control circuit 94, and computes a main inverter final voltage command 45a that is a command for a voltage instantaneous value outputted by the three-phase main inverter 1.

In this case, as expressed by an equation (44) below, the dq axial manipulative quantities $\Delta v_d^*$ and $\Delta v_q^*$ outputted from the DC voltage control circuit 94 are added to the dq-axis voltage command $v_d^*$ and $v_q^*$, and the result is converted into a three-phase voltage in order to compute the main inverter final voltage command 45a ($v_{um}^*$, $v_{vm}^*$, and $v_{wm}^*$)

$$\begin{bmatrix} v_{um}^* \\ v_{vm}^* \\ v_{wm}^* \end{bmatrix} = \sqrt{\frac{2}{3}} \begin{bmatrix} \cos\theta & -\sin\theta \\ \cos\left(\theta - \frac{2\pi}{3}\right) & -\sin\left(\theta - \frac{2\pi}{3}\right) \\ \cos\left(\theta + \frac{2\pi}{3}\right) & -\sin\left(\theta + \frac{2\pi}{3}\right) \end{bmatrix} \begin{bmatrix} v_d^* + \Delta v_d^* \\ v_q^* + \Delta v_q^* \end{bmatrix} \quad (44)$$

The thus computed main inverter final voltage command 45a is inputted to a PWM circuit 45, and the PWM circuit 45 outputs a voltage pulse signal, which has the pulse width thereof modulated, so as to drive the three-phase main inverter 1.

A sub-inverter instantaneous voltage command production circuit 101 inputs the dq-axis voltage command $v_d^*$ and $v_q^*$ outputted from the overall command generation circuit 13, and the d- and q-axis manipulative quantities $\Delta v_d^*$ and $\Delta v_q^*$ outputted by the DC voltage control circuit 94, and further inputs a voltage pulse signal $v_{umpwm}$, $v_{vmpwm}$, and $v_{wmpwm}$ for the three-phase main inverter 1 outputted by the PWM circuit 45. Based on the input signals, the sub-inverter instantaneous voltage command production circuit 101 computes a sub-inverter final voltage command 44a ($v_{us}^*$, $v_{vs}^*$, and $v_{ws}^*$), which is a command for a voltage instantaneous value outputted by the three-phase sub-inverter 91, according to an equation (45) below.

$$\begin{bmatrix} v_{us}^* \\ v_{vs}^* \\ v_{ws}^* \end{bmatrix} = \sqrt{\frac{2}{3}} \begin{bmatrix} \cos\theta & -\sin\theta \\ \cos\left(\theta - \frac{2\pi}{3}\right) & -\sin\left(\theta - \frac{2\pi}{3}\right) \\ \cos\left(\theta + \frac{2\pi}{3}\right) & -\sin\left(\theta + \frac{2\pi}{3}\right) \end{bmatrix} \begin{bmatrix} -v_d^* + \Delta v_d^* \\ -v_q^* + \Delta v_q^* \end{bmatrix} + \begin{bmatrix} v_{umpwm} \\ v_{vmpwm} \\ v_{wmpwm} \end{bmatrix} \quad (45)$$

The thus computed sub-inverter final voltage command 44a is inputted to a PWM circuit 44, and the PWM circuit 44 outputs a voltage pulse signal, which has the pulse width thereof modulated, so as to drive the three-phase sub-inverter 91.

Under the foregoing control, the three-phase main inverter 1 outputs a voltage caused by an output voltage command having the d- and q-axis manipulative quantities $\Delta v_d^*$ and $\Delta v_q^*$, which are outputted by the DC voltage control circuit 94, added to the dq-axis voltage command $v_d^*$ and $v_q^*$ which is outputted from the overall command generation circuit 13.

The three-phase sub-inverter 91 outputs a voltage caused by an output voltage command having the d- and q-axis manipulative quantities $\Delta v_d^*$ and $\Delta v_q^*$, which are outputted by the DC voltage control circuit 94, and the voltage pulse signal $V_{umpwm}$, $v_{vmpwm}$, and $v_{wmpwm}$ for the three-phase main inverter 1, which is added after conversion to a three-phase signal, added to a command whose polarity is the reverse of the polarity of the dq-axis voltage command $v_d^*$ and $v_q^*$ outputted from the overall command generation circuit 13. Since the voltage pulse signal $v_{umpwm}$, $v_{vmpwm}$, and $v_{wmpwm}$ is added from the signal of respective phases that is a three-phase instantaneous voltage into which the command $-v_d^*$ and $-v_q^*$ is converted, the fundamental wave component of the instantaneous voltage of the command signal $-v_d^*$ and $-v_q^*$ produced by reversing the polarity of the dq-axis voltage command $v_d^*$ and $v_q^*$ is canceled. The sub-inverter final voltage command 44a becomes a command causing output of a voltage that is in phase with harmonics outputted from the three-phase main inverter 1.

Since the three-phase main inverter 1 and three-phase sub-inverter 91 are connected in series with each other face to face with the load 90 between them, the voltage to be applied to the load 90 comes to the difference between the output voltage of the three-phase main inverter 1 and the output voltage of the three-phase sub-inverter 91. Consequently, the three-phase sub-inverter 91 operates to cancel the voltage harmonics outputted by the three-phase main inverter 1.

Further, similarly to the embodiment 7, since the d- and q-axis manipulative quantities $\Delta v_d^*$ and $\Delta v_q^*$ outputted by the DC voltage control circuit 94 are added to each of the output voltage commands for the three-phase main inverter 1 and three-phase sub-inverter 91, the added manipulative quantities and added manipulative quantities are canceled out. The voltage to be applied to the load 90 is therefore determined with the voltage command $v_d^*$ and $v_q^*$ outputted by the inverter overall control circuit 13. Consequently, similarly to the embodiment 7, $(\Delta v_d \cdot i_d + \Delta v_q \cdot i_q)$ out of the active power outputted by the three-phase main inverter 1 is fed to the three-phase sub-inverter 91 in order to charge the smoothing capacitor 92. When $(\Delta v_d \cdot i_d + \Delta v_q \cdot i_q)$ takes on a positive value, the voltage of the smoothing capacitor 92 increases. When $(\Delta v_d \cdot i_d + \Delta v_q \cdot i_q)$ takes on a negative voltage, the voltage of the smoothing capacitor 92 is lowered. The voltage of the smoothing capacitor 92 is thus controlled. Nevertheless, since the d- and q-axis manipulative quantities $\Delta v_d^*$ and $\Delta v_q^*$ are determined so that the DC voltage $V_{dcs}$ of the smoothing capacitor 92 will follow the command value $V_{dcs}^*$, a desired voltage can be highly reliably sustained.

The voltage outputted by the three-phase main inverter 1 contains harmonics due to PWM control. In the present embodiment, in the power conversion device having the three-phase main inverter 1 and three-phase sub-inverter 91 connected in series with each other face to face with the load 90 between them, since the three-phase sub-inverter 91 is operated in order to cancel the voltage harmonics outputted by the three-phase main inverter 1, the voltage to be fed to the load 90 has the harmonics suppressed.

Moreover, since manipulative quantities are determined so that the DC voltage $V_{dcs}$ of the smoothing capacitor 92 of the three-phase sub-inverter 91 will follow the command value $V_{dcs}^*$, and the output voltage command for each of the inverters 1 and 91 is adjusted, the DC voltage $V_{dcs}$ of the smoothing capacitor 92 is controlled to be sustained at the desired voltage. Consequently, the same advantage as that of the embodiment 7 can be exerted. In the smoothing capacitor 92 of the three-phase sub-inverter 91, the desired DC voltage can be sustained without feed of power from another power supply. Simplification of a device configuration and cost reduction such as exclusion/simplification of a converter for the three-phase sub-inverter 91 and replacement of a multi-winding transformer with a reactor can be achieved.

Embodiment 9

Figure 22:
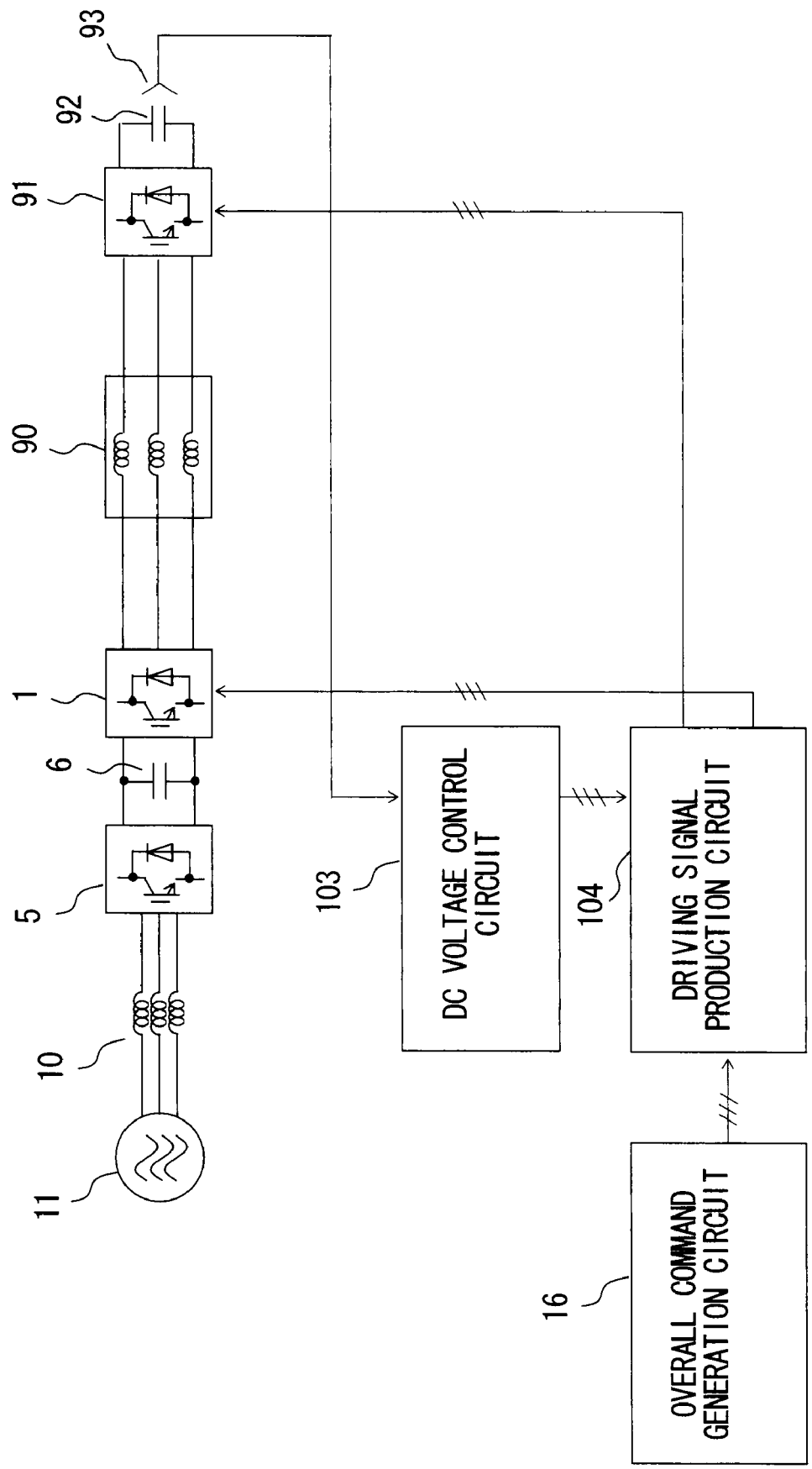
FIG. 22 is a configuration diagram of a power conversion device in accordance with an embodiment 9 of the present invention.

FIG. 22 is a diagram showing the configuration of a power conversion device in accordance with an embodiment 9 of the present invention. The main circuit is identical to that shown in FIG. 18 of the embodiment 7. In the present embodiment, a dq axial voltage command is not employed but a three-phase instantaneous voltage command is outputted from the overall command generation circuit 16.

As shown in the drawing, the power conversion device includes an overall command generation circuit 16, a DC voltage control circuit 103, and a driving signal production circuit 104, controls a three-phase main inverter 1 and a three-phase sub-inverter 91, and also controls the voltage of a smoothing capacitor 92 that is the DC input of the three-phase sub-inverter 91.

The overall command generation circuit 16 described above is a circuit that generates an output voltage command for the load 90, and outputs a desired voltage, which is outputted in total by all of the three-phase main inverter 1 and three-phase sub-inverter 91, as a three-phase instantaneous voltage command $v_u^*$, $v_v^*$, and $v_w^*$.

Figure 23:
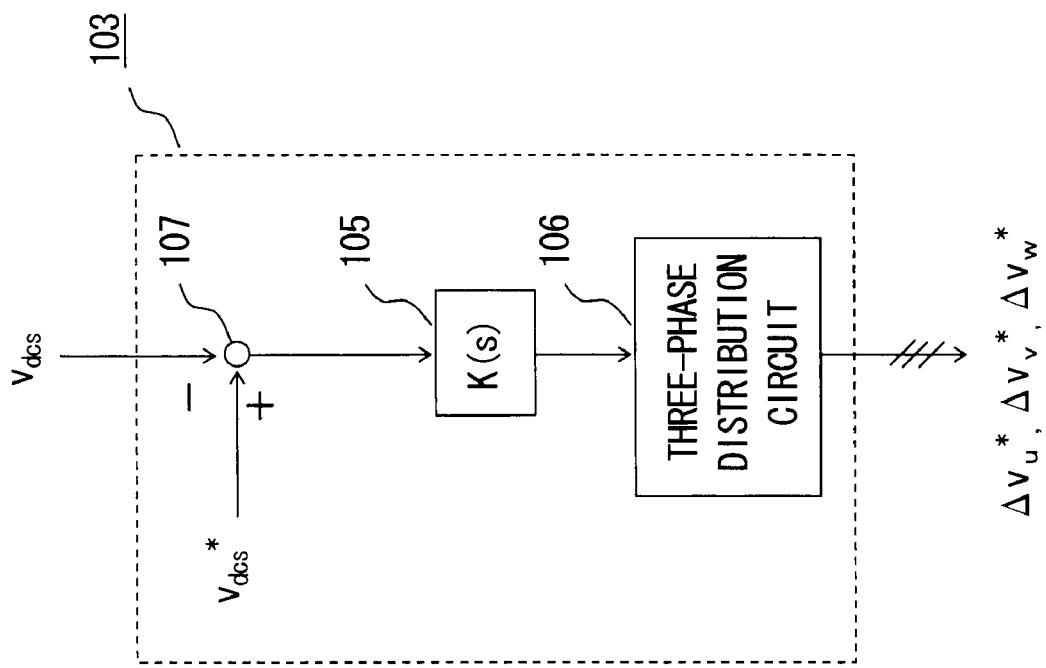
FIG. 23 is a block diagram of a DC voltage control circuit employed in the embodiment 9 of the present invention.

The DC voltage control circuit 103 performs control computation on the basis of the output of a voltage sensor 93 that measures the voltage of the smoothing capacitor 92 which is the DC input of the three-phase sub-inverter 91, and outputs a voltage command as manipulative quantities. The DC voltage control circuit 103 is constructed as shown in, for example, FIG. 23, wherein a subtractor 107 obtains the deviation between the DC voltage $v_{dcs}$ of the smoothing capacitor 92 of the three-phase sub-inverter 91, which is measured by the voltage sensor 93, and a command value $v_{dcs}^*$, and a controller 105 obtains a manipulative quantity. The manipulative quantity is used to adjust the output voltage command for each of the inverters 1 and 91 so that the DC voltage $v_{dcs}$ will follow the command value $v_{dcs}^*$. Manipulative quantities for respective phases $\Delta v_u^*$, $\Delta v_v^*$, and $\Delta v_w^*$ are outputted. The controller 105 may be formed with a general PI control or the like.

Figure 24:
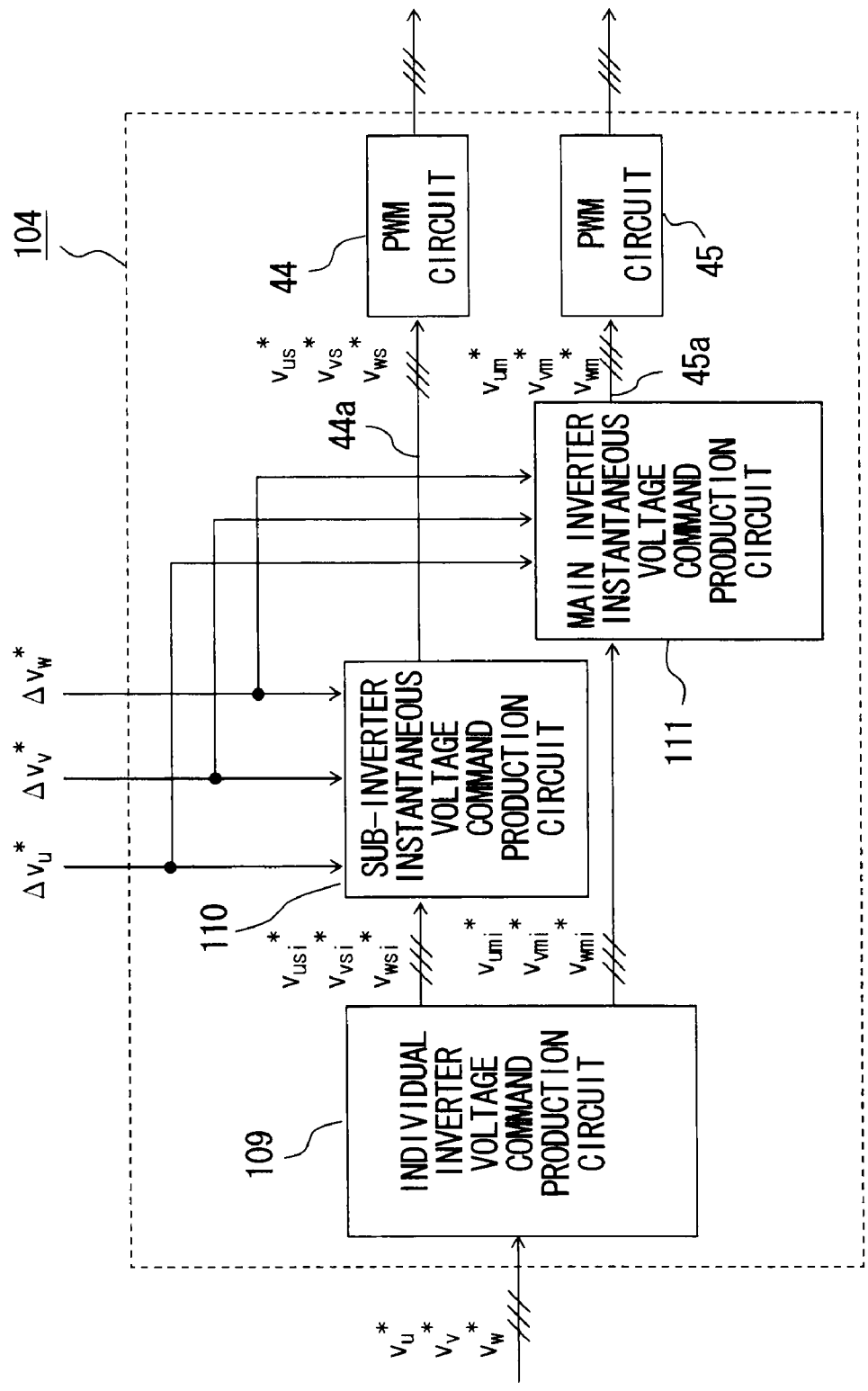
FIG. 24 is a block diagram of a driving signal generation circuit employed in the embodiment 9 of the present invention.

The driving signal production circuit 104 computes a voltage, which is outputted by each of the three-phase main inverter 1 and three-phase sub-inverter 91, on the basis of the outputs of the overall command generation circuit 16 and DC voltage control circuit 103, and produces pulses, with which the respective switching elements are driven, through PWM. The driving signal production circuit 104 is constructed as shown in, for example, FIG. 24, wherein an individual inverter voltage command production circuit 109 produces a voltage command $v_{umi}^*$, $v_{vmi}^*$, and $v_{wmi}^*$ for the three-phase main inverter 1 and a voltage command $v_{usi}^*$, $v_{vsi}^*$ and $v_{wsi}^*$ for the three-phase sub-inverter 91 on the basis of an instantaneous voltage command $v_u^*$, $v_v^*$, and $v_w^*$ outputted from the overall command generation circuit 16. At this time, the respective voltage commands have relationships expressed by equations (46a), (46b), and (46c) below.

$$v_u^* = v_{umi}^* - v_{usi}^* \tag{46a}$$

$$v_v^* = v_{vmi}^* - v_{vsi}^* \tag{46b}$$

$$v_w^* = v_{wmi}^* - v_{wsi}^* \tag{46c}$$

The production of the voltage command $v_{umi}^*$, $v_{vmi}^*$, and $v_{wmi}^*$ for the three-phase main inverter 1 and the voltage command $v_{usi}^*$, $v_{vsi}^*$, and $v_{wsi}^*$ for the three-phase sub-inverter 91 is not limited to the one based on the equations (46a), (46b), and (46c). An arbitrary means such as a method of determining voltages, which are assigned to the three-phase main inverter 1 and three-phase sub-inverter 91, according to the withstand voltage of the switching elements forming the respective inverters 1 and 91, or a method of keeping the voltage, which is outputted by the three-phase main inverter 1 or three-phase sub-inverter 91, constant may be adopted.

A sub-inverter instantaneous voltage command production circuit 110 inputs a sub-inverter voltage command $v_{usi}^*$, $v_{vsi}^*$, and $v_{wsi}^*$ outputted by the individual inverter voltage command production circuit 109, and manipulative quantities for respective phases $\Delta v_u^*$, $\Delta v_v^*$, and $\Delta v_w^*$ outputted by the DC voltage control circuit 103, and computes a sub-inverter final voltage command 44a that is a command for a voltage instantaneous value outputted by the three-phase sub-inverter 91. Herein, as expressed by equations (47a), (47b), and (47c) below, the manipulative quantities for respective phases $\Delta v_u^*$, $\Delta v_v^*$, and $\Delta v_w^*$ outputted from the DC voltage control circuit 103 are added to the sub-inverter voltage command $v_{usi}^*$, $v_{vsi}^*$, and $v_{wsi}^*$ outputted by the individual inverter voltage command production circuit 109 in order to compute the sub-inverter final voltage command 44a ($v_{us}^*$, $v_{vs}^*$, and $v_{ws}^*$)

$$v_{us}^* = v_{usi}^* + \Delta v_u^* \tag{47a}$$

$$v_{vs}^* = v_{vsi}^* + \Delta v_v^* \tag{47b}$$

$$v_{ws}^* = v_{wsi}^* + \Delta v_w^* \tag{47c}$$

The thus computed sub-inverter final voltage command 44a is inputted to a PWM circuit 44, and the PWM circuit 44 outputs a voltage pulse signal, which has the pulse width thereof modulated, so as to drive the three-phase sub-inverter 91.

Moreover, a main inverter instantaneous voltage command production circuit 111 inputs a main inverter voltage command $v_{umi}^*$, $v_{vmi}^*$, and $v_{wmi}^*$ outputted by the individual inverter voltage command production circuit 109, and the manipulative quantities for respective phases $\Delta v_u^*$, $\Delta v_v^*$, and $\Delta v_w^*$ outputted by the DC voltage control circuit 103, and computes a main inverter final voltage command 45a that is a command for a voltage instantaneous value outputted by the three-phase main inverter 1. Herein, as expressed by equations (48a), (48b), and (48c) below, the manipulative quantities for respective phases $\Delta v_u^*$, $\Delta v_v^*$, and $\Delta v_w^*$ outputted by the DC voltage control circuit 103 are added to the main inverter voltage command $v_{umi}^*$, $v_{vmi}^*$, and $v_{wmi}^*$ outputted by the individual inverter voltage command production circuit 109 in order to compute the main inverter final voltage command 45a ($v_{um}^*$, $v_{vm}^*$, and $v_{wm}^*$)

$$v_{um}^* = v_{umi}^* + \Delta v_u^* \tag{48a}$$

$$v_{vm}^* = v_{vmi}^* + \Delta v_v^* \tag{48b}$$

$$v_{wm}^* = v_{wmi}^* + \Delta v_w^* \tag{48c}$$

The thus computed main inverter final voltage command 45a is inputted to a PWM circuit 45, and the PWM circuit 45 outputs a voltage pulse signal, which has the pulse width thereof modulated, so as to drive the three-phase main inverter 1.

Since the three-phase main inverter 1 and three-phase sub-inverter 91 are connected in series with each other face to face with the load 90 between them, the voltage to be applied to the load 90 comes to the difference between the output voltage of the three-phase main inverter 1 and the output voltage of the three-phase sub-inverter 91. Since the manipulative quantities $\Delta v_u^*$, $\Delta v_v^*$, and $\Delta v_w^*$ outputted by the DC voltage control circuit 103 are added to each of the output voltage commands for the three-phase main inverter 1 and three-phase sub-inverter 91, the added manipulative quantities and added manipulative quantities are canceled out. The voltage to be applied to the load 90 is therefore determined with the voltage command $v_u^*$, $v_v^*$, and $v_w^*$ outputted by the overall command generation circuit 16.

Herein, the powers of the three-phase main inverter 1, three-phase sub-inverter 91, and load 90 for the u phase will be discussed below. Assuming that the power factor of the load 90 is $\cos\theta$, the voltage of the u phase of the three-phase main inverter 1 is $v_{um}$, the voltage of the u phase of the three-phase sub-inverter 91 is $v_{us}$, the voltage to be applied to the load 90 is $v_u$, the current flowing into the u phase of the load 90 is $i_u$, and the active power to be fed to the load 90 by the u phase of the three-phase main inverter and the u phase of the three-phase sub-inverter 91 is $p_u$, the active power $p_u$ is expressed by an equation (49) below.

$$p_u = v_u \cdot i_u \cdot \cos\theta \qquad (49)$$
$$= (v_{um} - v_{us}) \cdot i_u \cdot \cos\theta$$

Among voltage components contained in each of the voltages $v_{um}$ and $v_{us}$ outputted by the u phase of the three-phase main inverter 1 and the u phase of the three-phase sub-inverter 91, a component caused by the u-phase voltage command $v_{umi}^*$ or $v_{usi}^*$ outputted by the individual inverter voltage command production circuit 109 shall be $v_{umi}$ or $v_{usi}$, a component caused by the u-phase manipulative quantity $\Delta v_u^*$ outputted by the DC voltage control circuit 103 shall be $\Delta v_u$, the active power outputted by the u phase of the three-phase main inverter 1 shall be $p_{um}$, and the active power outputted by the u phase of the three-phase sub-inverter 91 shall be $p_{us}$. Assuming that $\Delta v_u$ denotes a DC component, relational equations (50a), (50b), and (51) below are established.

$$p_{um} = (v_{um} \cdot \cos\theta + \Delta v_u) \cdot i_u \qquad (50a)$$

$$p_{us} = (v_{us} \cdot \cos\theta + \Delta v_u) \cdot (-i_u) \qquad (50b)$$

$$p_u = p_{um} + p_{us} \qquad (51)$$

From the equations (50a), (50b), and (51), it is understood that $\Delta v_u \cdot i_u$ out of the active power outputted from the u phase of the three-phase main inverter 1 is a component which is fed to the u phase of the three-phase sub-inverter 91 but is not fed to the load 90. The same as that to the u phase applies to the v and w phases.

If power consumption caused by a loss in the three-phase sub-inverter 91 is ignored, the active power fed from the respective phases, $\Delta v_u \cdot i_u + \Delta v_v \cdot i_v + \Delta v_w \cdot i_w$, charges the smoothing capacitor 92 of the three-phase sub-inverter 91 and raises the voltage of the smoothing capacitor 92. Moreover, if $\Delta v_u \cdot i_u + \Delta v_v \cdot i_v + \Delta v_w \cdot i_w$ takes on a negative value, oppositely, the voltage of the smoothing capacitor 92 is lowered.

The voltage of the smoothing capacitor 92 of the three-phase sub-inverter 91 is thus controlled. Since the manipulative quantities for the respective phases $\Delta v_u^*$, $\Delta v_v^*$, and $\Delta v_w^*$ are determined so that the DC voltage $v_{dcs}$ of the smoothing capacitor 92 will follow the command value $v_{dcs}^*$, a desired voltage can be highly reliably sustained.

As mentioned above, in the present embodiment, in the power conversion device that has the three-phase main inverter 1 and three-phase sub-inverter 91 connected in series with each other face to face with the load 90 between them, and that extends control relative to an instantaneous value of a voltage or a current, since the manipulative quantities for the respective phases are determined so that the DC voltage $v_{dcs}$ of the smoothing capacitor 92 of the three-phase sub-inverter 91 will follow the command value $v_{dcs}^*$, and the output voltage command for each of the inverters 1 and 91 is adjusted, the DC voltage $v_{dcs}$ of the smoothing capacitor 92 is controlled to be sustained at a desired voltage. Consequently, in the smoothing capacitor 92 of the three-phase sub-inverter 91, the desired DC voltage can be sustained without feed of power from another power supply. Simplification of a device configuration and cost reduction such as exclusion of a converter for the three-phase sub-inverter 92 and replacement of a multi-winding transformer with a reactor can be achieved.

Incidentally, due to an error or the like of each of the control circuits, when the output voltage command for each of the inverters 1 and 91 is merely adjusted, if the DC voltage control for the smoothing capacitor 92 cannot be precisely achieved, a converter is included in order to feed power from the AC power supply 11. In this case, the capacity of the converter may be much smaller than the conventional one, and the device configuration can be fully simplified.

Moreover, in the embodiment 9, the three-phase main inverter 1 and three-phase sub-inverter 91 are three-phase full-bridge inverters. Even when three single-phase full-bridge inverters are adopted as one or both of the inverters 1 and 91, the same control can be achieved. Moreover, even when the three-phase main inverter 1 and three-phase sub-inverter 91 are three-level inverters, the same control can be achieved. Moreover, if power need not be restored to the AC power supply 11, the converter 5 may be a diode converter.

Embodiment 10

In the embodiment 9, in the driving signal production circuit 104, based on the instantaneous voltage command $v_u^*$, $v_v^*$, and $v_w^*$ outputted from the overall command generation circuit 16, a voltage command is produced for not only the three-phase main inverter 1 but also the three-phase sub-inverter 91. In the present embodiment, the three-phase sub-inverter 91 is operated as an inverter for outputting a voltage that cancels voltage harmonics outputted by the three-phase main inverter 1.

Figure 25:
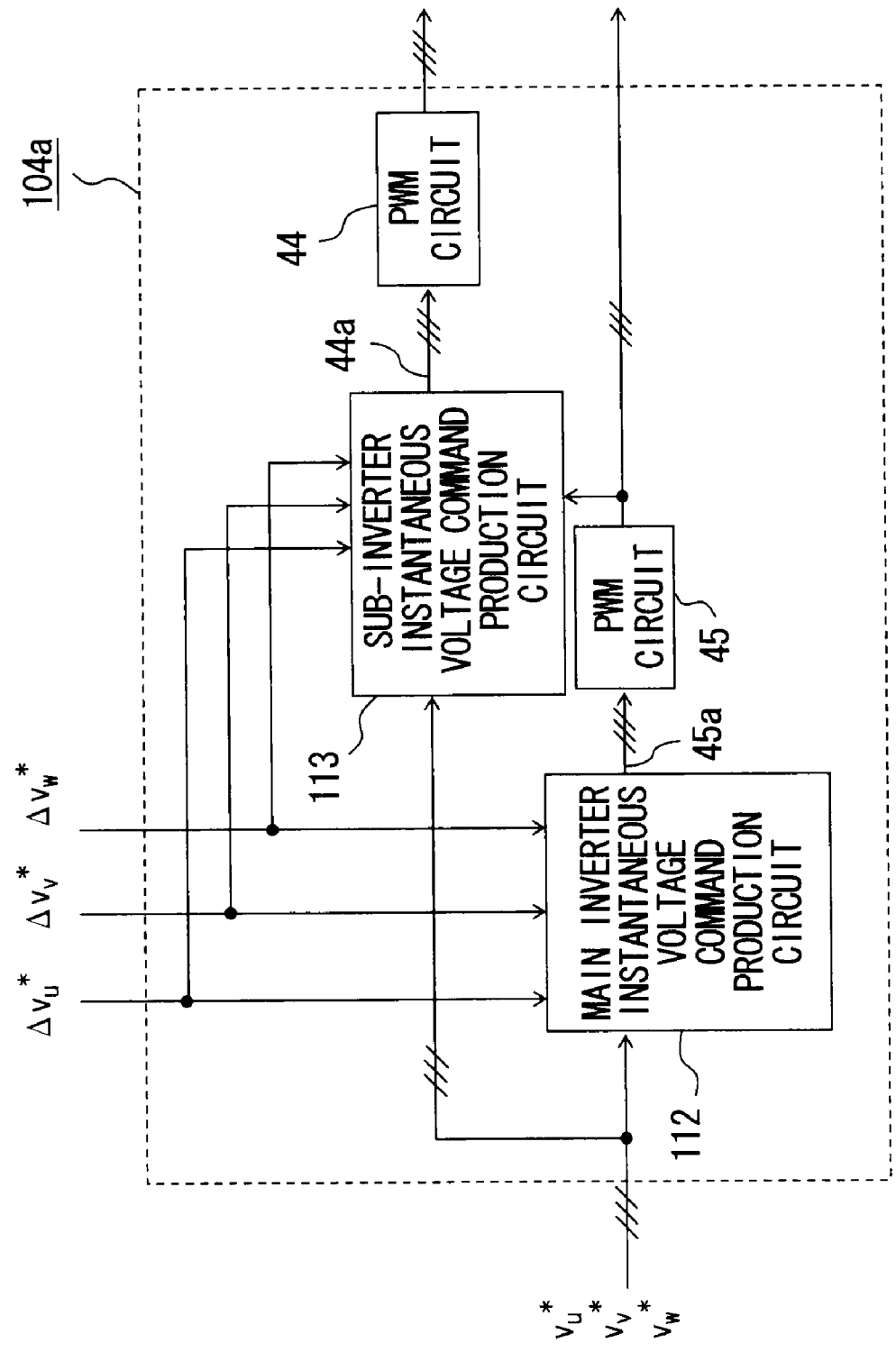
FIG. 25 is a block diagram of a driving signal generation circuit employed in an embodiment 10 of the present invention.

In this case, instead of the driving signal production circuit 104 presented in the embodiment 9, a driving signal production circuit 104a shown in FIG. 25 is employed. The other circuit components are identical to those of the embodiment 9.

The driving signal production circuit 104a computes a voltage, which is outputted by each of the three-phase main inverter 1 and three-phase sub-inverter 91, on the basis of the outputs of the overall command generation circuit 16 and DC voltage control circuit 103, and produces pulses, with which the respective switching elements are driven, through PWM. As shown in FIG. 25, a main inverter instantaneous voltage command production circuit 112 inputs an instantaneous voltage command $v_u^*$, $v_v^*$, and $v_w^*$ outputted from the overall command generation circuit 16, and manipulative quantities for respective phases $\Delta v_u^*$, $\Delta v_v^*$, and $\Delta v_w^*$ outputted by the DC voltage control circuit 103, and computes a main inverter final voltage command 45*a* that is a command for a voltage instantaneous value outputted by the three-phase main inverter 1.

In this case, as expressed by equations (52a), (52b), and (52c) below, the manipulative quantities for respective phases $\Delta v_u^*$, $\Delta v_v^*$, and $\Delta v_w^*$ outputted by the DC voltage control circuit 103 are added to the instantaneous voltage command $v_u^*$, $v_v^*$, and $v_w^*$ in order to compute the main inverter final voltage command 45*a* ($v_{um}^*$, $v_{vm}^*$, and $v_{wm}^*$)

$$v_{um}^* = v_u^* + \Delta v_u^* \tag{52a}$$

$$v_{vm}^* = v_v^* + \Delta v_v^* \tag{52a}$$

$$v_{wm}^* = v_w^* + \Delta v_w^* \tag{52a}$$

The thus computed main inverter final voltage command 45*a* is inputted to a PWM circuit 45, and the PWM circuit 45 outputs a voltage pulse signal, which has the pulse width thereof modulated, so as to drive the three-phase main inverter 1.

A sub-inverter instantaneous voltage command production circuit 113 inputs a voltage command $v_u^*$, $v_v^*$, and $v_w^*$ outputted from the overall command generation circuit 16, and the manipulative quantities of respective phases $\Delta v_u^*$, $\Delta v_v^*$, and $\Delta v_w^*$ outputted by the DC voltage control circuit 103, and further inputs a voltage pulse signal $v_{umpwm}$, $v_{vmpwm}$, and $v_{wmpwm}$ for the three-phase main inverter 1 outputted by the PWM circuit 45. Based on the input signals, the sub-inverter instantaneous voltage command production circuit 113 computes a sub-inverter final voltage command 44*a* ($v_{us}^*$, $v_{vs}^*$, and $v_{ws}^*$) which is a command for a voltage instantaneous value outputted by the three-phase sub-inverter 91, as expressed by equations (53a), (53b), and (53c) below.

$$v_{us}^* = -v_u^* + \Delta v_u^* + v_{umpwm} \tag{53a}$$

$$v_{vs}^* = -v_v^* + \Delta v_v^* + v_{vmpwm} \tag{53b}$$

$$v_{ws}^* = -v_w^* + \Delta v_w^* + v_{wmpwm} \tag{53c}$$

The thus computed sub-inverter final voltage command 44*a* is inputted to a PWM circuit 44, and the PWM circuit 44 outputs a voltage pulse signal, which has the pulse width thereof modulated, so as to drive the three-phase sub-inverter 91.

Under the foregoing control, the three-phase main inverter 1 outputs a voltage caused by an output voltage command having the manipulative quantities of respective phases $\Delta v_u^*$, $\Delta v_v^*$, and $\Delta v_w^*$, which are outputted by the DC voltage control circuit 103, added to the instantaneous voltage command $v_u^*$, $v_v^*$, and $v_w^*$ outputted from the overall command generation circuit 16.

The three-phase sub-inverter 91 outputs a voltage caused by an output voltage command having the manipulative quantities of respective phases $\Delta v_u^*$, $\Delta v_v^*$, and $\Delta v_w^*$, which are outputted by the DC voltage control circuit 103, and the voltage pulse signal $v_{umpwm}$, $v_{vmpwm}$ and $v_{wmpwm}$ for the three-phase main inverter 1 added to a command produced by reversing the polarity of the instantaneous voltage command $v_u^*$, $v_v^*$, and $v_w^*$ outputted from the overall command generation circuit 16. Since the voltage pulse signal $v_{umpwm}$, $v_{vmpwm}$, and $v_{wmpwm}$ is added to a signal of respective phases that is a three-phase instantaneous voltage into which the command $-v_u^*$, $-v_v^*$, and $-v_w^*$ is converted, the fundamental wave component of the instantaneous voltage is canceled by the voltage command of the reverse polarity $-v_u^*$, $-v_v^*$, and $-v_w^*$. The sub-inverter final voltage command 44*a* becomes a command causing output of a voltage that is in phase with the harmonics outputted from the three-phase main inverter 1.

Since the three-phase main inverter 1 and three-phase sub-inverter 91 are connected in series with each other face to face with the load 90 between them, the voltage to be applied to the load 90 comes to the difference between the output voltage of the three-phase main inverter 1 and the output voltage of the three-phase sub-inverter 91. Consequently, the three-phase sub-inverter 91 operates to cancel the voltage harmonics outputted by the three-phase main inverter 1.

Further, similarly to the embodiment 9, since the manipulative quantities for respective phases $\Delta v_u^*$, $\Delta v_v^*$, and $\Delta v_w^*$ outputted by the DC voltage control circuit 103 are added to each of the output voltage commands for the three-phase main inverter 1 and three-phase sub-inverter 91, the added manipulative quantities and added manipulative quantities are canceled out. The voltage to be applied to the load 90 is therefore determined with the voltage command $v_u^*$, $v_v^*$, and $v_w^*$ outputted by the overall command generation circuit 16. Consequently, similarly to the embodiment 9, the active power $\Delta v_u \cdot i_u + \Delta v_v \cdot i_v + \Delta v_w \cdot i_w$ fed from the respective phases out of the active power outputted by the three-phase main inverter 1 charges the smoothing capacitor 92 of the three-phase sub-inverter 91, and raises the voltage of the smoothing capacitor 92. Moreover, if $\Delta v_u \cdot i_u + \Delta v_v \cdot i_v + \Delta v_w \cdot i_w$ takes on a negative value, oppositely, the voltage of the smoothing capacitor 92 is lowered.

The voltage of the smoothing capacitor 92 of the three-phase sub-inverter 91 is thus controlled. Since the manipulative quantities for respective phases $\Delta v_u^*$, $\Delta v_v^*$, and $\Delta v_w^*$ are determined so that the DC voltage $v_{dcs}$ of the smoothing capacitor 92 will follow the command value $V_{dcs}^*$, a desired voltage can be highly reliably sustained.

A voltage outputted by the three-phase main inverter 1 contains harmonics due to PWM control. In the present embodiment, since the three-phase sub-inverter 91 is operated to cancel the voltage harmonics outputted by the three-phase main inverter 1, the voltage to be fed to the load 90 has the harmonics suppressed.

Moreover, since the manipulative quantities are determined so that the DC voltage $V_{dcs}$ of the smoothing capacitor 92 of the three-phase sub-inverter 91 will follow the command value $V_{dcs}^*$, and the output voltage command for each of the inverters 1 and 91 is adjusted, the DC voltage $V_{dcs}$ of the smoothing capacitor 92 is controlled to be sustained at a desired voltage. Consequently, the same advantage as that of the embodiment 9 is exerted. In the smoothing capacitor 92 of the three-phase sub-inverter 91, the desired DC voltage can be sustained without feed of power from another power source. Simplification of a device configuration and cost reduction such as exclusion/simplification of a converter for the three-phase sub-inverter 91 and replacement of a multi-winding transformer with a reactor can be achieved.

Embodiment 11

A power conversion device in accordance with an embodiment 11 of the present invention will be described below, rebating to the drawings.

Figure 26:
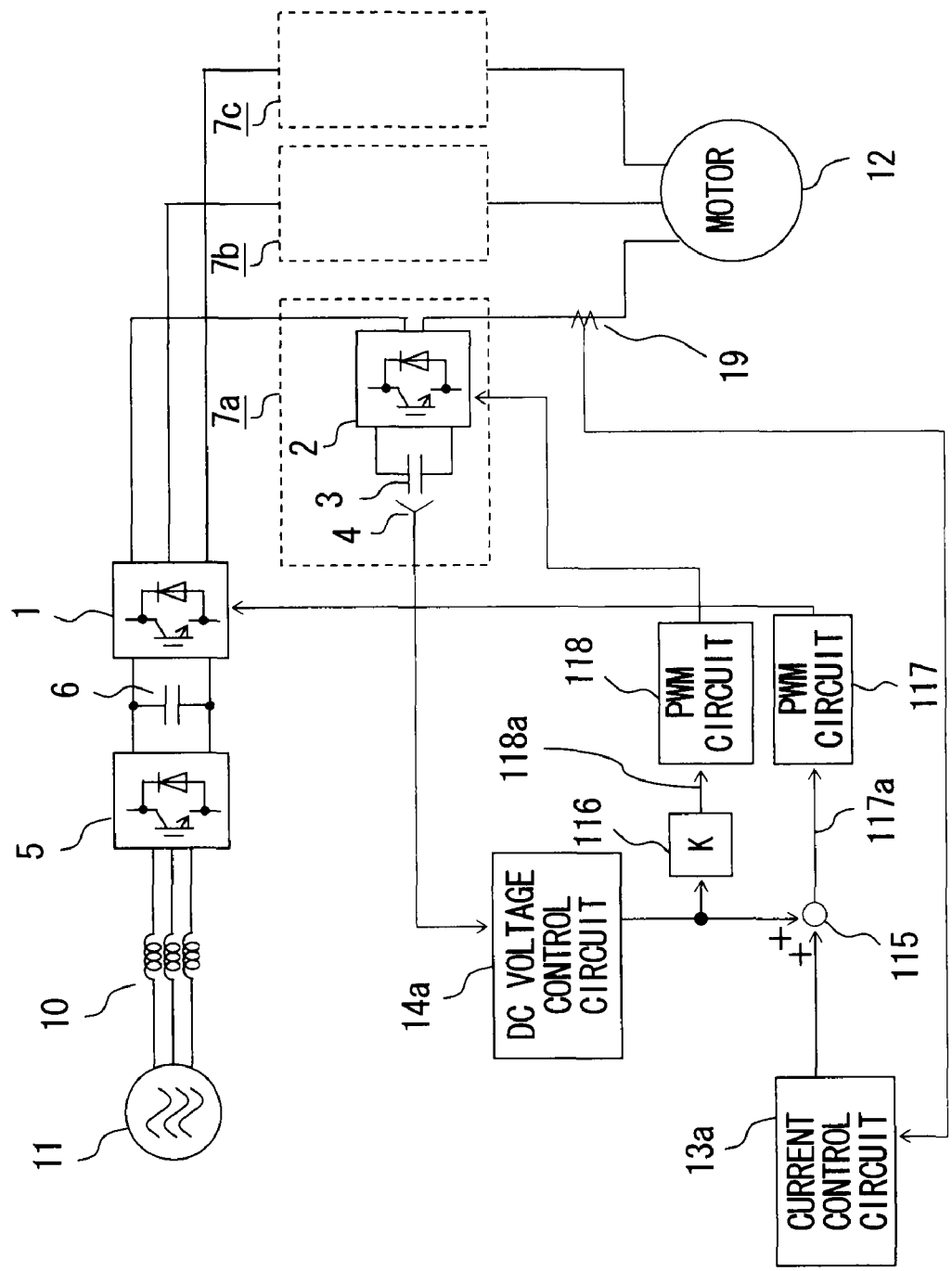
FIG. 26 is a configuration diagram of a power conversion device in accordance with an embodiment 11 of the present invention.

FIG. 26 is a diagram showing the configuration of the power conversion device in accordance with the embodiment 11 of the present invention. As shown in FIG. 26, the power conversion device has single-phase sub-inverters 2 of which AC sides of respective phases are connected in series with respective phase output lines on an AC side of a three-phase main inverter 1.

The three-phase main inverter 1 has a smoothing capacitor 6, which serves as a first DC power supply, on the DC side thereof, and further has a converter 5 connected in parallel therewith. On the AC side of the converter 5, an AC power supply 11 is connected via a reactor 10. Each of the single-phase sub-inverters 2 for the u phase, v phase, and w phase has a smoothing capacitor 3, which serves as a second DC power supply, on the DC side thereof, has one terminal thereof on the AC side thereof connected to the three-phase main inverter 1, and has the other terminal thereof connected to a motor 12 serving as a load. Thus, sub-inverter units 7a to 7c for the u phase, v phase, and w phase are constructed.

The foregoing main circuitry is identical to those of the embodiments 1 to 4. Herein, the load 12 is a motor.

Moreover, for convenience' sake, only the single-phase sub-inverter and smoothing capacitor for the u phase out of the respective single-phase sub-inverters 2a to 2c and respective smoothing capacitors 3a to 3c for the u phase, v phase, and w phase are shown as each of the single-phase sub-inverters 2 and each of the smoothing capacitors 3.

Moreover, the circuitries of the three-phase main inverter 1, converter 5, and single-phase sub-inverters 2 are identical to those shown in FIG. 2 to FIG. 4. Further, even in this case, the three-phase main inverter 1 is regarded as having first single-phase inverters star-connected as three phase parts. For each of phases, the AC side of the first single-phase inverter (each phase part of the three-phase main inverter 1) and the AC side of the single-phase sub-inverter 2 serving as a second single-phase inverter connected in series with each other.

The power conversion device in accordance with the embodiment 11 includes, as shown in FIG. 26, an initial charging control device for the purpose of initially charging the smoothing capacitor 3 of each of the single-phase sub-inverters 2. The initial charging control device includes a current control circuit 13a, a DC voltage control circuit 14a, an adder 115, a gain 116, PWM circuits 117 and 118, and a current sensor 19.

Initial charging of the smoothing capacitor 3 of the u-phase sub-inverter unit 7a by the initial charging control device for the u phase will be described below. For the v phase and w phase, the same initial charging control devices are included for controlling initial charging in the same manner. The initial charging control devices for the respective phases may be constructed as one device.

The current control circuit 13a is a control circuit that performs feedback control on a current which flows into the motor 12 and which is measured by a current sensor 19, and outputs a voltage command $v_u^*$ for the three-phase main inverter 1 so that the measured current will follow a command value.

Herein, the current command value shall be a value equal to or smaller than the current capacity of the switching elements forming each of the inverters 1 and 2, and the voltage command $v_u^*$ shall be a command of a DC voltage.

Figure 27:
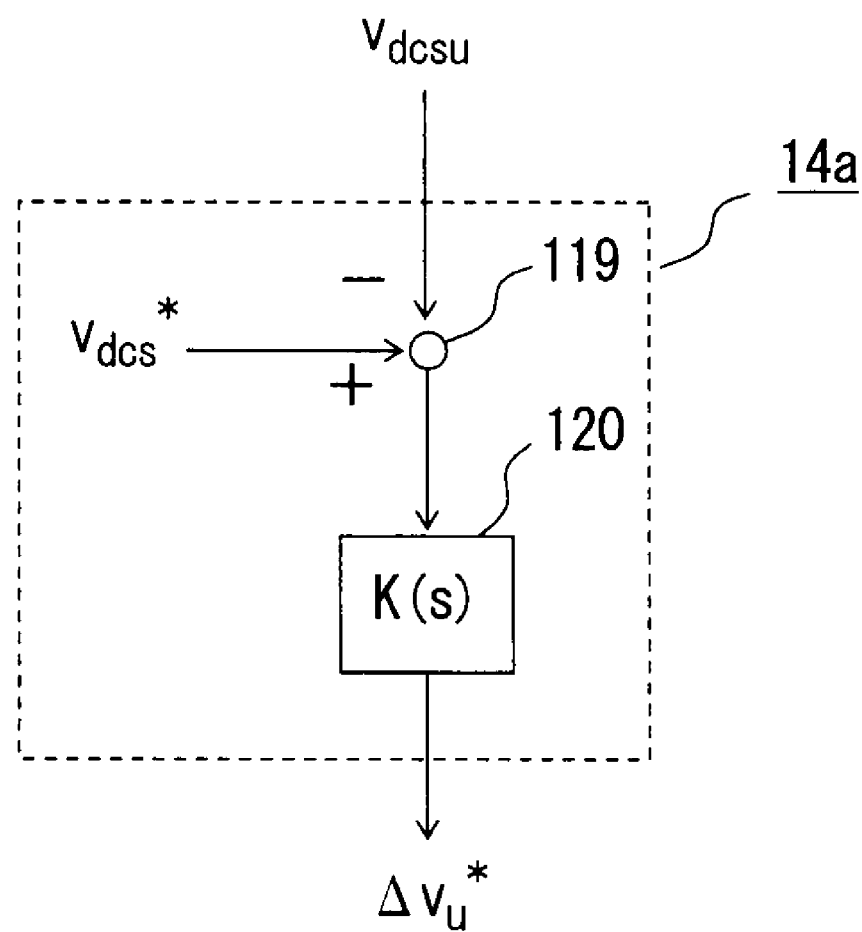
FIG. 27 is a block diagram of a DC voltage control circuit employed in the embodiment 11 of the present invention.

The DC voltage control circuit 14a performs control computation on the basis of the output of the voltage sensor 4 that measures the voltage of the smoothing capacitor 3 that is the DC input of the single-phase sub-inverter 2, and outputs a voltage command as a manipulative quantity. The DC voltage control circuit 14a is constructed as shown in, for example, FIG. 27, wherein a subtractor 119 obtains the deviation between the DC voltage $v_{dcsu}$ of the smoothing capacitor 3 of the single-phase sub-inverter 2, which is measured by the voltage sensor 4, and a command value $V_{dcs}^*$, and a controller 120 obtains and outputs a manipulative quantity $\Delta v_u^*$. The manipulative quantity is used to adjust the output voltage command for each of the inverters 1 and 2 so that the DC voltage $V_{dcsu}$ will follow the command value $V_{dcs}^*$. Incidentally, the controller 120 may be formed with a general PI control or the like.

The voltage command $v_u^*$ outputted by the current control circuit 13a and the manipulative quantity $\Delta v_u^*$ outputted by the DC voltage control circuit 14a are added up, as expressed by an equation (54) below, by an adder 115 in order to compute a main inverter voltage command 117a ($v_{um}^*$) that is a u-phase output voltage command for the three-phase main inverter 1.

$$v_{um}^* = v_u^* + \Delta v_u^* \tag{54}$$

The thus computed main inverter voltage command 117a is inputted to a PWM circuit 117, and the PWM circuit 117 outputs a voltage pulse signal, which has the pulse width thereof modulated, so as to drive the three-phase main inverter 1.

The manipulative quantity $\Delta v_u^*$ outputted by the DC voltage control circuit 14a is multiplied by −1 by the gain 116 in order to reverse the polarity thereof, and a sub-inverter voltage command 118a ($v_{us}^* = -\Delta v_u^*$) that is an output voltage command for the single-phase sub-inverter 2 for the u phase is computed.

The thus computed sub-inverter voltage command 118a is inputted to a PWM circuit 118, and the PWM circuit 118 outputs a voltage pulse signal, which has the pulse width thereof modulated, so as to drive the single-phase sub-inverter 2.

The three-phase main inverter 1 and single-phase sub-inverter 2 are connected in series with each other, and the total value of the voltages outputted by the three-phase main inverter 1 and single-phase sub-inverter 2 becomes the voltage of the motor 12. The single-phase sub-inverter 2 outputs a voltage caused by a voltage command produced by reversing the polarity of the manipulative quantity $\Delta v_u^*$. Consequently, out of the voltage outputted by the three-phase main inverter 1, a voltage component $\Delta v_u^*$ caused by the manipulative quantity $\Delta v_u^*$ is canceled by the voltage outputted by the single-phase sub-inverter 2. The voltage to be applied to the motor 12 is determined by the voltage command $v_u^*$ outputted by the current control circuit 13a.

Consequently, the current control circuit 13a and DC voltage control circuit 14a operate independently of each other. The manipulative quantity $\Delta v_u^*$ outputted by the DC voltage control circuit 14a does not affect the motor 12.

As mentioned above, the current flowing through the three-phase main inverter 1 and single-phase sub-inverter 2 is controlled by the current control circuit 13a. When a current command value equal to or smaller than the current capacity of the switching elements is adopted as mentioned above, the switching elements can be protected from a breakdown caused by an overcurrent. Moreover, a protective circuit need not be operated. When the current command value is set to the largest possible value equal to or smaller than the current capacity, the current capacity of the switching elements can be utilized to the greatest extent, and initial charging can be achieved swiftly.

As mentioned above, the voltage to be applied to the motor 12 is determined with the voltage command $v_u^*$ outputted by the current control circuit 13a, and a DC voltage that does not permit the motor 12 to rotate is applied.

Now, the powers of the three-phase main inverter 1, single-phase sub-inverter 2, and motor 12 for the u phase will be discussed. Assuming that the voltage of the three-phase main inverter 1 is $v_{um}$, the voltage of the single-phase sub-inverter 2 is $v_{us}$, the voltage to be applied to the motor 12 is $v_u$, the current flowing into the motor 12 is $i_u$, and the active power to be fed to the motor 12 by the three-phase main inverter 1 and sub-inverter 2 is $p_u$, the active power $p_u$ is expressed by an equation (55) below.

$$p_u = v_u \cdot i_u \qquad (55)$$
$$= (v_{um} - v_{us}) \cdot i_u$$

Assuming that a voltage component caused by the manipulative quantity $\Delta v_u^*$ out of voltage components contained in each of the voltages $v_{um}$ and $v_{us}$ outputted by the three-phase main inverter 1 and single-phase sub-inverter 2 is $\Delta v_u$, the power outputted by the three-phase main inverter 1 is $p_{mu}$, and the power outputted by the single-phase sub-inverter 2 is $p_{su}$, $p_{mu}$ and $p_{su}$ are expressed by equations (56) and (57) below.

$$p_{mu} = v_{um} \cdot i_u \qquad (56)$$
$$= (v_u + \Delta v_u) \cdot i_u$$
$$p_{su} = v_{us} \cdot i_u \qquad (57)$$
$$= -\Delta v_u \cdot i_u$$

Herein, $p_u$, $p_{mu}$, and $p_{su}$ have a relationship expressed by an equation (58).

$$p_u = p_{mu} + p_{su} \qquad (58)$$

From the equations (56) to (58), it is understood that $\Delta v_u \cdot i_u$ out of the power outputted from the three-phase main inverter 1 is a component which is fed to the single-phase sub-inverter 2 but is not fed to the motor 12. If power consumption caused by a loss in the single-phase sub-inverter 2 is ignored, $\Delta v_u \cdot i_u$ charges the smoothing capacitor 3 of the single-phase sub-inverter 2, and increases the voltage of the smoothing capacitor 3.

By performing the foregoing control, power can be fed from the three-phase main inverter 1 to the single-phase sub-inverter 2 without operation of the motor 12, and the smoothing capacitor 3 can be charged. Consequently, the necessity of a charging circuit that charges the smoothing capacitor 3 is obviated.

When the same circuitry is included for the v phase and w phase alike, the smoothing capacitors 3 of the single-phase sub-inverters 2 for the respective phases can be charged independently of one another. Moreover, even when the three-phase main inverter 1 is constructed using single-phase inverters for the respective phases, charging can be achieved according to the same method.

As mentioned above, in the present embodiment, since the smoothing capacitors 3 of the single-phase sub-inverters 2 can be initially charged without reception of power fed from an external power supply via converters, a structure suitable for a power conversion device that has converters, which are used to feed power to the smoothing capacitors 3, excluded for the purpose of facilitating compactness and simplicity ensues.

Incidentally, the foregoing initial charging control can be applied to the aforesaid embodiments 1 to 4. In this case, a current sensor 19 that detects a current flowing into the load 12 is included, and the overall command generation circuit 13 or 16, DC voltage control circuit 14 or 17, and driving signal production circuit 15 (15a) or 18 (18a) are used to initially charge the smoothing capacitors 3a to 3c of the single-phase sub-inverters 2a to 2c. The overall command generation circuit 13 or 16 outputs a command of a voltage that does not permit the load 12 to operate. The output voltage command is regarded as an output voltage command for the three-phase main inverter 1, and the output voltage command for the single-phase sub-inverters 2a to 2c is set to 0. Manipulative quantities obtained by the DC voltage control circuit 14 or 17 are used to adjust the output voltage command for each of the inverters 1 and 2a to 2c. Consequently, similarly to the embodiment 11, the smoothing capacitors 3a to 3c of the single-phase sub-inverters 2a to 2c can be initially charged, and the same advantage can be exerted.

EMBODIMENT 12

Figure 28:
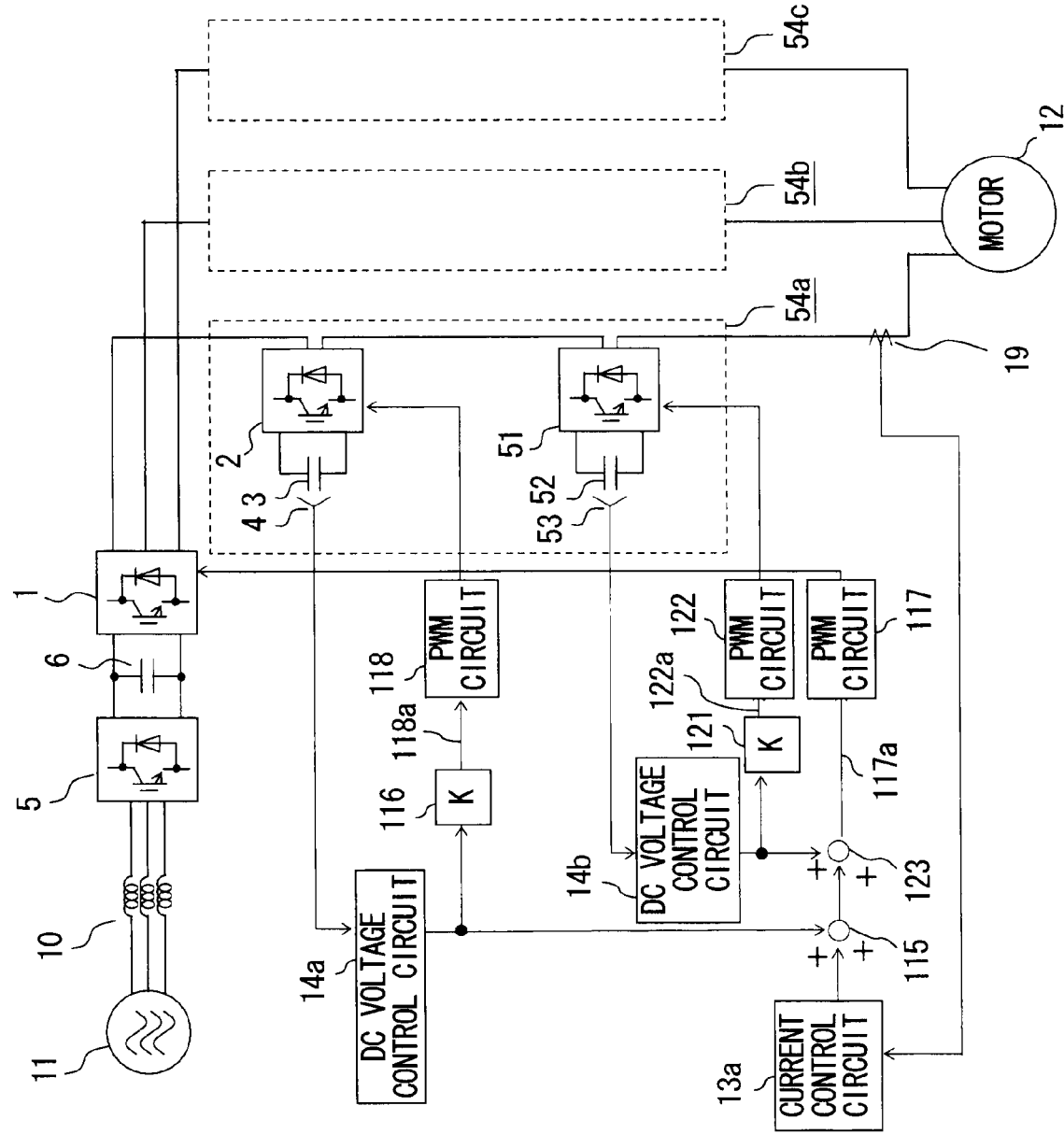
FIG. 28 is a configuration diagram of a power conversion device in accordance with an embodiment 12 of the present invention.

FIG. 28 is a diagram showing the configuration of a power conversion device in accordance with an embodiment 12 of the present invention. In the embodiment 11, the power conversion device has the single-phase sub-inverters 2 of which the AC sides of the respective phases are connected in series with the respective phase output lines on the AC side of the three-phase main inverter 1. In the present embodiment, each of sub-inverter units 54a to 54c for respective phases is constructed by connecting AC sides of two single-phase sub-inverters 2 and 51 in series with each other, and the two single-phase sub-inverters 2 and 51 serving as second single-phase inverters are connected in series with each of phase output lines on an AC side of a three-phase main inverter 1 (first single-phase inverters for three phases). Power is thus fed to a motor 12.

The second single-phase sub-inverters 51 have the same circuitry as the single-phase sub-inverters 2 (see FIG. 4). Specifications including an output voltage may be different from those for the single-phase sub-inverters 2.

The three-phase main inverter 1 has a smoothing capacitor 6, which serves as a first DC power supply, on the DC side thereof, and further has a converter 5 connected in parallel therewith. On the AC side of the converter 5, an AC power supply 11 is connected via a reactor 10. The respective single-phase sub-inverters 2 and 51 for the u phase, v phase, and w phase have smoothing capacitors 3 and 52, which serves as second DC power supplies, on the DC sides thereof.

The foregoing main circuitry is identical to those of the embodiments 5 and 6. Herein, the load 12 is a motor. For convenience' sake, among the single-phase sub-inverters 2a to 2c and 51a to 51c and smoothing capacitors 3a to 3c and 52a to 52c for the u phase, v phase, and w phase, the sub-inverters and smoothing capacitors for the u phase alone are shown as the single-phase sub-inverter 2, single-phase sub-inverter 51, smoothing capacitor 3, and smoothing capacitor 52.

The power conversion device in accordance with the embodiment 12 includes, as shown in FIG. 28, an initial charging control device for the purpose of initially charging the smoothing capacitors 3 and 52 of the respective single-phase sub-inverters 2 and 51. The initial charging control device includes a current control circuit 13a, DC voltage control circuits 14a and 14b, adders 115 and 123, gains 116 and 121, PWM circuits 117, 118, and 122, and a current sensor 19.

Initial charging of the smoothing capacitors 3 and 52 of the u-phase sub-inverter unit 54a by the initial charging control device for the u phase will be described below. For the v phase and w phase alike, the same initial charging control device is included in order to control initial charging in the same manner. The initial charging control devices for the respective phases may be constructed as one device.

The current control circuit 13a is a control circuit that performs feedback control on a current which flows into the motor 12 and which is measured by the current sensor 19, and outputs a voltage command $v_u^*$ for the three-phase main inverter 1 so that the measured current will follow a command value.

Herein, the current command value shall be a value equal to or smaller than the current capacity of switching elements forming each of the inverters 1, 2, and 51, and the voltage command $v_u^*$ shall be a command of a DC voltage.

The DC voltage control circuits 14a and 14b perform control computation on the basis of the outputs of the voltage sensors 4 and 53 that measure the voltages of the smoothing capacitors 3 and 52 which are the DC inputs of the respective single-phase sub-inverters 2 and 51 respectively, and outputs manipulative quantities $\Delta v_{u1}^*$ and $\Delta v_{u2}^*$ which are used to adjust the output voltage command for each of the inverters 1, 2, and 51. The DC voltage control circuits 14a and 14b obtain the deviations between the DC voltages of the smoothing capacitors 3 and 52, which are measured by the voltage sensors 4 and 53 respectively, and a command value, and obtain the manipulative quantities $\Delta v_{u1}^*$ and $\Delta v_{u2}^*$ so that the DC voltages will follow the command value.

To the voltage command $v_u^*$ outputted by the current control circuit 13a, the manipulative quantity $\Delta v_{u1}^*$ outputted by the DC voltage control circuit 14a is added by the adder 115, and the manipulative quantity $\Delta v_{u2}^*$ outputted by the DC voltage control circuit 14b is added by the adder 123. Thus, a main inverter voltage command 117a ($v_{um}^* = v_u^* + \Delta v_{u1}^* + \Delta v_{u2}^*$) that is a u-phase output voltage command for the three-phase main inverter 1 is computed.

The thus computed main inverter voltage command 117a is inputted to the PWM circuit 117, and the PWM circuit 117 outputs a voltage pulse signal, which has the pulse width thereof modulated, so as to drive the three-phase main inverter 1.

On the other hand, the manipulative quantity $\Delta v_{u1}^*$ outputted by the DC voltage control circuit 14a is multiplied by −1 by the gain 116 in order to reverse the polarity thereof. A sub-inverter voltage command 118a ($v_{us1}^* = -\Delta v_{u1}^*$) that is an output voltage command for the single-phase sub-inverter 2 is thus computed.

The thus computed sub-inverter voltage command 118a is inputted to the PWM circuit 118, and the PWM circuit 118 outputs a voltage pulse signal, which has the pulse width thereof modulated, so as to drive the single-phase sub-inverter 2.

Moreover, the manipulative quantity $\Delta v_{u2}^*$ outputted by the DC voltage control circuit 14b is multiplied by −1 by the gain 121 in order to reverse the polarity thereof. A second sub-inverter voltage command 122a ($v_{us2}^* = -\Delta v_{u2}^*$) that is an output voltage command for the second single-phase sub-inverter 51 is thus computed.

The thus computed second sub-inverter voltage command 122a is inputted to the PWM circuit 122, and the PWM circuit 122 outputs a voltage pulse signal, which has the pulse width thereof modulated, so as to drive the second single-phase sub-inverter 51.

As mentioned above, since the three-phase main inverter 1, single-phase sub-inverter 2, and second single-phase sub-inverter 51 are connected in series with one another, the voltage to be applied to the motor 12 is the sum total of the voltages to be outputted by the respective inverters 1, 2, and 51. The manipulative quantities $\Delta v_{u1}^*$ and $\Delta v_{u2}^*$ outputted by the DC voltage control circuits 14a and 14b are added for computation of the voltage command for the three-phase main inverter 1, and are subtracted for computation of the voltage command for the single-phase sub-inverter 2 or 51. Out of the voltage outputted by each of the inverters 1, 2, and 51, a voltage component caused by the added manipulative quantities and a voltage component caused by the subtracted manipulative quantities are canceled out. The voltage to be applied to the motor 12 is determined with the voltage command $v_u^*$ outputted by the current control circuit 13a.

Consequently, the current control circuit 13a and the DC voltage control circuits 14a and 14b operate independently of one another, and the manipulative quantities outputted by the DC voltage control circuits 14a and 14b do not affect the motor 12.

As mentioned above, a current flowing through the three-phase main inverter 1 and single-phase sub-inverters 2 and 52 is controlled by the current control circuit 13a. When a current command value equal to or smaller than the current capacity of the switching elements is adopted as mentioned above, the switching elements can be protected from a breakdown caused by an overcurrent. Moreover, a protective circuit need not be operated. When the current command value is set to the largest possible value equal to or smaller than the current capacity, while the current capacity of the switching elements is utilized to the greatest extent, initial charging can be swiftly achieved.

As mentioned above, the voltage to be applied to the motor 12 is determined with the voltage command $v_u^*$ outputted by the current control circuit 13a, and a DC voltage that does not permit the motor 12 to rotate is applied.

Herein, assuming that a current flowing into the motor 12 is $i_u$, and voltage components, which are caused by the manipulative quantities $\Delta v_{u1}^*$ and $\Delta v_{u2}^*$, out of a voltage outputted by each of the inverters 1, 2, and 51 are $\Delta v_{u1}$ and $\Delta v_{u2}$, when the powers of the three-phase main inverter 1 and single-phase sub-inverters 2 and 51 for the u phase are discussed, it is understood that out of the power outputted from the three-phase main inverter 1, $\Delta v_{u1} \cdot i_u$ is a component which is fed to the single-phase sub-inverter 2 and $\Delta v_{u2} \cdot i_u$ is a component which is fed to the second single-phase sub-inverter 51. When power consumption caused by a loss in the single-phase sub-inverters 2 and 51 is ignored, $\Delta v_{u1} \cdot i_u$ and $\Delta v_{u2} \cdot i_u$ charge the smoothing capacitors 3 and 52 of the single-phase sub-inverters 2 and 51 and increase the voltages of the smoothing capacitors 3 and 52.

By performing the foregoing control, power can be fed from the three-phase main inverter 1 to the single-phase sub-inverters 2 and 51 without operation of the motor 12, and the smoothing capacitors 3 and 52 can be charged. Consequently, the necessity of a charging circuit for charging the smoothing capacitors 3 and 52 can be obviated.

Incidentally, when the same circuitry is included for the v phase and w phase alike, the smoothing capacitors of the sub-inverters for the phases can be charged independently among the phases. Moreover, even when the three-phase main inverter 1 is constructed using single-phase inverters for the respective phases, charging can be achieved according to the same method.

As mentioned above, the power conversion device in accordance with the present embodiment can initially charge the smoothing capacitors 3 and 52 of the single-phase sub-inverters 2 and 51 without reception of power fed from an external power supply via a converter. Consequently, a structure suitable for a power conversion device that has converters, which are used to feed power to the smoothing capacitors 3 and 52, excluded therefrom and that has compactness and simplicity facilitated ensues.

The aforesaid initial charging control can be applied to the embodiments 5 and 6. In this case, a current sensor 19 that detects a current flowing into the load 12 is included, and the overall command generation circuit 13 or 16, DC voltage control circuit 57 or 81, and driving signal production circuit 58 or 82 are used to initially charge the smoothing capacitors 3a to 3c and 52a to 52c of the single-phase sub-inverters 2a to 2c and 51a to 51c. The overall command generation circuit 13 or 16 outputs a command of a voltage that does not permit the load 12 to operate. The output voltage command is used as an output voltage command for the three-phase main inverter 1, and an output voltage command for the single-phase sub-inverters 2a to 2c or 51a to 51c is set to 0. Manipulative quantities obtained by the DC voltage control circuit 57 or 81 are used to adjust the output voltage command for each of the inverters 1, 2a to 2c, and 51a to 51c. Consequently, similarly to the embodiment 12, the smoothing capacitors 3a to 3c and 52a to 52c of the single-phase sub-inverters 2a to 2c and 51a to 51c can be initially charged. The same advantage can be exerted.

EMBODIMENT 13

Figure 29:
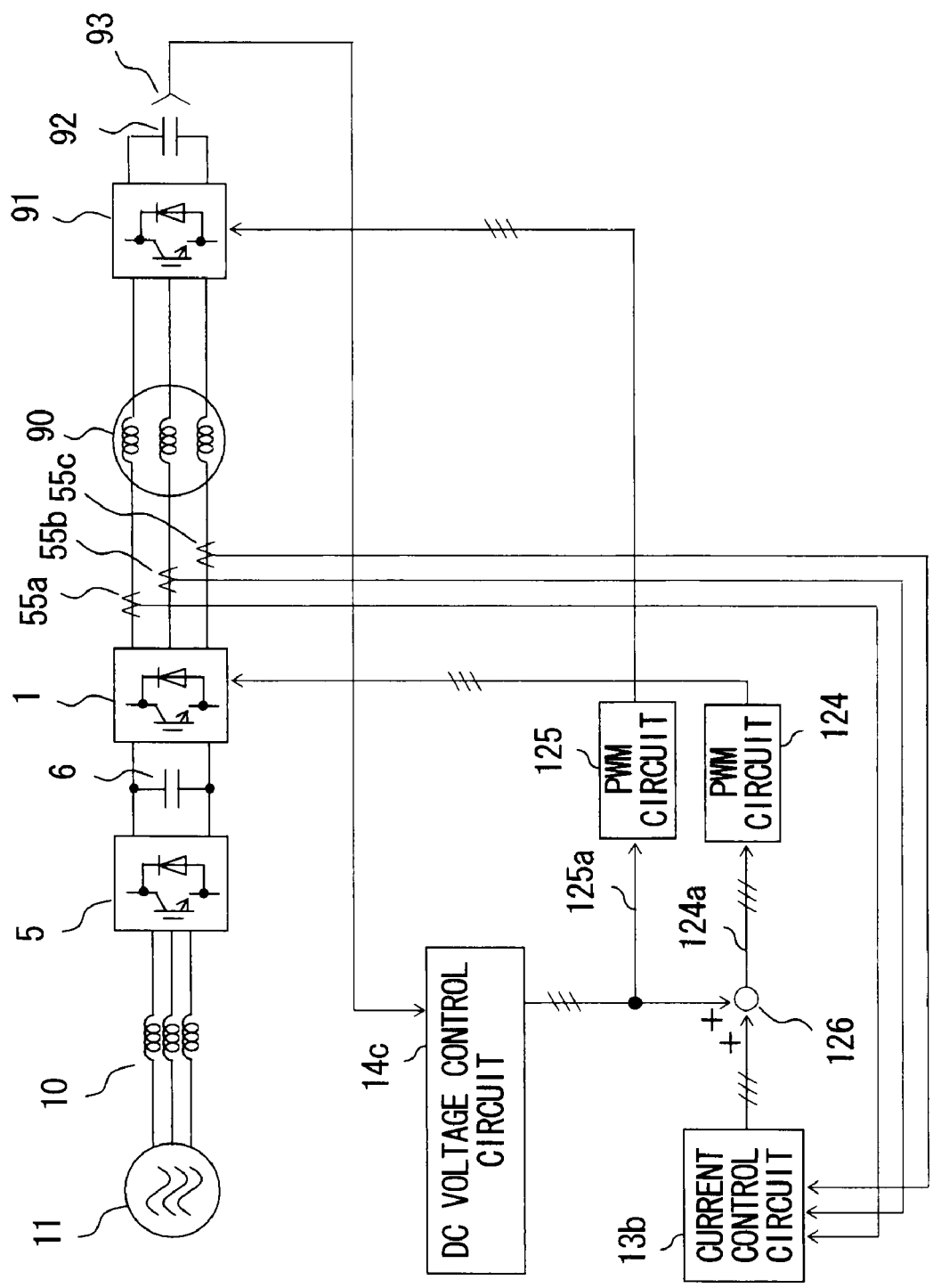
FIG. 29 is a configuration diagram of a power conversion device in accordance with an embodiment 13 of the present invention.

FIG. 29 is a diagram showing the configuration of a power conversion device in accordance with an embodiment 13 of the present invention.

As shown in the drawing, the power conversion device has a three-phase main inverter 1 and a three-phase sub-inverter 91, their respective phase output lines on an AC side are connected in series with each other via an open-winding motor 90, which is a load including open windings. The three-phase main inverter 1 has a smoothing capacitor 6, which serves as a first DC power supply, on the DC side thereof, and further has a converter 5 connected in parallel therewith. On the AC side of the converter 5, an AC power supply 11 is connected via a reactor 10. The three-phase sub-inverter 91 has a smoothing capacitor 92, which serves as a second DC power supply, on the DC side thereof.

The three-phase main inverter 1 and converter 5 are identical to those of the aforesaid embodiments.

Herein, each of the three-phase main inverter 1 and three-phase sub-inverter 91 is regarded as having first single-phase inverters or second single-phase inverters star-connected as three phase parts. For each of the phases, the AC side of the first single-phase inverter (each phase part of the three-phase main inverter 1) and the AC side of the second single-phase inverter (each phase part of the three-phase sub-inverter 91) are connected in series with each other via the open-winding motor 90.

The foregoing main circuitry is identical to those of the embodiments 7 to 10. Herein, a description will be made with the load 90 regarded as an open-winding motor.

The power conversion device in accordance with the embodiment 13 includes, as shown in FIG. 29, an initial charging control device for the purpose of initially charging the smoothing capacitor 92 of the three-phase sub-inverter 91. The initial charging control device includes a current control circuit 13b, a DC voltage control circuit 14c, an adder 126, PWM circuits 124 and 125, and current sensors 55a to 55c.

The current control circuit 13b is a control circuit that performs feedback control on currents of respective phases which flow into the open-winding motor 90 and are measured by the current sensors 55a to 55c, and outputs a voltage command of the phases, $v_u^*$, $v_v^*$, and $v_w^*$, for the three-phase main inverter 1 so that the respective measured phases currents will follow a command value.

Herein, the current command value shall be a value equal to or smaller than the current capacity of switching elements forming each of the inverters 1 and 91, and the voltage command of the respective phases, $v_u^*$, $v_v^*$, and $v_w^*$, shall be a command of a DC voltage.

Figure 30:
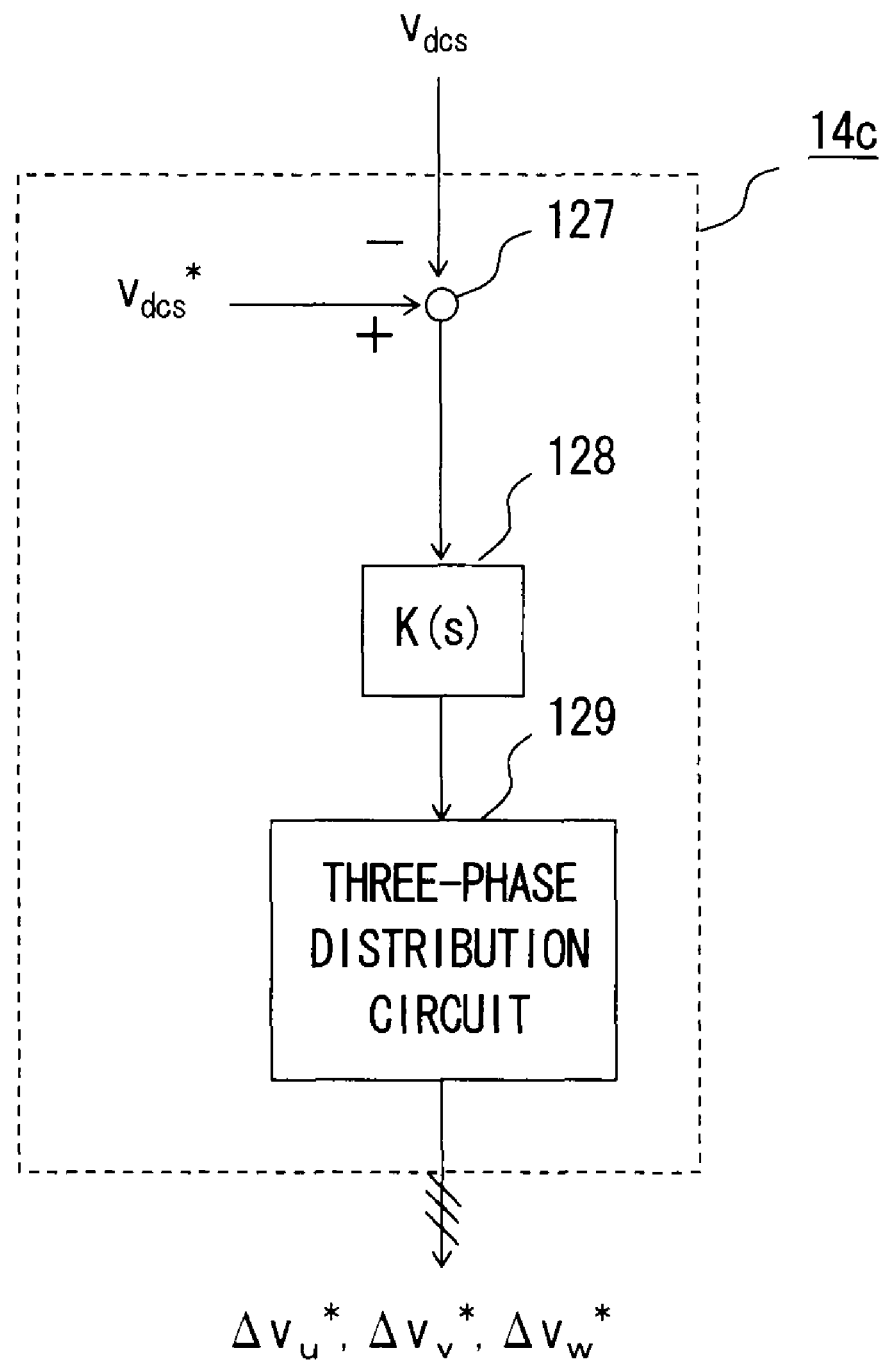
FIG. 30 is a block diagram of a DC voltage control circuit employed in the embodiment 13 of the present invention.

The DC voltage control circuit 14c performs control computation on the basis of the output of a voltage sensor 93 that measures the voltage of the smoothing capacitor 92 which is the DC input of the three-phase sub-inverter 91, and outputs a voltage command as manipulative quantities. The DC voltage control circuit 14c is constructed as shown in, for example, FIG. 30, wherein a subtractor 127 obtains the deviation between the DC voltage $v_{dcs}$ of the smoothing capacitor 92 of the three-phase sub-inverter 91, which is measured by the voltage sensor 93, and a command value $v_{dcs}^*$, and a controller 128 obtains a manipulative quantity. The manipulative quantity is used to adjust the output voltage command for each of the inverters 1 and 91 so that the DC voltage $v_{dcs}$ will follow the command value $v_{dcs}^*$. The manipulative quantity is inputted to a three-phase distribution circuit 129 in order to output manipulative quantities $\Delta v_u^*$, $\Delta v_v^*$, and $\Delta v_w^*$ obtained by distributing the manipulative quantity into three phases. The controller 128 may be formed with a general PI control or the like. Moreover, a method according to which the three-phase distribution circuit 129 distributes the manipulative quantity into the three phases may be any one. For example, the manipulative quantity may be distributed so that the resultant quantities for the three phases will have the same value.

Thereafter, the voltage command of the phases, $v_u^*$, $v_v^*$, and $v_w^*$, outputted by the current control circuit 13b and the manipulative quantities $\Delta v_u^*$, $\Delta v_v^*$, and $\Delta v_w^*$ for the phases outputted by the DC voltage control circuit 14c are added up by an adder 126 according to equations (59a), (59b), and (59c) below in order to compute a main inverter voltage command 124a ($v_{um}^*$, $v_{vm}^*$, and $v_{wm}^*$) that is the output voltage command for the three-phase main inverter 1.

$$v_{um}^* = v_u^* + \Delta v_u^* \tag{59a}$$

$$v_{vm}^* = v_v^* + \Delta v_v^* \tag{59b}$$

$$v_{wm}^* = v_w^* + \Delta v_w^* \tag{59c}$$

The thus computed main inverter voltage command 124a is inputted to the PWM circuit 124, and the PWM circuit 124 outputs a voltage pulse signal, which has the pulse width thereof modulated, so as to drive the three-phase main inverter 1.

On the other hand, the manipulative quantities $\Delta v_u^*$, $\Delta v_v^*$, and $\Delta v_w^*$ for the phases outputted by the DC voltage control circuit 14c are adopted as they are as a sub-inverter voltage command 125a that is an output voltage command of phases for the three-phase sub-inverter 91. The sub-inverter voltage command 125a ($\Delta v_u^*$, $\Delta v_v^*$, and $\Delta v_w^*$) is inputted to the PWM circuit 125, and the PWM circuit 125 outputs a voltage pulse signal, which has the pulse width thereof modulated, so as to drive the three-phase sub-inverter 91.

Since the three-phase main inverter 1 and three-phase sub-inverter 91 are connected in series with each other face to face with the open-winding motor 90 between them, the voltage to be applied to the open-winding motor 90 is the difference between the output voltage of the three-phase main inverter 1 and the output voltage of the three-phase sub-inverter 91. Since the manipulative quantities $\Delta v_u^*$, $\Delta v_v^*$, and $\Delta v_w^*$ outputted by the DC voltage control circuit 14c are contained in each of the output voltage commands for the three-phase main inverter 1 and three-phase sub-inverter 91 while taking on a positive polarity, the contained manipulative quantities and contained manipulative quantities are canceled out. The voltage to be applied to the open-winding motor 90 is determined with the voltage command $v_u^*$, $v_v^*$, and $v_w^*$ outputted by the current control circuit 13b.

Consequently, the current control circuit 13b and DC voltage control circuit 14c operate independently of each other, and the manipulative quantities $\Delta v_u^*$, $\Delta v_v^*$, and $\Delta v_w^*$ outputted by the DC voltage control circuit 14c do not affect the open-winding motor 90.

As mentioned above, the current flowing through the three-phase main inverter 1 and three-phase sub-inverter 91 is controlled by the current control circuit 13b. When a current command value equal to or smaller than the current capacity of switching elements is adopted as mentioned above, the switching elements can be protected from a breakdown caused by an overcurrent. Moreover, a protective circuit need not be operated. When the current command value is set to the largest possible value equal to or smaller than the current capacity, the current capacity of the switching elements can be utilized to the greatest extent and initial charging can be swiftly achieved.

As mentioned above, the voltage to be applied to the open-winding motor 90 is determined with the voltage command $v_u^*$, $v_v^*$, and $v_w^*$ outputted by the current control circuit 13b, and the DC voltage $v_u$, $v_v$, and $v_w$ that does not permit the open-winding motor 90 to rotate is applied.

Assuming that the respective phase currents flowing into the open-winding motor 90 are $i_u$, $i_v$, and $i_w$ and the power to be fed to the open-winding motor 90 is p, a relational equation (60) below is established.

$$p = v_u \cdot i_u + v_v \cdot i_v + v_w \cdot i_w \quad (60)$$

Assuming that components caused by the manipulative quantities $\Delta v_u^*$, $\Delta v_v^*$, and $\Delta v_w^*$ out of components contained in the voltage outputted by each of the three-phase main inverter 1 and three-phase sub-inverter 91 are $\Delta v_u$, $\Delta v_v$, and $\Delta v_w$, the power outputted by the three-phase main inverter 1 is $p_m$, and the power outputted by the three-phase sub-inverter 91 is $p_s$, $p_m$ and $p_s$ are expressed by equations (61) and (62) below.

$$p_m = (v_u + \Delta v_u) \cdot i_u + (v_v + \Delta v_v) \cdot i_v + (v_w + \Delta v_w) \cdot i_w \quad (61)$$

$$p_s = \Delta v_u \cdot (-i_u) + \Delta v_v \cdot (-i_v) + \Delta v_w \cdot (-i_w) \quad (62)$$

Moreover, p, $p_m$, and $p_s$ have a relationship expressed by an equation (63) below.

$$p = p_m + p_s \quad (63)$$

From the equations (61) to (63), it is understood that $\Delta v_u \cdot i_u + \Delta v_v \cdot i_v + \Delta v_w \cdot i_w$ out of the power outputted from the three-phase main inverter 1 is a component which is fed to the three-phase sub-inverter 91 but is not fed to the open-winding motor 90.

When power consumption caused by a loss in the three-phase sub-inverter 91 is ignored, the power $\Delta v_u \cdot i_u + \Delta v_v \cdot i_v + \Delta v_w \cdot i_w$ charges the smoothing capacitor 92 of the three-phase sub-inverter 91 and raises the voltage of the smoothing capacitor 92.

By performing the foregoing control, while the open-winding motor 90 is controlled not to operate, power can be fed from the three-phase main inverter 1 to the three-phase sub-inverter 91 in order to charge the smoothing capacitor 92. The necessity of a charging circuit for charging the smoothing capacitor 92 can be obviated.

Incidentally, the three-phase main inverter 1 and three-phase sub-inverter 91 may be constructed not only as the aforesaid three-phase inverters but also using single-phase inverters for phases. Nevertheless, charging can be achieved according to the same method.

As mentioned above, the power conversion device in accordance with the present embodiment can initially charge the smoothing capacitor 92 of the three-phase sub-inverter 91 without reception of power fed from an external power supply via a converter. Consequently, a structure suitable for a power conversion device that has a converter, which is used to feed power to the smoothing capacitor 92, excluded therefrom and that has compactness and simplicity facilitated ensues.

The foregoing initial charging control may be applied to the embodiments 7 to 10. In this case, the current sensors 55a to 55c that detect currents flowing into the load 90 are included. The overall command generation circuit 13 or 16, DC voltage control circuit 94 or 103, and driving signal production circuit 95 (95a) or 104 (104a) are used to initially charge the smoothing capacitor 92 of the three-phase sub-inverter 91. The overall command generation circuit 13 or 16 outputs a command of a voltage that does not permit the load 90 to operate. The output voltage command is used as an output voltage command for the three-phase main inverter 1, and an output voltage command for the three-phase sub-inverter 91 is set to 0. Manipulative quantities obtained by the DC voltage control circuit 94 or 103 are used to adjust the output voltage command for each of the inverters 1 and 91. Consequently, similarly to the embodiment 13, the smoothing capacitor 92 of the three-phase sub-inverter 91 can be initially charged, and the same advantage can be exerted.

EMBODIMENT 14

In the aforesaid embodiments 11 to 13, a voltage to be applied to the motor 12 or open-winding motor 90 (hereinafter, simply, motor 12 or 90) is a DC voltage. An AC voltage will do as long as it is a voltage which does not permit the motor 12 or 90 to operate.

Assuming that respective phase voltages of u to w phases to be applied to the motor 12 or 50 are $v_u$, $v_v$, and $v_w$, V denotes the amplitude of the u-phase voltage, ω denotes an angular frequency, and t denotes a time, an AC voltage expressed by equations (64a) to (64c) below is applied to the motor 12 or 90.

$$v_u = V \sin \omega t \quad (64a)$$

$$v_v = (V/2) \cdot \sin(\omega t - 180°) \quad (64b)$$

$$v_w = (V/2) \cdot \sin(\omega t - 180°) \quad (64c)$$

With the AC voltage, since a rotating field is not generated, the motor 12 or 90 does not operate. Consequently, when a voltage command is outputted from the current control circuit 13a or 13b so that the AC voltage expressed by the above equations (64a) to (64c) will be applied to the motor 12 or 90, the smoothing capacitor 3, 52, or 92 can be initially charged in the same manner as that in the embodiments 11 to 13. The same advantage can be exerted.

Incidentally, when an AC load is the motor 12 or 90, an AC voltage that does not induce a rotating field is used. For loads other than the motor, any AC voltage that does not permit the load to operate will do.

Moreover, initial charging of the smoothing capacitor 3, 52, or 92 is terminated when the voltage of the smoothing capacitor 3, 52, or 92 reaches the command value. When an AC voltage whose frequency is low enough is applied to the AC load, the initial charging can be terminated while the phase of the AC voltage hardly changes. Specifically, a range of phase angles within which an adverse effect on the AC load can be ignored, for example, 0 to 180° is designated, and an AC voltage of a low frequency permitting termination of initial charging within the range is applied to the AC load. Consequently, similarly to the embodiments 11 to 13, the smoothing capacitor 3, 52, and 92 can be initially charged, and the same advantage can be exerted. In this case, an ordinary three-phase AC voltage whose components differ in phase by 120° will do.

INDUSTRIAL APPLICABILITY

The present invention can be widely applied to power conversion devices that have one single-phase sub-inverter or multiple single-phase sub-inverters connected in series with phase AC output lines of a main inverter so as to feed power to a load.

The invention claimed is:

1. A power conversion device having a first inverter which converts DC power of a first DC power supply fed from a power supply into AC power, and a second inverter, which converts DC power of a second DC power supply into AC power, connected in series at the AC side thereof so as to feed power to a load, the power conversion device comprising:
   a means for detecting the voltage of the second DC power supply; and
   a DC voltage control means that adjusts an output voltage command for each of the first and the second inverters so that the detected voltage of the second DC power supply will follow a command value.

2. The power conversion device according to claim 1, wherein:
   the power conversion device feeds an output voltage to the load using the sum total of the generated voltages of the first and the second inverters; and
   the DC voltage control means determines a manipulative quantity so that the detected voltage of the second DC power supply will follow the command value, adjusts the output voltage command for the first inverter by adding the manipulative quantity, and adjusts the output voltage command for the second inverter by subtracting the manipulative quantity.

3. The power conversion device according to claim 1, wherein:
   both of the first inverter and the second inverter are three-phase inverters;
   the first inverter and the second inverter are connected in series at the AC side thereof via the load;
   the power conversion device feeds the difference voltage between the generated voltages of the first and the second inverters to the load;
   the DC voltage control means determines a manipulative quantity so that the detected voltage of the second DC power supply will follow the command value, and adjusts the output voltage command for each of the first and the second inverters by adding the manipulative quantity.

4. The power conversion device according to claim 3, wherein the DC voltage control means adjusts a dq axial output voltage command for each of the first and the second inverters.

5. The power conversion device according to claim 1, wherein the second inverter outputs a voltage that is used to cancel voltage harmonics outputted by the first inverter.

6. The power conversion device according to claim 1, wherein:
   while a voltage that does not permit the load to operate is applied to the load, the DC voltage control means adjusts the output voltage command for each of the first and the second inverters and controls the output of each of the inverters, so that the second DC power supply will be initially charged via the first and the second inverters; and
   in the initial charging of the second DC power supply, the unadjusted output voltage command for the first inverter produced by the DC voltage control means is the command value for the voltage to be applied to the load, and the unadjusted output voltage command for the second inverter is 0.

7. The power conversion device according to claim 1, wherein:
   both of the first inverter and the second inverter are single-phase inverters.

8. The power conversion device according to claim 1, wherein:
   the first inverter is a three-phase inverter; and
   the second inverter is a single-phase inverter of which AC side connected in series with each phase of the AC side of the three-phase inverter.

9. The power conversion device according to claim 8, wherein the DC voltage control means adjusts a dq axial output voltage command for each of the first and the second inverters.

10. A power conversion device having a first inverter which converts DC power of a first DC power supply fed from a power supply into AC power, and a second inverter, which converts DC power of a second DC power supply into AC power, connected in series at the AC side thereof so as to feed power to a load, the power conversion device comprising:
    a means for detecting the voltage of the second DC power supply; and
    an initial charging control device that controls the output of each of the first and the second inverters so as to initially charge the second DC power supply, wherein;
    while the initial charging control device applies a voltage, which does not permit the load to operate, to the load, the initial charging control device controls the output of each of the first and the second inverters so that the second DC power supply will be charged via the first and the second inverters.

11. The power conversion device according to claim 10, wherein:
    the power conversion device feeds an output voltage to the load using the sum total of the generated voltages of the first and the second inverters;
    the initial charging control device determines a manipulative quantity so that the detected voltage of the second DC power supply will reach a command value, adds the manipulative quantity to the command value for the voltage to the load so as to adopt the result as an output voltage command for the first inverter, and reverses the polarity of the manipulative quantity so as to adopt the result as an output voltage command for the second inverter.

12. The power conversion device according to claim 10, wherein:
    both of the first inverter and the second inverter are three-phase inverters;
    the first inverter and the second inverter are connected in series via the load;
    the power conversion device feeds the difference voltage between the generated voltages of the first and the second inverters to the load;

the initial charging control device determines a manipulative quantity so that the detected voltage of the second DC power supply will reach a command value, adds the manipulative quantity to the command value for the voltage to the load so as to adopt the result as an output voltage command for the first inverter, and adopts the manipulative quantity as an output voltage command for the second inverter.

13. The power conversion device according to claim 10, wherein:
the initial charging control device includes a means that detects a current flowing to the load, and a current control means that produces the command value for the voltage to the load so that the detected current will follow the command value.

14. The power conversion device according to claim 10, wherein the voltage to be applied to the load by the initial charging control device is DC voltage.

15. The power conversion device according to claim 10, wherein the load is a motor, and the voltage to be applied to the load by the initial charging control device is an AC voltage which does not induce a rotating field in the motor.

16. The power conversion device according to claim 10, wherein:
the initial charging control device terminates the initial charging of the second DC power supply when the detected voltage of the second DC power supply reaches the command value; and
the voltage to be applied to the load by the initial charging control device is an AC voltage of a low frequency that undergoes a phase change, which falls within a predetermined range, by completion of the initial charging.

17. The power conversion device according to claim 10, wherein:
both of the first inverter and the second inverter are single-phase inverters.

18. The power conversion device according to claim 10, wherein:
the first inverter is a three-phase inverter; and
the second inverter is a single-phase inverter of which AC side connected in series with each phase of the AC side of the three-phase inverter.

* * * * *